United States Patent
Donovan et al.

(10) Patent No.: US 12,458,428 B2
(45) Date of Patent: Nov. 4, 2025

(54) VERTEBRAL DENERVATION IN CONJUNCTION WITH VERTEBRAL FUSION

(71) Applicant: Relievant Medsystems, Inc., Edina, MN (US)

(72) Inventors: Brian W. Donovan, San Jose, CA (US); Ray M. Baker, San Clemente, CA (US)

(73) Assignee: Relievant Medsystems, Inc., Edina, MN (US)

( * ) Notice: Subject to any disclaimer, the term of this patent is extended or adjusted under 35 U.S.C. 154(b) by 487 days.

(21) Appl. No.: 18/003,760

(22) PCT Filed: Jul. 8, 2021

(86) PCT No.: PCT/US2021/040843
§ 371 (c)(1),
(2) Date: Dec. 29, 2022

(87) PCT Pub. No.: WO2022/011115
PCT Pub. Date: Jan. 13, 2022

(65) Prior Publication Data
US 2023/0255676 A1 Aug. 17, 2023

Related U.S. Application Data

(60) Provisional application No. 63/050,295, filed on Jul. 10, 2020.

(51) Int. Cl.
*A61B 18/12* (2006.01)
*A61B 17/70* (2006.01)
(Continued)

(52) U.S. Cl.
CPC ...... *A61B 18/1206* (2013.01); *A61B 17/7002* (2013.01); *A61B 17/7032* (2013.01);
(Continued)

(58) Field of Classification Search
CPC ... A61B 18/02; A61B 18/082; A61B 18/1206; A61B 18/148; A61B 18/1815;
(Continued)

(56) References Cited

U.S. PATENT DOCUMENTS 3,054,881 A 9/1962 Metz et al.
3,062,876 A 11/1962 Pons, Jr. et al.
(Continued)

FOREIGN PATENT DOCUMENTS

AU 2001033279 2/2001
AU 2003248436 9/2003
(Continued)

OTHER PUBLICATIONS

U.S. Appl. No. 09/775,137 U.S. Pat. No. 6,669,242, filed Feb. 1, 2001, Methods and Devices for Intraosseous Nerve Ablation.
(Continued)

*Primary Examiner* — Nicholas J Plionis
(74) *Attorney, Agent, or Firm* — Nelson Mullins Riley & Scarborough LLP

(57) ABSTRACT

Described herein are various implementations of systems and methods for treating back pain (e.g., chronic low back pain) caused by different (e.g., independent) sources of pain, such as pain originating or stemming from intervertebral discs, from vertebral endplates, and/or from intraosseous locations within one or more vertebral bodies. For example, methods for treating back pain (e.g., chronic low back pain) may involve both vertebral fusion (e.g., arthrodesis or spondylodesis to fuse adjacent vertebrae) and neuromodulation (for example, ablation of nerves within or surrounding one or more of the adjacent vertebrae). The neuromodulation may facilitate treatment of pain that is generated by insertion of fusion hardware.

25 Claims, 8 Drawing Sheets

(51) Int. Cl.

| | |
|---|---|
| *A61B 18/00* | (2006.01) |
| *A61B 18/02* | (2006.01) |
| *A61B 18/08* | (2006.01) |
| *A61B 18/14* | (2006.01) |
| *A61B 18/18* | (2006.01) |
| *A61B 18/20* | (2006.01) |
| *A61F 2/44* | (2006.01) |
| *A61F 2/46* | (2006.01) |
| *A61N 7/00* | (2006.01) |

(52) U.S. Cl.
CPC ...... *A61B 17/7059* (2013.01); *A61B 17/7061* (2013.01); *A61B 17/7074* (2013.01); *A61B 18/02* (2013.01); *A61B 18/082* (2013.01); *A61B 18/148* (2013.01); *A61B 18/1815* (2013.01); *A61F 2/4455* (2013.01); *A61F 2/4611* (2013.01); *A61N 7/00* (2013.01); *A61B 2018/00434* (2013.01); *A61B 2018/00577* (2013.01); *A61B 2018/0293* (2013.01); *A61B 2018/126* (2013.01); *A61B 2018/1869* (2013.01); *A61B 18/20* (2013.01); *A61B 2018/2005* (2013.01); *A61N 2007/003* (2013.01)

(58) Field of Classification Search
CPC ............ A61B 17/7002; A61B 17/7032; A61B 17/7059; A61B 2018/00434; A61B 2018/00577; A61B 2018/0293; A61B 2018/126; A61B 2018/1869; A61B 2018/2005; A61F 2/4455; A61F 2/4611; A61N 7/00; A61N 2007/003
See application file for complete search history.

(56) References Cited

U.S. PATENT DOCUMENTS

| | | |
|---|---|---|
| 3,565,062 A | 2/1971 | Kuris |
| 3,822,708 A | 7/1974 | Zilber |
| 3,845,771 A | 11/1974 | Vise |
| 3,920,021 A | 11/1975 | Hiltebrandt |
| 3,938,502 A | 2/1976 | Born |
| 3,997,408 A | 12/1976 | Barba et al. |
| 4,044,774 A | 8/1977 | Corgin et al. |
| 4,116,198 A | 9/1978 | Roos |
| 4,311,154 A | 1/1982 | Sterzer et al. |
| 4,312,364 A | 1/1982 | Convert et al. |
| 4,378,806 A | 4/1983 | Henley-Cohn |
| 4,448,198 A | 5/1984 | Turner |
| 4,449,528 A | 5/1984 | Auth et al. |
| 4,462,408 A | 7/1984 | Silverstein et al. |
| 4,528,979 A | 7/1985 | Marchenko et al. |
| 4,530,360 A | 7/1985 | Durate |
| 4,541,423 A | 9/1985 | Barber |
| 4,569,351 A | 2/1986 | Tang |
| 4,573,448 A | 3/1986 | Kambin |
| 4,586,512 A | 5/1986 | Do-huu |
| 4,601,296 A | 7/1986 | Yerushalmi |
| 4,612,940 A | 9/1986 | Kasevich et al. |
| 4,657,017 A | 4/1987 | Sorochenko |
| 4,662,383 A | 5/1987 | Sogawa et al. |
| 4,671,293 A | 6/1987 | Shalov |
| 4,676,258 A | 6/1987 | Inokuchi et al. |
| 4,679,561 A | 7/1987 | Doss |
| 4,681,122 A | 7/1987 | Winters et al. |
| 4,750,499 A | 6/1988 | Hoffer |
| 4,754,757 A | 7/1988 | Feucht |
| 4,757,820 A | 7/1988 | Itoh |
| 4,774,967 A | 10/1988 | Zanakis et al. |
| 4,800,899 A | 1/1989 | Elliott |
| 4,813,429 A | 3/1989 | Eshel et al. |
| 4,841,977 A | 6/1989 | Griffith et al. |
| 4,907,589 A | 3/1990 | Cosman |
| 4,924,863 A | 5/1990 | Sterzer |
| 4,936,281 A | 6/1990 | Stasz |
| 4,941,466 A | 7/1990 | Romano |
| 4,950,267 A | 8/1990 | Ishihara et al. |
| 4,951,677 A | 8/1990 | Crowley et al. |
| 4,955,377 A | 9/1990 | Lennox et al. |
| 4,959,063 A | 9/1990 | Kojima |
| 4,961,435 A | 10/1990 | Kitagawa et al. |
| 4,963,142 A | 10/1990 | Loertscher |
| 4,966,144 A | 10/1990 | Rochkind et al. |
| 4,967,765 A | 11/1990 | Turner et al. |
| 4,976,711 A | 12/1990 | Parins et al. |
| 4,977,902 A | 12/1990 | Sekino et al. |
| 5,000,185 A | 3/1991 | Yock |
| 5,002,058 A | 3/1991 | Marinelli |
| 5,002,059 A | 3/1991 | Crowley et al. |
| 5,007,437 A | 4/1991 | Sterzer |
| 5,025,778 A | 6/1991 | Silverstein et al. |
| 5,031,618 A | 7/1991 | Mullett |
| 5,061,266 A | 10/1991 | Hakky |
| 5,070,879 A | 12/1991 | Herres |
| RE33,791 E | 1/1992 | Carr |
| 5,078,736 A | 1/1992 | Behl |
| 5,080,660 A | 1/1992 | Buelna |
| 5,084,043 A | 1/1992 | Hertzmann et al. |
| 5,090,414 A | 2/1992 | Takano |
| 5,098,431 A | 3/1992 | Rydell |
| 5,106,376 A | 4/1992 | Mononen et al. |
| 5,108,404 A | 4/1992 | Scholten et al. |
| 5,131,397 A | 7/1992 | Crowley et al. |
| 5,147,355 A | 9/1992 | Friedman et al. |
| 5,156,157 A | 10/1992 | Valenta, Jr. et al. |
| 5,158,536 A | 10/1992 | Sekins et al. |
| 5,161,533 A | 11/1992 | Prass et al. |
| 5,167,231 A | 12/1992 | Matsui |
| 5,186,177 A | 2/1993 | O'Donnell et al. |
| 5,190,540 A | 3/1993 | Lee |
| 5,190,546 A | 3/1993 | Jervis |
| 5,201,729 A | 4/1993 | Hertzmann et al. |
| 5,207,672 A | 5/1993 | Martinelli et al. |
| 5,209,748 A | 5/1993 | Daikuzono |
| 5,222,953 A | 6/1993 | Dowlatshahi |
| 5,226,430 A | 7/1993 | Spear et al. |
| 5,242,439 A | 9/1993 | Larsen et al. |
| 5,255,679 A | 10/1993 | Imran |
| 5,271,408 A | 12/1993 | Breyer et al. |
| 5,273,026 A | 12/1993 | Wilk |
| 5,281,213 A | 1/1994 | Milder et al. |
| 5,281,215 A | 1/1994 | Milder et al. |
| 5,282,468 A | 2/1994 | Klepinski |
| 5,292,321 A | 3/1994 | Lee |
| 5,295,484 A | 3/1994 | Marcus et al. |
| 5,300,085 A | 4/1994 | Yock |
| 5,304,214 A | 4/1994 | DeFord et al. |
| 5,305,756 A | 4/1994 | Entrekin et al. |
| 5,314,463 A | 5/1994 | Camps et al. |
| 5,320,617 A | 6/1994 | Leach |
| 5,324,255 A | 6/1994 | Pasafaro et al. |
| 5,325,860 A | 7/1994 | Seward et al. |
| 5,342,292 A | 8/1994 | Nita et al. |
| 5,342,357 A | 8/1994 | Nardella |
| 5,342,409 A | 8/1994 | Mullett |
| 5,344,435 A | 9/1994 | Turner et al. |
| 5,345,940 A | 9/1994 | Seward et al. |
| 5,348,554 A | 9/1994 | Imran et al. |
| 5,350,377 A | 9/1994 | Winston et al. |
| 5,351,691 A | 10/1994 | Brommersma |
| 5,366,443 A | 11/1994 | Eggers et al. |
| 5,366,490 A | 11/1994 | Edwards et al. |
| 5,368,031 A | 11/1994 | Cline et al. |
| 5,368,035 A | 11/1994 | Hamm et al. |
| 5,368,557 A | 11/1994 | Nita et al. |
| 5,368,558 A | 11/1994 | Nita |
| 5,370,675 A | 12/1994 | Edwards et al. |
| 5,370,678 A | 12/1994 | Edwards et al. |
| 5,372,138 A | 12/1994 | Crowley et al. |
| 5,374,265 A | 12/1994 | Sand |
| 5,383,876 A | 1/1995 | Nardella |
| 5,385,148 A | 1/1995 | Lesh et al. |

(56) References Cited

U.S. PATENT DOCUMENTS

| | | |
|---|---|---|
| 5,385,544 A | 1/1995 | Edwards et al. |
| 5,391,197 A | 2/1995 | Burdette et al. |
| 5,391,199 A | 2/1995 | Ben-Haim |
| 5,405,376 A | 4/1995 | Mulier et al. |
| 5,411,527 A | 5/1995 | Alt |
| 5,417,719 A | 5/1995 | Hull et al. |
| 5,419,767 A | 5/1995 | Eggers et al. |
| 5,421,338 A | 6/1995 | Crowley |
| 5,423,811 A | 6/1995 | Imran et al. |
| 5,431,649 A | 7/1995 | Mulier et al. |
| 5,433,739 A | 7/1995 | Sluijter et al. |
| D361,555 S | 8/1995 | Bettin et al. |
| 5,437,661 A | 8/1995 | Rieser |
| 5,441,499 A | 8/1995 | Fritzsch |
| 5,441,527 A | 8/1995 | Erickson et al. |
| 5,443,463 A | 8/1995 | Stern et al. |
| 5,447,509 A | 9/1995 | Millis et al. |
| 5,449,380 A | 9/1995 | Chin |
| 5,454,373 A | 10/1995 | Koger et al. |
| 5,458,596 A | 10/1995 | Lax et al. |
| 5,458,597 A | 10/1995 | Edwards et al. |
| 5,471,988 A | 12/1995 | Fujio et al. |
| 5,472,441 A | 12/1995 | Edwards et al. |
| 5,474,530 A | 12/1995 | Passafaro et al. |
| 5,484,432 A | 1/1996 | Sand |
| 5,486,170 A | 1/1996 | Winston et al. |
| 5,501,703 A | 3/1996 | Holsheimer et al. |
| 5,505,730 A | 4/1996 | Edwarrds |
| 5,514,130 A | 5/1996 | Baker |
| 5,524,624 A | 6/1996 | Tepper et al. |
| 5,526,815 A | 6/1996 | Granz et al. |
| 5,529,580 A | 6/1996 | Hagino et al. |
| 5,540,679 A | 7/1996 | Fram et al. |
| 5,540,681 A | 7/1996 | Strul et al. |
| 5,540,684 A | 7/1996 | Hassler, Jr. |
| 5,545,161 A | 8/1996 | Imran |
| 5,560,362 A | 10/1996 | Silwa, Jr. et al. |
| 5,565,005 A | 10/1996 | Erickson et al. |
| 5,569,242 A | 10/1996 | Lax et al. |
| 5,571,088 A | 11/1996 | Lennox et al. |
| 5,571,147 A | 11/1996 | Sluijter et al. |
| 5,575,772 A | 11/1996 | Lennox |
| 5,575,788 A | 11/1996 | Baker et al. |
| 5,588,432 A | 12/1996 | Crowley |
| 5,596,988 A | 1/1997 | Markle et al. |
| 5,601,526 A | 2/1997 | Chapelon et al. |
| 5,606,974 A | 3/1997 | Castellano et al. |
| 5,609,151 A | 3/1997 | Mulier et al. |
| 5,620,479 A | 4/1997 | Diederich |
| 5,628,317 A | 5/1997 | Starkebaum et al. |
| 5,630,426 A | 5/1997 | Shmulewitz et al. |
| 5,630,837 A | 5/1997 | Crowley |
| 5,643,319 A | 7/1997 | Green et al. |
| 5,643,330 A | 7/1997 | Holshiemer et al. |
| 5,647,361 A | 7/1997 | Damadian |
| 5,647,871 A | 7/1997 | Levine et al. |
| 5,658,278 A | 8/1997 | Imran et al. |
| 5,672,173 A | 9/1997 | Gough et al. |
| 5,681,282 A | 10/1997 | Eggers et al. |
| 5,683,366 A | 11/1997 | Eggers et al. |
| 5,685,839 A | 11/1997 | Baker et al. |
| 5,687,729 A | 11/1997 | Schaetzle |
| 5,688,267 A | 11/1997 | Panescu |
| 5,693,052 A | 12/1997 | Weaver |
| 5,697,281 A | 12/1997 | Eggers et al. |
| 5,697,536 A | 12/1997 | Eggers et al. |
| 5,697,882 A | 12/1997 | Eggers et al. |
| 5,697,909 A | 12/1997 | Eggers et al. |
| 5,697,927 A | 12/1997 | Imran et al. |
| 5,700,262 A | 12/1997 | Acosta et al. |
| 5,718,231 A | 2/1998 | Chen et al. |
| 5,720,286 A | 2/1998 | Chapelon et al. |
| 5,720,287 A | 2/1998 | Chapelon et al. |
| 5,722,403 A | 3/1998 | McGee et al. |
| 5,725,494 A | 3/1998 | Brisken |
| 5,728,062 A | 3/1998 | Brisken |
| 5,730,706 A | 3/1998 | Garnies |
| 5,733,315 A | 3/1998 | Burdette et al. |
| 5,735,280 A | 4/1998 | Sherman et al. |
| 5,735,811 A | 4/1998 | Brisken |
| 5,735,846 A | 4/1998 | Fleischman et al. |
| 5,735,847 A | 4/1998 | Gough et al. |
| 5,738,680 A | 4/1998 | Mueller et al. |
| 5,741,249 A | 4/1998 | Moss et al. |
| 5,743,904 A | 4/1998 | Edwards |
| 5,746,737 A | 5/1998 | Saadat |
| 5,752,969 A | 5/1998 | Cunci et al. |
| 5,755,663 A | 5/1998 | Johnson et al. |
| 5,762,066 A | 6/1998 | Law et al. |
| 5,762,616 A | 6/1998 | Talish |
| 5,766,153 A | 6/1998 | Eggers et al. |
| 5,766,231 A | 6/1998 | Erickson et al. |
| 5,776,092 A | 7/1998 | Farin et al. |
| 5,785,705 A | 7/1998 | Baker |
| 5,800,378 A | 9/1998 | Edwards et al. |
| 5,800,429 A | 9/1998 | Edwards |
| 5,800,432 A | 9/1998 | Swanson |
| 5,807,237 A | 9/1998 | Tindel |
| 5,807,391 A | 9/1998 | Wijkamp |
| 5,807,392 A | 9/1998 | Eggers |
| 5,807,395 A | 9/1998 | Mulier et al. |
| 5,810,764 A | 9/1998 | Eggers et al. |
| 5,817,021 A | 10/1998 | Reichenberger |
| 5,824,021 A | 10/1998 | Rise |
| 5,840,031 A | 11/1998 | Crowley |
| 5,843,019 A | 12/1998 | Eggers et al. |
| 5,843,021 A | 12/1998 | Edwards et al. |
| 5,844,092 A | 12/1998 | Presta et al. |
| 5,846,218 A | 12/1998 | Brisken et al. |
| 5,849,011 A | 12/1998 | Jones et al. |
| 5,855,576 A | 1/1999 | LeVeen et al. |
| 5,860,951 A | 1/1999 | Eggers et al. |
| 5,865,788 A | 2/1999 | Edwards et al. |
| 5,865,801 A | 2/1999 | Houser |
| 5,868,740 A | 2/1999 | LeVeen et al. |
| 5,871,469 A | 2/1999 | Eggers et al. |
| 5,871,470 A | 2/1999 | McWha |
| 5,871,481 A | 2/1999 | Kannenberg et al. |
| 5,873,855 A | 2/1999 | Eggers et al. |
| 5,873,877 A | 2/1999 | McGaffigan et al. |
| 5,876,398 A | 3/1999 | Mulier et al. |
| 5,888,198 A | 3/1999 | Eggers et al. |
| 5,891,095 A | 4/1999 | Eggers et al. |
| 5,895,370 A | 4/1999 | Edwards et al. |
| 5,902,272 A | 5/1999 | Eggers et al. |
| 5,902,308 A | 5/1999 | Murphy |
| 5,904,681 A | 5/1999 | West, Jr. |
| 5,906,613 A | 5/1999 | Mulier et al. |
| 5,916,213 A | 6/1999 | Haissaguerre et al. |
| 5,916,214 A | 6/1999 | Cosio |
| 5,919,188 A | 7/1999 | Shearon et al. |
| 5,931,805 A | 8/1999 | Brisken |
| 5,935,123 A | 8/1999 | Edwards et al. |
| 5,938,582 A | 8/1999 | Ciamacco et al. |
| 5,941,722 A | 8/1999 | Chen |
| 5,941,876 A | 8/1999 | Nardella et al. |
| 5,944,715 A | 8/1999 | Goble et al. |
| 5,948,007 A | 9/1999 | Starkebaum et al. |
| 5,948,008 A | 9/1999 | Daikuzono |
| 5,954,716 A | 9/1999 | Sharkey et al. |
| 5,964,727 A | 10/1999 | Edwards et al. |
| 5,967,988 A | 10/1999 | Briscoe et al. |
| 5,972,015 A | 10/1999 | Scribner et al. |
| 5,976,105 A | 11/1999 | Marcove et al. |
| 5,983,141 A | 11/1999 | Sluijter et al. |
| 5,997,497 A | 12/1999 | Nita et al. |
| 6,001,095 A | 12/1999 | de la Rama et al. |
| 6,007,533 A | 12/1999 | Casscells et al. |
| 6,007,570 A | 12/1999 | Sharkey et al. |
| 6,012,457 A | 1/2000 | Lesh |
| 6,014,588 A | 1/2000 | Fitz |
| 6,016,452 A | 1/2000 | Kasevich |
| 6,016,809 A | 1/2000 | Mulier et al. |
| 6,017,356 A | 1/2000 | Frederick et al. |

(56) References Cited

U.S. PATENT DOCUMENTS

| | | |
|---|---|---|
| 6,019,776 A | 2/2000 | Preissman et al. |
| 6,022,334 A | 2/2000 | Edwards et al. |
| 6,024,733 A | 2/2000 | Eggers et al. |
| 6,024,740 A | 2/2000 | Lesh et al. |
| 6,030,374 A | 2/2000 | McDaniel |
| 6,030,402 A | 2/2000 | Thompson et al. |
| 6,032,673 A | 3/2000 | Langberg et al. |
| 6,032,674 A | 3/2000 | Eggers et al. |
| 6,033,411 A | 3/2000 | Preissman et al. |
| 6,035,238 A | 3/2000 | Ingle et al. |
| 6,038,480 A | 3/2000 | Hrdlicka et al. |
| 6,045,532 A | 4/2000 | Eggers et al. |
| 6,046,187 A | 4/2000 | Berde et al. |
| 6,047,214 A | 4/2000 | Mueller et al. |
| 6,050,995 A | 4/2000 | Durgin |
| 6,053,172 A | 4/2000 | Hovda et al. |
| 6,053,909 A | 4/2000 | Shadduck et al. |
| 6,056,745 A | 5/2000 | Panescu et al. |
| 6,063,078 A | 5/2000 | Wittkampf |
| 6,063,079 A | 5/2000 | Hovda et al. |
| 6,066,134 A | 5/2000 | Eggers et al. |
| 6,066,139 A | 5/2000 | Ryan et al. |
| 6,068,642 A | 5/2000 | Johnson et al. |
| 6,071,279 A | 6/2000 | Whayne et al. |
| 6,073,051 A | 6/2000 | Sharkey et al. |
| 6,074,352 A | 6/2000 | Hynynen et al. |
| 6,086,585 A | 7/2000 | Hovda et al. |
| 6,090,105 A | 7/2000 | Zepeda et al. |
| 6,095,149 A | 8/2000 | Sharkey et al. |
| 6,099,499 A | 8/2000 | Ciamacco |
| 6,099,514 A | 8/2000 | Sharkey et al. |
| 6,099,524 A | 8/2000 | Lipson et al. |
| 6,102,046 A | 8/2000 | Weinstein et al. |
| 6,104,957 A | 8/2000 | Alo et al. |
| 6,105,581 A | 8/2000 | Eggers et al. |
| 6,106,454 A | 8/2000 | Berg et al. |
| 6,109,268 A | 8/2000 | Thapliyal et al. |
| 6,112,122 A | 8/2000 | Schwardt et al. |
| 6,113,597 A | 9/2000 | Eggers et al. |
| 6,117,101 A | 9/2000 | Diederich et al. |
| 6,117,109 A | 9/2000 | Eggers et al. |
| 6,117,128 A | 9/2000 | Gregory |
| 6,120,467 A | 9/2000 | Schallhorn |
| 6,120,502 A | 9/2000 | Michelson |
| 6,122,549 A | 9/2000 | Sharkey et al. |
| 6,126,682 A | 10/2000 | Ashley et al. |
| 6,137,209 A | 10/2000 | Dahlberg et al. |
| 6,139,545 A | 10/2000 | Utley et al. |
| 6,142,992 A | 11/2000 | Cheng et al. |
| 6,143,019 A | 11/2000 | Motamedi et al. |
| 6,146,380 A | 11/2000 | Racz et al. |
| 6,149,620 A | 11/2000 | Baker et al. |
| 6,159,194 A | 12/2000 | Eggers et al. |
| 6,159,208 A | 12/2000 | Hovda et al. |
| 6,161,048 A | 12/2000 | Sluijter et al. |
| 6,164,283 A | 12/2000 | Lesh |
| 6,165,172 A | 12/2000 | Farley et al. |
| 6,168,593 B1 | 1/2001 | Sharkey et al. |
| 6,169,924 B1 | 1/2001 | Meloy et al. |
| 6,171,239 B1 | 1/2001 | Humphrey |
| 6,176,857 B1 | 1/2001 | Ashley |
| 6,179,824 B1 | 1/2001 | Eggers et al. |
| 6,179,836 B1 | 1/2001 | Eggers et al. |
| 6,179,858 B1 | 1/2001 | Squire et al. |
| 6,183,469 B1 | 2/2001 | Thapliyal et al. |
| 6,190,381 B1 | 2/2001 | Olsen et al. |
| 6,190,383 B1 | 2/2001 | Schmaltz et al. |
| 6,193,715 B1 | 2/2001 | Wrublewski et al. |
| 6,203,542 B1 | 3/2001 | Ellsberry et al. |
| 6,206,842 B1 | 3/2001 | Tu et al. |
| 6,210,393 B1 | 4/2001 | Brisken |
| 6,210,402 B1 | 4/2001 | Olsen et al. |
| 6,210,415 B1 | 4/2001 | Bester |
| 6,216,704 B1 | 4/2001 | Ingle et al. |
| 6,221,038 B1 | 4/2001 | Brisken |
| 6,224,592 B1 | 5/2001 | Eggers et al. |
| 6,228,046 B1 | 5/2001 | Brisken |
| 6,228,078 B1 | 5/2001 | Eggers et al. |
| 6,228,082 B1 | 5/2001 | Baker et al. |
| 6,231,516 B1 | 5/2001 | Keilman et al. |
| 6,231,528 B1 | 5/2001 | Kaufman et al. |
| 6,231,571 B1 | 5/2001 | Ellman et al. |
| 6,231,615 B1 | 5/2001 | Preissman |
| 6,233,488 B1 | 5/2001 | Hess |
| 6,235,020 B1 | 5/2001 | Cheng et al. |
| 6,235,022 B1 | 5/2001 | Hallock et al. |
| 6,235,024 B1 | 5/2001 | Tu |
| 6,237,604 B1 | 5/2001 | Burnside et al. |
| 6,238,391 B1 | 5/2001 | Olsen et al. |
| 6,238,393 B1 | 5/2001 | Mulier et al. |
| 6,241,665 B1 | 6/2001 | Negus et al. |
| 6,241,725 B1 | 6/2001 | Cosman |
| 6,241,734 B1 | 6/2001 | Scribner et al. |
| 6,245,064 B1 | 6/2001 | Lesh et al. |
| 6,246,912 B1 | 6/2001 | Sluijter et al. |
| 6,248,110 B1 | 6/2001 | Reiley et al. |
| 6,248,345 B1 | 6/2001 | Goldenheim et al. |
| 6,254,553 B1 | 7/2001 | Lidgren et al. |
| 6,254,599 B1 | 7/2001 | Lesh et al. |
| 6,254,600 B1 | 7/2001 | Willink et al. |
| 6,258,086 B1 | 7/2001 | Ashley et al. |
| 6,259,952 B1 | 7/2001 | Sluijter |
| 6,261,311 B1 | 7/2001 | Sharkey et al. |
| 6,264,650 B1 | 7/2001 | Hovda et al. |
| 6,264,651 B1 | 7/2001 | Underwood et al. |
| 6,264,652 B1 | 7/2001 | Eggers et al. |
| 6,264,659 B1 | 7/2001 | Ross et al. |
| 6,267,770 B1 | 7/2001 | Truwit |
| 6,270,498 B1 | 8/2001 | Michelson |
| 6,277,112 B1 | 8/2001 | Underwood et al. |
| 6,277,122 B1 | 8/2001 | McGahan et al. |
| 6,280,441 B1 | 8/2001 | Ryan |
| 6,280,456 B1 | 8/2001 | Scribner et al. |
| 6,283,961 B1 | 9/2001 | Underwood et al. |
| 6,287,114 B1 | 9/2001 | Meller et al. |
| 6,287,272 B1 | 9/2001 | Brisken et al. |
| 6,287,304 B1 | 9/2001 | Eggers et al. |
| 6,290,715 B1 | 9/2001 | Sharkey et al. |
| 6,292,699 B1 | 9/2001 | Simon et al. |
| 6,296,619 B1 | 10/2001 | Brisken et al. |
| 6,296,636 B1 | 10/2001 | Cheng et al. |
| 6,296,638 B1 | 10/2001 | Davison et al. |
| 6,305,378 B1 | 10/2001 | Lesh et al. |
| 6,309,387 B1 | 10/2001 | Eggers et al. |
| 6,309,420 B1 | 10/2001 | Preissman |
| 6,312,408 B1 | 11/2001 | Eggers et al. |
| 6,312,425 B1 | 11/2001 | Simpson et al. |
| 6,312,426 B1 | 11/2001 | Goldberg et al. |
| 6,319,241 B1 | 11/2001 | King et al. |
| 6,322,549 B1 | 11/2001 | Eggers et al. |
| 6,348,055 B1 | 2/2002 | Preissman |
| 6,355,032 B1 | 3/2002 | Hovda et al. |
| 6,356,790 B1 | 3/2002 | Maguire et al. |
| 6,361,531 B1 | 3/2002 | Hissong |
| 6,363,937 B1 | 4/2002 | Hovda et al. |
| 6,368,292 B1 | 4/2002 | Ogden et al. |
| 6,379,351 B1 | 4/2002 | Thapliyal et al. |
| 6,383,190 B1 | 5/2002 | Preissman |
| 6,391,025 B1 | 5/2002 | Weinstein et al. |
| 6,398,782 B1 | 6/2002 | Pecor et al. |
| 6,416,507 B1 | 7/2002 | Eggers et al. |
| 6,416,508 B1 | 7/2002 | Eggers et al. |
| 6,423,057 B1 | 7/2002 | He et al. |
| 6,423,059 B1 | 7/2002 | Hanson et al. |
| 6,425,887 B1 | 7/2002 | McGuckin et al. |
| 6,426,339 B1 | 7/2002 | Berde et al. |
| 6,428,491 B1 | 8/2002 | Weiss |
| 6,432,103 B1 | 8/2002 | Ellsberry et al. |
| 6,436,060 B1 | 8/2002 | Talish |
| 6,436,098 B1 | 8/2002 | Michelson |
| 6,440,138 B1 | 8/2002 | Reiley et al. |
| 6,447,448 B1 | 9/2002 | Ishikawa et al. |
| 6,451,013 B1 | 9/2002 | Bays et al. |
| 6,454,727 B1 | 9/2002 | Burbank et al. |

(56) References Cited

U.S. PATENT DOCUMENTS

| | | |
|---|---|---|
| 6,461,350 B1 | 10/2002 | Underwood et al. |
| 6,461,354 B1 | 10/2002 | Olsen et al. |
| 6,464,695 B2 | 10/2002 | Hovda et al. |
| 6,468,270 B1 | 10/2002 | Hovda et al. |
| 6,468,274 B1 | 10/2002 | Alleyne et al. |
| 6,470,220 B1 | 10/2002 | Kraus et al. |
| 6,478,793 B1 | 11/2002 | Cosman et al. |
| 6,482,201 B1 | 11/2002 | Olsen et al. |
| 6,485,271 B1 | 11/2002 | Tack |
| 6,487,446 B1 | 11/2002 | Hill et al. |
| 6,491,893 B1 | 12/2002 | Babich |
| 6,493,592 B1 | 12/2002 | Leonard et al. |
| 6,494,902 B2 | 12/2002 | Hoey et al. |
| 6,500,173 B2 | 12/2002 | Underwood et al. |
| 6,505,075 B1 | 1/2003 | Weiner |
| 6,508,839 B1 | 1/2003 | Lambrecht et al. |
| 6,524,261 B2 | 2/2003 | Talish et al. |
| 6,527,759 B1 | 3/2003 | Tachibana et al. |
| 6,537,306 B1 | 3/2003 | Burdette et al. |
| 6,540,741 B1 | 4/2003 | Underwood et al. |
| 6,544,261 B2 | 4/2003 | Ellsberry et al. |
| 6,557,559 B1 | 5/2003 | Eggers et al. |
| 6,558,385 B1 | 5/2003 | McClurken et al. |
| 6,558,390 B2 | 5/2003 | Cragg |
| 6,560,486 B1 | 5/2003 | Osorio et al. |
| 6,562,033 B2 | 5/2003 | Shah et al. |
| 6,575,919 B1 | 6/2003 | Reiley et al. |
| 6,575,968 B1 | 6/2003 | Eggers et al. |
| 6,575,969 B1 | 6/2003 | Rittman, III et al. |
| 6,575,979 B1 | 6/2003 | Cragg |
| 6,578,579 B2 | 6/2003 | Burnside et al. |
| 6,582,423 B1 | 6/2003 | Thapliyal et al. |
| 6,585,656 B2 | 7/2003 | Masters |
| 6,589,237 B2 | 7/2003 | Woloszko et al. |
| 6,592,559 B1 | 7/2003 | Pakter et al. |
| 6,595,990 B1 | 7/2003 | Weinstein et al. |
| 6,599,288 B2 | 7/2003 | Maguire et al. |
| 6,602,248 B1 | 8/2003 | Sharps et al. |
| 6,604,003 B2 | 8/2003 | Fredricks et al. |
| 6,607,502 B1 | 8/2003 | Maguire et al. |
| 6,607,529 B1 | 8/2003 | Jones et al. |
| 6,608,502 B2 | 8/2003 | Aoki et al. |
| 6,622,731 B2 | 9/2003 | Daniel et al. |
| 6,623,505 B2 | 9/2003 | Scribner et al. |
| 6,632,193 B1 | 10/2003 | Davison et al. |
| 6,632,220 B1 | 10/2003 | Eggers et al. |
| 6,645,202 B1 | 11/2003 | Pless et al. |
| 6,648,883 B2 | 11/2003 | Francischelli et al. |
| 6,651,669 B1 | 11/2003 | Burnside |
| 6,659,106 B1 | 12/2003 | Hovda et al. |
| 6,663,627 B2 | 12/2003 | Francischelli et al. |
| 6,663,647 B2 | 12/2003 | Reiley et al. |
| 6,673,063 B2 | 1/2004 | Brett |
| 6,689,086 B1 | 2/2004 | Nita et al. |
| 6,689,125 B1 | 2/2004 | Keith et al. |
| 6,692,450 B1 | 2/2004 | Coleman |
| 6,699,240 B2 | 3/2004 | Francischelli |
| 6,699,242 B2 | 3/2004 | Heggeness |
| 6,709,432 B2 | 3/2004 | Ferek-Patric |
| 6,718,208 B2 | 4/2004 | Hill et al. |
| 6,719,761 B1 | 4/2004 | Reiley et al. |
| 6,723,087 B2 | 4/2004 | O'Neill et al. |
| 6,723,094 B1 | 4/2004 | Desinger |
| 6,726,684 B1 | 4/2004 | Woloszko et al. |
| 6,736,810 B2 | 5/2004 | Hoey et al. |
| 6,736,835 B2 | 5/2004 | Pelegrino et al. |
| 6,745,079 B2 | 6/2004 | King |
| 6,746,447 B2 | 6/2004 | Davison et al. |
| 6,746,451 B2 | 6/2004 | Middleton et al. |
| 6,749,604 B1 | 6/2004 | Eggers et al. |
| 6,758,846 B2 | 7/2004 | Goble et al. |
| 6,770,071 B2 | 8/2004 | Woloszko et al. |
| 6,772,012 B2 | 8/2004 | Ricart et al. |
| 6,773,431 B2 | 8/2004 | Eggers et al. |
| 6,795,737 B2 | 9/2004 | Gielen et al. |
| 6,805,697 B1 | 10/2004 | Helm et al. |
| 6,827,715 B2 | 12/2004 | Francischelli et al. |
| 6,827,716 B2 | 12/2004 | Ryan et al. |
| 6,832,996 B2 | 12/2004 | Woloszko et al. |
| 6,837,887 B2 | 1/2005 | Woloszko et al. |
| 6,837,888 B2 | 1/2005 | Ciarrocca et al. |
| 6,852,091 B2 | 2/2005 | Edwards et al. |
| 6,863,672 B2 | 3/2005 | Reiley et al. |
| 6,875,219 B2 | 4/2005 | Arramon et al. |
| 6,881,214 B2 | 4/2005 | Cosman et al. |
| 6,896,674 B1 | 5/2005 | Woloszko et al. |
| 6,896,675 B2 | 5/2005 | Leung et al. |
| 6,907,884 B2 | 6/2005 | Pellegrino et al. |
| 6,915,806 B2 | 7/2005 | Pacek et al. |
| 6,922,579 B2 | 7/2005 | Taimisto et al. |
| 6,923,813 B2 | 8/2005 | Phillips et al. |
| 6,936,046 B2 | 8/2005 | Hissong et al. |
| 6,955,674 B2 | 10/2005 | Eick et al. |
| 6,960,204 B2 | 11/2005 | Eggers et al. |
| 6,962,589 B2 | 11/2005 | Mulier et al. |
| 6,974,453 B2 | 12/2005 | Woloszko et al. |
| 6,980,849 B2 | 12/2005 | Sasso |
| 6,981,981 B2 | 1/2006 | Reiley et al. |
| 6,989,010 B2 | 1/2006 | Francischelli et al. |
| 6,997,941 B2 | 2/2006 | Sharkey et al. |
| 7,001,383 B2 | 2/2006 | Keidar |
| 7,041,096 B2 | 5/2006 | Malis et al. |
| 7,044,954 B2 | 5/2006 | Reiley et al. |
| 7,048,743 B2 | 5/2006 | Miller et al. |
| 7,065,408 B2 | 6/2006 | Herman et al. |
| 7,081,122 B1 | 7/2006 | Reiley et al. |
| 7,090,672 B2 | 8/2006 | Underwood et al. |
| 7,094,215 B2 | 8/2006 | Davison et al. |
| 7,104,989 B2 | 9/2006 | Skarda |
| 7,118,574 B2 | 10/2006 | Patel et al. |
| 7,131,969 B1 | 11/2006 | Hovda et al. |
| 7,153,307 B2 | 12/2006 | Scribner et al. |
| 7,163,536 B2 | 1/2007 | Godara |
| 7,177,678 B1 | 2/2007 | Osorio et al. |
| 7,179,255 B2 | 2/2007 | Lettice et al. |
| 7,186,234 B2 | 3/2007 | Dahla et al. |
| 7,192,428 B2 | 3/2007 | Eggers et al. |
| 7,201,731 B1 | 4/2007 | Lundquist et al. |
| 7,201,750 B1 | 4/2007 | Eggers et al. |
| 7,211,055 B2 | 5/2007 | Diederich et al. |
| 7,217,268 B2 | 5/2007 | Eggers et al. |
| 7,238,184 B2 | 7/2007 | Megerman et al. |
| 7,241,297 B2 | 7/2007 | Shaolian et al. |
| 7,250,048 B2 | 7/2007 | Francischelli et al. |
| 7,258,690 B2 | 8/2007 | Sutton et al. |
| 7,270,659 B2 | 9/2007 | Ricart et al. |
| 7,270,661 B2 | 9/2007 | Dahla et al. |
| 7,276,063 B2 | 10/2007 | Davison et al. |
| 7,294,127 B2 | 11/2007 | Leung et al. |
| 7,305,264 B2 | 12/2007 | Larson et al. |
| 7,306,596 B2 | 12/2007 | Hillier et al. |
| 7,306,598 B2 | 12/2007 | Truckai et al. |
| 7,318,823 B2 | 1/2008 | Sharps et al. |
| 7,318,826 B2 | 1/2008 | Teitelbaum et al. |
| 7,326,203 B2 | 2/2008 | Papineau et al. |
| 7,331,956 B2 | 2/2008 | Hovda et al. |
| 7,331,957 B2 | 2/2008 | Woloszko et al. |
| RE40,156 E | 3/2008 | Sharps et al. |
| 7,346,391 B1 | 3/2008 | Osorio et al. |
| 7,386,350 B2 | 6/2008 | Vilims |
| 7,387,625 B2 | 6/2008 | Hovda et al. |
| 7,393,351 B2 | 7/2008 | Woloszko et al. |
| 7,399,306 B2 | 7/2008 | Reiley et al. |
| 7,422,585 B1 | 9/2008 | Eggers et al. |
| 7,429,262 B2 | 9/2008 | Woloszko et al. |
| 7,435,247 B2 | 10/2008 | Woloszko et al. |
| 7,435,250 B2 | 10/2008 | Francischelli et al. |
| 7,442,191 B2 | 10/2008 | Hovda et al. |
| 7,468,059 B2 | 12/2008 | Eggers et al. |
| 7,480,533 B2 | 1/2009 | Cosman et al. |
| 7,502,652 B2 | 3/2009 | Gaunt et al. |
| 7,503,920 B2 | 3/2009 | Siegal |
| 7,503,921 B2 | 3/2009 | Siegal |
| 7,507,236 B2 | 3/2009 | Eggers et al. |

(56) References Cited

U.S. PATENT DOCUMENTS

| | | |
|---|---|---|
| 7,546,164 B2 | 6/2009 | King |
| 7,553,307 B2 | 6/2009 | Bleich et al. |
| 7,553,309 B2 | 6/2009 | Buysse et al. |
| 7,555,343 B2 | 6/2009 | Bleich |
| 7,559,932 B2 | 7/2009 | Truckai et al. |
| 7,569,626 B2 | 8/2009 | Truckai |
| 7,574,257 B2 | 8/2009 | Rittman, III |
| 7,585,300 B2 | 9/2009 | Cha |
| 7,593,778 B2 | 9/2009 | Chandran et al. |
| 7,594,913 B2 | 9/2009 | Ormsby et al. |
| 7,604,636 B1 | 10/2009 | Walters et al. |
| 7,621,952 B2 | 11/2009 | Truckai et al. |
| 7,645,277 B2 | 1/2010 | McClurken et al. |
| 7,678,111 B2 | 3/2010 | Mulier et al. |
| 7,678,116 B2 | 3/2010 | Truckai et al. |
| 7,682,378 B2 | 3/2010 | Truckai et al. |
| 7,708,733 B2 | 5/2010 | Sanders et al. |
| 7,717,918 B2 | 5/2010 | Truckai et al. |
| 7,722,620 B2 | 5/2010 | Truckai et al. |
| 7,731,720 B2 | 6/2010 | Sand et al. |
| 7,738,968 B2 | 6/2010 | Bleich |
| 7,740,631 B2 | 6/2010 | Bleich et al. |
| 7,749,218 B2 | 7/2010 | Pellegrino et al. |
| 7,749,220 B2 | 7/2010 | Schmaltz et al. |
| 7,780,733 B2 | 8/2010 | Carver et al. |
| 7,792,588 B2 | 9/2010 | Harding |
| 7,799,021 B2 | 9/2010 | Leung et al. |
| 7,819,826 B2 | 10/2010 | Diederich et al. |
| 7,819,869 B2 | 10/2010 | Godara et al. |
| 7,824,398 B2 | 11/2010 | Woloszko et al. |
| 7,824,404 B2 | 11/2010 | Godara et al. |
| 7,828,804 B2 | 11/2010 | Li et al. |
| 7,846,156 B2 | 12/2010 | Malis et al. |
| 7,850,685 B2 | 12/2010 | Kunis et al. |
| 7,853,326 B2 | 12/2010 | Rittman, III |
| 7,857,813 B2 | 12/2010 | Schmitz et al. |
| 7,879,032 B1 | 2/2011 | Garito et al. |
| 7,887,534 B2 | 2/2011 | Hamel et al. |
| 7,887,543 B2 | 2/2011 | Sand et al. |
| 7,892,235 B2 | 2/2011 | Ellis |
| 7,896,870 B2 | 3/2011 | Arless et al. |
| 7,896,909 B2 | 3/2011 | Sharkey et al. |
| 7,901,403 B2 | 3/2011 | Woloszko et al. |
| 7,909,827 B2 | 3/2011 | Reiley et al. |
| 7,909,873 B2 | 3/2011 | Tan-Malecki et al. |
| 7,914,526 B2 | 3/2011 | Lehmann et al. |
| 7,914,535 B2 | 3/2011 | Assell et al. |
| 7,917,222 B1 | 3/2011 | Osorio et al. |
| 7,918,849 B2 | 4/2011 | Bleich et al. |
| 7,918,874 B2 | 4/2011 | Siegal |
| 7,938,835 B2 | 5/2011 | Boucher et al. |
| 7,945,331 B2 | 5/2011 | Vilims |
| 7,951,140 B2 | 5/2011 | Arless et al. |
| 7,959,634 B2 | 6/2011 | Sennett |
| 7,963,915 B2 | 6/2011 | Bleich |
| 7,967,827 B2 | 6/2011 | Osorio et al. |
| 7,972,340 B2 | 7/2011 | Sand et al. |
| 8,000,785 B2 | 8/2011 | Ritmann, III |
| 8,021,401 B2 | 9/2011 | Carl et al. |
| 8,025,688 B2 | 9/2011 | Diederich et al. |
| 8,034,052 B2 | 10/2011 | Podhajsky |
| 8,034,071 B2 | 10/2011 | Scribner et al. |
| 8,043,287 B2 | 10/2011 | Conquergood et al. |
| 8,048,030 B2 | 11/2011 | McGuckin, Jr. et al. |
| 8,048,071 B2 | 11/2011 | Youssef et al. |
| 8,048,083 B2 | 11/2011 | Shadduck et al. |
| 8,052,661 B2 | 11/2011 | McGuckin, Jr. et al. |
| 8,062,290 B2 | 11/2011 | Buysse et al. |
| 8,066,702 B2 | 11/2011 | Rittman, III et al. |
| 8,066,712 B2 | 11/2011 | Truckai et al. |
| 8,070,753 B2 | 12/2011 | Truckai et al. |
| 8,082,043 B2 | 12/2011 | Sharkey et al. |
| 8,083,736 B2 | 12/2011 | McClurken et al. |
| 8,092,456 B2 | 1/2012 | Bleich et al. |
| 8,096,957 B2 | 1/2012 | Conquergood et al. |
| 8,100,896 B2 | 1/2012 | Podhajsky |
| 8,109,933 B2 | 2/2012 | Truckai et al. |
| 8,123,750 B2 | 2/2012 | Norton et al. |
| 8,123,756 B2 | 2/2012 | Miller et al. |
| 8,128,619 B2 | 3/2012 | Sharkey et al. |
| 8,128,633 B2 | 3/2012 | Linderman et al. |
| 8,162,933 B2 | 4/2012 | Francischelli et al. |
| 8,163,031 B2 | 4/2012 | Truckai et al. |
| 8,172,846 B2 | 5/2012 | Brunnett et al. |
| 8,182,477 B2 | 5/2012 | Orszulak et al. |
| 8,187,268 B2 | 5/2012 | Godara et al. |
| 8,187,312 B2 | 5/2012 | Sharkey et al. |
| 8,192,424 B2 | 6/2012 | Woloszko et al. |
| 8,192,435 B2 | 6/2012 | Bleich et al. |
| 8,192,442 B2 | 6/2012 | Truckai et al. |
| 8,216,223 B2 | 7/2012 | Wham et al. |
| 8,226,697 B2 | 7/2012 | Sharkey et al. |
| 8,231,616 B2 | 7/2012 | McPherson et al. |
| 8,241,335 B2 | 8/2012 | Truckai et al. |
| 8,246,627 B2 | 8/2012 | Vanleeuwen et al. |
| 8,265,747 B2 | 9/2012 | Rittman, III et al. |
| 8,282,628 B2 | 10/2012 | Paul et al. |
| 8,292,882 B2 | 10/2012 | Danek et al. |
| 8,292,887 B2 | 10/2012 | Woloszko et al. |
| 8,323,277 B2 | 12/2012 | Vilims |
| 8,323,279 B2 | 12/2012 | Dahla et al. |
| 8,343,146 B2 | 1/2013 | Godara et al. |
| 8,348,946 B2 | 1/2013 | McClurken et al. |
| 8,348,955 B2 | 1/2013 | Truckai et al. |
| 8,355,799 B2 | 1/2013 | Marion et al. |
| 8,361,063 B2 | 1/2013 | Godara |
| 8,361,067 B2 | 1/2013 | Pellegrino et al. |
| 8,406,886 B2 | 3/2013 | Gaunt et al. |
| 8,409,289 B2 | 4/2013 | Truckai et al. |
| 8,414,509 B2 | 4/2013 | Diederich et al. |
| 8,414,571 B2 | 4/2013 | Pellegrino et al. |
| 8,419,730 B2 | 4/2013 | Pellegrino et al. |
| 8,419,731 B2 | 4/2013 | Pellegrino et al. |
| 8,425,430 B2 | 4/2013 | Pond, Jr. et al. |
| 8,425,507 B2 | 4/2013 | Pellegrino et al. |
| 8,430,881 B2 | 4/2013 | Bleich et al. |
| 8,430,887 B2 | 4/2013 | Truckai et al. |
| 8,444,636 B2 | 5/2013 | Shadduck et al. |
| 8,444,640 B2 | 5/2013 | Demarais et al. |
| 8,454,594 B2 | 6/2013 | Demarais et al. |
| 8,460,382 B2 | 6/2013 | Helm et al. |
| 8,475,449 B2 | 7/2013 | Werneth et al. |
| 8,486,063 B2 | 7/2013 | Werneth et al. |
| 8,487,021 B2 | 7/2013 | Truckai et al. |
| 8,504,147 B2 | 8/2013 | Deem et al. |
| 8,505,545 B2 | 8/2013 | Conquergood et al. |
| 8,518,036 B2 | 8/2013 | Leung et al. |
| 8,523,871 B2 | 9/2013 | Truckai et al. |
| 8,535,309 B2 | 9/2013 | Pellegrino et al. |
| 8,540,723 B2 | 9/2013 | Shadduck et al. |
| 8,556,891 B2 | 10/2013 | Mathur |
| 8,556,910 B2 | 10/2013 | Truckai et al. |
| 8,556,911 B2 | 10/2013 | Mehta et al. |
| 8,560,062 B2 | 10/2013 | Rittman, III et al. |
| 8,562,598 B2 | 10/2013 | Falkenstein et al. |
| 8,562,607 B2 | 10/2013 | Truckai et al. |
| 8,562,620 B2 | 10/2013 | Truckai et al. |
| 8,579,903 B2 | 11/2013 | Carl |
| 8,585,694 B2 | 11/2013 | Amoah et al. |
| 8,591,507 B2 | 11/2013 | Kramer et al. |
| 8,597,301 B2 | 12/2013 | Mitchell |
| 8,603,088 B2 | 12/2013 | Stern et al. |
| 8,613,744 B2 | 12/2013 | Pellegrino et al. |
| 8,617,156 B2 | 12/2013 | Werneth et al. |
| 8,623,014 B2 | 1/2014 | Pellegrino et al. |
| 8,623,025 B2 | 1/2014 | Tan-Malecki et al. |
| 8,628,528 B2 | 1/2014 | Pellegrino et al. |
| 8,636,736 B2 | 1/2014 | Yates et al. |
| 8,644,941 B2 | 2/2014 | Rooney et al. |
| 8,657,814 B2 | 2/2014 | Werneth et al. |
| 8,663,266 B1 | 3/2014 | Obsuth |
| 8,672,934 B2 | 3/2014 | Benamou et al. |
| 8,676,309 B2 | 3/2014 | Deem et al. |
| 8,679,023 B2 | 3/2014 | Kobayashi et al. |

(56) References Cited

U.S. PATENT DOCUMENTS

| | | |
|---|---|---|
| 8,690,884 B2 | 4/2014 | Linderman et al. |
| 8,696,679 B2 | 4/2014 | Shadduck et al. |
| RE44,883 E | 5/2014 | Cha |
| 8,740,897 B2 | 6/2014 | Leung et al. |
| 8,747,359 B2 | 6/2014 | Pakter et al. |
| 8,747,398 B2 | 6/2014 | Behnke |
| 8,758,349 B2 | 6/2014 | Germain et al. |
| 8,764,761 B2 | 7/2014 | Truckai et al. |
| 8,771,265 B2 | 7/2014 | Truckai |
| 8,771,276 B2 | 7/2014 | Linderman |
| 8,774,913 B2 | 7/2014 | Demarais et al. |
| 8,774,924 B2 | 7/2014 | Weiner |
| 8,777,479 B2 | 7/2014 | Kwan et al. |
| 8,784,411 B2 | 7/2014 | Leuthardt et al. |
| 8,795,270 B2 | 8/2014 | Drake |
| 8,808,161 B2 | 8/2014 | Gregg et al. |
| 8,808,284 B2 | 8/2014 | Pellegrino et al. |
| 8,814,873 B2 | 8/2014 | Schaller et al. |
| 8,818,503 B2 | 8/2014 | Rittman, III |
| 8,821,488 B2 | 9/2014 | Stewart et al. |
| 8,828,001 B2 | 9/2014 | Stearns et al. |
| 8,845,631 B2 | 9/2014 | Werneth et al. |
| 8,864,759 B2 | 10/2014 | Godara et al. |
| 8,864,760 B2 | 10/2014 | Kramer et al. |
| 8,864,777 B2 | 10/2014 | Harrison et al. |
| 8,880,189 B2 | 11/2014 | Lipani |
| 8,882,755 B2 | 11/2014 | Leung et al. |
| 8,882,759 B2 | 11/2014 | Manley et al. |
| 8,882,764 B2 | 11/2014 | Pellegrino et al. |
| 8,894,658 B2 | 11/2014 | Linderman et al. |
| 8,911,497 B2 | 12/2014 | Chavatte et al. |
| 8,915,949 B2 | 12/2014 | Diederich et al. |
| 8,926,620 B2 | 1/2015 | Chasmawala et al. |
| 8,932,300 B2 | 1/2015 | Shadduck et al. |
| 8,939,969 B2 | 1/2015 | Temelli et al. |
| 8,968,288 B2 | 3/2015 | Brannan |
| 8,989,859 B2 | 3/2015 | Deem et al. |
| 8,992,521 B2 | 3/2015 | VanWyk |
| 8,992,522 B2 | 3/2015 | Pellegrino et al. |
| 8,992,523 B2 | 3/2015 | Pellegrino et al. |
| 8,992,524 B1 | 3/2015 | Ellman |
| 9,005,210 B2 | 4/2015 | Truckai et al. |
| 9,008,793 B1 | 4/2015 | Cosman, Sr. et al. |
| 9,017,325 B2 | 4/2015 | Pellegrino et al. |
| 9,023,038 B2 | 5/2015 | Pellegrino et al. |
| 9,028,488 B2 | 5/2015 | Goshayeshgar |
| 9,028,538 B2 | 5/2015 | Paul et al. |
| 9,039,701 B2 | 5/2015 | Pellegrino et al. |
| 9,044,245 B2 | 6/2015 | Condie et al. |
| 9,044,254 B2 | 6/2015 | Ladtkow et al. |
| 9,044,575 B2 | 6/2015 | Beasley et al. |
| 9,050,109 B2 | 6/2015 | Smith |
| 9,050,112 B2 | 6/2015 | Greenhalgh et al. |
| 9,066,769 B2 | 6/2015 | Truckai et al. |
| 9,078,761 B2 | 7/2015 | Godara et al. |
| 9,095,359 B2 | 8/2015 | Robert et al. |
| 9,113,896 B2 | 8/2015 | Mulier et al. |
| 9,113,911 B2 | 8/2015 | Sherman |
| 9,113,925 B2 | 8/2015 | Smith et al. |
| 9,113,950 B2 | 8/2015 | Schutlz et al. |
| 9,113,974 B2 | 8/2015 | Germain |
| 9,119,623 B2 | 9/2015 | Malis et al. |
| 9,119,639 B2 | 9/2015 | Kuntz |
| 9,119,647 B2 | 9/2015 | Brannan |
| 9,119,650 B2 | 9/2015 | Brannan et al. |
| 9,125,671 B2 | 9/2015 | Germain et al. |
| 9,131,597 B2 | 9/2015 | Taft et al. |
| 9,149,652 B2 | 10/2015 | Wenz et al. |
| 9,151,680 B2 | 10/2015 | Brannan |
| 9,155,895 B2 | 10/2015 | Wacnik et al. |
| 9,161,735 B2 | 10/2015 | Bradford et al. |
| 9,161,797 B2 | 10/2015 | Truckai et al. |
| 9,161,798 B2 | 10/2015 | Truckai et al. |
| 9,161,805 B2 | 10/2015 | Isenberg |
| 9,161,809 B2 | 10/2015 | Germain et al. |
| 9,161,814 B2 | 10/2015 | Brannan et al. |
| 9,168,047 B2 | 10/2015 | To et al. |
| 9,168,054 B2 | 10/2015 | Turner et al. |
| 9,168,078 B2 | 10/2015 | Linderman et al. |
| 9,168,085 B2 | 10/2015 | Juzkiw |
| 9,173,676 B2 | 11/2015 | Pellegrino et al. |
| 9,173,700 B2 | 11/2015 | Godara et al. |
| 9,179,970 B2 | 11/2015 | Utley et al. |
| 9,179,972 B2 | 11/2015 | Olson |
| 9,180,416 B2 | 11/2015 | Phan et al. |
| 9,186,197 B2 | 11/2015 | McKay |
| 9,192,308 B2 | 11/2015 | Brannan et al. |
| 9,192,397 B2 | 11/2015 | Sennett et al. |
| 9,198,684 B2 | 12/2015 | Arthur et al. |
| 9,216,053 B2 | 12/2015 | Godara et al. |
| 9,216,195 B2 | 12/2015 | Truckai et al. |
| 9,226,756 B2 | 1/2016 | Teisen et al. |
| 9,232,954 B2 | 1/2016 | Steiner et al. |
| 9,237,916 B2 | 1/2016 | Crainich et al. |
| 9,238,139 B2 | 1/2016 | Degiorgio et al. |
| 9,241,057 B2 | 1/2016 | Van Wyk et al. |
| 9,241,729 B2 | 1/2016 | Kuntz et al. |
| 9,241,760 B2 | 1/2016 | Godara et al. |
| 9,247,970 B2 | 2/2016 | Teisen |
| 9,247,992 B2 | 2/2016 | Ladtkow et al. |
| 9,247,993 B2 | 2/2016 | Ladtkow et al. |
| 9,248,278 B2 | 2/2016 | Crosby et al. |
| 9,248,289 B2 | 2/2016 | Bennett et al. |
| 9,254,168 B2 | 2/2016 | Palanker |
| 9,254,386 B2 | 2/2016 | Lee et al. |
| 9,259,241 B2 | 2/2016 | Pellegrino et al. |
| 9,259,248 B2 | 2/2016 | Leuthardt et al. |
| 9,259,269 B2 | 2/2016 | Ladtkow et al. |
| 9,259,569 B2 | 2/2016 | Brounstein et al. |
| 9,259,577 B2 | 2/2016 | Kaula et al. |
| 9,265,522 B2 | 2/2016 | Pellegrino et al. |
| 9,265,557 B2 | 2/2016 | Sherman et al. |
| 9,277,969 B2 | 3/2016 | Brannan et al. |
| 9,282,979 B2 | 3/2016 | O'Neil et al. |
| 9,282,988 B2 | 3/2016 | Goshayeshgar |
| 9,283,015 B2 | 3/2016 | Tan-Malecki et al. |
| 9,289,607 B2 | 3/2016 | Su et al. |
| 9,295,479 B2 | 3/2016 | Hibri et al. |
| 9,295,517 B2 | 3/2016 | Peyman et al. |
| 9,295,841 B2 | 3/2016 | Fang et al. |
| 9,301,723 B2 | 4/2016 | Brannan et al. |
| 9,301,804 B2 | 4/2016 | Bonn |
| 9,302,117 B2 | 4/2016 | De Vincentiis |
| 9,308,036 B2 | 4/2016 | Robinson |
| 9,308,045 B2 | 4/2016 | Kim et al. |
| 9,314,252 B2 | 4/2016 | Schaller et al. |
| 9,314,613 B2 | 4/2016 | Mashiach |
| 9,314,618 B2 | 4/2016 | Imran et al. |
| 9,333,033 B2 | 5/2016 | Gliner |
| 9,333,144 B2 | 5/2016 | Baxter et al. |
| 9,333,339 B2 | 5/2016 | Weiner |
| 9,333,361 B2 | 5/2016 | Li et al. |
| 9,333,373 B2 | 5/2016 | Imran |
| 9,339,655 B2 | 5/2016 | Carbunaru |
| 9,345,530 B2 | 5/2016 | Ballakur et al. |
| 9,345,537 B2 | 5/2016 | Harrison et al. |
| 9,345,538 B2 | 5/2016 | Deem et al. |
| 9,351,739 B2 | 5/2016 | Mahoney et al. |
| 9,358,059 B2 | 6/2016 | Linderman et al. |
| 9,358,067 B2 | 6/2016 | Lee et al. |
| 9,358,396 B2 | 6/2016 | Holley |
| 9,364,242 B2 | 6/2016 | Tornier et al. |
| 9,364,286 B2 | 6/2016 | Werneth et al. |
| 9,370,348 B2 | 6/2016 | Tally et al. |
| 9,370,373 B2 | 6/2016 | Smith |
| 9,370,392 B2 | 6/2016 | Sharonov |
| 9,370,398 B2 | 6/2016 | Ladtkow et al. |
| 9,375,274 B2 | 6/2016 | Reid |
| 9,375,275 B2 | 6/2016 | Lee et al. |
| 9,375,278 B2 | 6/2016 | Robert et al. |
| 9,375,279 B2 | 6/2016 | Brannan |
| 9,375,283 B2 | 6/2016 | Arts et al. |
| 9,381,024 B2 | 7/2016 | Globerman et al. |
| 9,381,045 B2 | 7/2016 | Donner et al. |

(56) References Cited

U.S. PATENT DOCUMENTS

| | | |
|---|---|---|
| 9,381,050 B2 | 7/2016 | Lee et al. |
| 9,381,359 B2 | 7/2016 | Parramon et al. |
| 9,387,094 B2 | 7/2016 | Manrique et al. |
| 9,393,416 B2 | 7/2016 | Rooney et al. |
| 9,398,931 B2 | 7/2016 | Wittenberger et al. |
| 9,399,144 B2 | 7/2016 | Howard |
| 9,403,038 B2 | 8/2016 | Tyler |
| 9,409,023 B2 | 8/2016 | Burdick et al. |
| 9,414,884 B2 | 8/2016 | Faehndrich et al. |
| 9,421,057 B2 | 8/2016 | Germain |
| 9,421,064 B2 | 8/2016 | Pellegrino et al. |
| 9,421,123 B2 | 8/2016 | Lee et al. |
| 9,421,371 B2 | 8/2016 | Pless et al. |
| 9,421,378 B2 | 8/2016 | Lian et al. |
| 9,439,693 B2 | 9/2016 | Childs et al. |
| 9,439,721 B2 | 9/2016 | Werneth et al. |
| 9,445,859 B2 | 9/2016 | Pageard |
| 9,446,229 B2 | 9/2016 | Omar-Pasha |
| 9,446,235 B2 | 9/2016 | Su et al. |
| 9,452,286 B2 | 9/2016 | Cowan et al. |
| 9,456,836 B2 | 10/2016 | Boling et al. |
| 9,457,182 B2 | 10/2016 | Koop |
| 9,468,485 B2 | 10/2016 | Wittenberger et al. |
| 9,468,495 B2 | 10/2016 | Kunis et al. |
| 9,474,565 B2 | 10/2016 | Shikhman et al. |
| 9,474,906 B2 | 10/2016 | Sachs et al. |
| 9,480,485 B2 | 11/2016 | Aho et al. |
| 9,486,279 B2 | 11/2016 | Pellegrino et al. |
| 9,486,447 B2 | 11/2016 | Peterson et al. |
| 9,486,621 B2 | 11/2016 | Howard et al. |
| 9,492,657 B2 | 11/2016 | Gerber |
| 9,492,664 B2 | 11/2016 | Peterson |
| 9,504,372 B2 | 11/2016 | Kim |
| 9,504,481 B2 | 11/2016 | Germain et al. |
| 9,504,506 B2 | 11/2016 | Crainich et al. |
| 9,504,518 B2 | 11/2016 | Condie et al. |
| 9,504,530 B2 | 11/2016 | Hartmann et al. |
| 9,504,818 B2 | 11/2016 | Moffitt et al. |
| 9,511,229 B2 | 12/2016 | Bradley |
| 9,511,231 B1 | 12/2016 | Kent et al. |
| 9,513,761 B2 | 12/2016 | Shikhman et al. |
| 9,517,077 B2 | 12/2016 | Blain et al. |
| 9,517,200 B2 | 12/2016 | Bleier |
| 9,526,507 B2 | 12/2016 | Germain |
| 9,526,551 B2 | 12/2016 | Linderman |
| 9,526,559 B2 | 12/2016 | Banamou et al. |
| 9,532,828 B2 | 1/2017 | Condie et al. |
| 9,545,283 B2 | 1/2017 | Sack et al. |
| 9,549,772 B2 | 1/2017 | Carl |
| 9,550,041 B2 | 1/2017 | Bedell |
| 9,555,037 B2 | 1/2017 | Podhajsky |
| 9,556,101 B2 | 1/2017 | Robertson et al. |
| 9,556,449 B2 | 1/2017 | Basu et al. |
| 9,566,108 B2 | 2/2017 | Brustad et al. |
| 9,566,449 B2 | 2/2017 | Perryman et al. |
| 9,572,976 B2 | 2/2017 | Howard et al. |
| 9,572,986 B2 | 2/2017 | Moffitt |
| 9,579,127 B2 | 2/2017 | Kostuik et al. |
| 9,579,518 B2 | 2/2017 | Gertner |
| 9,597,091 B2 | 3/2017 | Bromer |
| 9,597,148 B2 | 3/2017 | Olson |
| RE46,356 E | 4/2017 | Pellegrino et al. |
| 9,610,083 B2 | 4/2017 | Kuntz |
| 9,610,117 B2 | 4/2017 | Germain |
| 9,636,175 B2 | 5/2017 | Stern et al. |
| 9,642,629 B2 | 5/2017 | Griffiths et al. |
| 9,649,116 B2 | 5/2017 | Germain |
| 9,675,408 B2 | 6/2017 | Godara et al. |
| 9,681,889 B1 | 6/2017 | Greenhalgh et al. |
| 9,687,255 B2 | 6/2017 | Sennett et al. |
| 9,717,551 B2 | 8/2017 | Krueger et al. |
| 9,724,107 B2 | 8/2017 | Pellegrino et al. |
| 9,724,151 B2 | 8/2017 | Edidin |
| 9,730,707 B2 | 8/2017 | Sasaki et al. |
| 9,743,854 B2 | 8/2017 | Stewart et al. |
| 9,743,938 B2 | 8/2017 | Germain et al. |
| 9,750,560 B2 | 9/2017 | Ballakur et al. |
| 9,750,570 B2 | 9/2017 | Condie et al. |
| 9,757,193 B2 | 9/2017 | Zarins et al. |
| 9,770,280 B2 | 9/2017 | Diederich et al. |
| 9,775,627 B2 | 10/2017 | Patel et al. |
| 9,782,221 B2 | 10/2017 | Srinivasan |
| 9,795,802 B2 | 10/2017 | Mohamed et al. |
| 9,814,514 B2 | 11/2017 | Shelton, IV et al. |
| 9,826,985 B2 | 11/2017 | Slobitker et al. |
| 9,844,406 B2 | 12/2017 | Edwards et al. |
| 9,848,890 B2 | 12/2017 | Yoon et al. |
| 9,848,944 B2 | 12/2017 | Sutton et al. |
| 9,872,687 B2 | 1/2018 | Tornier et al. |
| 9,872,691 B2 | 1/2018 | Griffiths et al. |
| 9,877,707 B2 | 1/2018 | Godara et al. |
| 9,901,392 B2 | 2/2018 | Phan et al. |
| 9,913,675 B2 | 3/2018 | Germain |
| 9,918,786 B2 | 3/2018 | Wang et al. |
| 9,980,771 B2 | 5/2018 | Carter et al. |
| 9,993,285 B2 | 6/2018 | Govari et al. |
| 10,022,140 B2 | 7/2018 | Germain et al. |
| 10,028,753 B2 | 7/2018 | Pellegrino et al. |
| 10,028,784 B2 | 7/2018 | Kramer et al. |
| 10,052,152 B2 | 8/2018 | Tegg et al. |
| 10,052,153 B2 | 8/2018 | Olson |
| 10,058,336 B2 | 8/2018 | Truckai et al. |
| 10,105,175 B2 | 10/2018 | Godara et al. |
| 10,111,674 B2 | 10/2018 | Crainich et al. |
| 10,111,704 B2 | 10/2018 | Pellegrino et al. |
| 10,123,809 B2 | 11/2018 | Germain |
| 10,159,497 B2 | 12/2018 | Kuntz et al. |
| 10,245,092 B2 | 4/2019 | Germain |
| 10,265,099 B2 | 4/2019 | Pellegrino et al. |
| 10,272,271 B2 | 4/2019 | Diederich et al. |
| 10,292,716 B2 | 5/2019 | Aho et al. |
| 10,292,719 B2 | 5/2019 | Burger et al. |
| 10,299,805 B2 | 5/2019 | Germain et al. |
| 10,314,633 B2 | 6/2019 | Linderman et al. |
| 10,327,841 B2 | 6/2019 | Germain |
| 10,357,258 B2 | 7/2019 | Patel et al. |
| 10,357,307 B2 | 7/2019 | Harrison et al. |
| 10,376,271 B2 | 8/2019 | Mehta et al. |
| 10,383,641 B2 | 8/2019 | LeRoy et al. |
| 10,390,877 B2 | 8/2019 | Heggeness et al. |
| 10,441,295 B2 | 10/2019 | Brockman et al. |
| 10,441,354 B2 | 10/2019 | Govari et al. |
| 10,448,995 B2 | 10/2019 | Olson |
| 10,456,187 B2 | 10/2019 | Edidin |
| 10,463,380 B2 | 11/2019 | Purdy et al. |
| 10,463,423 B2 | 11/2019 | Sutton et al. |
| 10,470,781 B2 | 11/2019 | Purdy et al. |
| 10,478,241 B2 | 11/2019 | Purdy et al. |
| 10,478,246 B2 | 11/2019 | Pellegrino et al. |
| 10,493,247 B2 | 12/2019 | Goshayeshgar |
| 10,499,960 B2 | 12/2019 | Sinnott et al. |
| 10,517,611 B2 | 12/2019 | Patel et al. |
| 10,524,805 B2 | 1/2020 | Zilberman et al. |
| 10,582,966 B2 | 3/2020 | Orczy-Timko et al. |
| 10,588,691 B2 | 3/2020 | Pellegino et al. |
| 10,589,131 B2 | 3/2020 | Diederich et al. |
| 10,603,522 B2 | 3/2020 | Diederich et al. |
| 10,624,652 B2 | 4/2020 | Germain et al. |
| 10,660,656 B2 | 5/2020 | Purdy et al. |
| 10,835,234 B2 | 11/2020 | Harari et al. |
| 10,849,613 B2 | 12/2020 | Rosner et al. |
| 10,864,040 B2 | 12/2020 | Dastjerdi et al. |
| 10,898,254 B2 | 1/2021 | Diederich et al. |
| 10,905,440 B2 | 2/2021 | Pellegrino et al. |
| 10,918,363 B2 | 2/2021 | Godara et al. |
| RE48,460 E | 3/2021 | Pellegrino et al. |
| 10,952,771 B2 | 3/2021 | Pellegrino |
| 11,007,010 B2 | 5/2021 | Donovan et al. |
| 11,026,734 B2 | 6/2021 | Truckai et al. |
| 11,026,744 B2 | 6/2021 | Purdy et al. |
| 11,052,267 B2 | 7/2021 | Diederich et al. |
| 11,065,046 B2 | 7/2021 | Edidin |
| 11,116,570 B2 | 9/2021 | Purdy et al. |
| 11,123,103 B2 | 9/2021 | Donovan et al. |

(56) References Cited

U.S. PATENT DOCUMENTS

| | | |
|---|---|---|
| 11,147,684 B2 | 10/2021 | Neubardt |
| 11,160,503 B2 | 11/2021 | Peesapati et al. |
| 11,160,563 B2 | 11/2021 | Patel et al. |
| 11,166,747 B2 | 11/2021 | Brockman et al. |
| 11,191,575 B2 | 12/2021 | Kidman et al. |
| 11,207,100 B2 | 12/2021 | Donovan et al. |
| 11,224,475 B2 | 1/2022 | Godara et al. |
| 11,234,764 B1 | 2/2022 | Patel et al. |
| 11,259,818 B2 | 3/2022 | Brockman et al. |
| 11,291,502 B2 | 4/2022 | Patel et al. |
| 11,344,350 B2 | 5/2022 | Purdy et al. |
| 11,364,069 B2 | 6/2022 | Heggeness |
| 11,376,021 B2 | 7/2022 | Marino et al. |
| 11,389,181 B2 | 7/2022 | Dutertre et al. |
| 11,419,614 B2 | 8/2022 | Weitzman et al. |
| 11,426,199 B2 | 8/2022 | Donovan et al. |
| 11,471,171 B2 | 10/2022 | Pellegrino et al. |
| 11,471,210 B2 | 10/2022 | Pellegrino et al. |
| 11,497,543 B2 | 11/2022 | Sprinkle et al. |
| 11,510,723 B2 | 11/2022 | Defosset et al. |
| 11,596,468 B2 | 3/2023 | Pellegrino et al. |
| 11,690,667 B2 | 7/2023 | Pellegrino et al. |
| 2001/0001314 A1 | 5/2001 | Davison et al. |
| 2001/0001811 A1 | 5/2001 | Burney et al. |
| 2001/0020167 A1 | 9/2001 | Woloszko et al. |
| 2001/0023348 A1 | 9/2001 | Ashley et al. |
| 2001/0025176 A1 | 9/2001 | Ellsberry et al. |
| 2001/0025177 A1 | 9/2001 | Woloszko et al. |
| 2001/0027295 A1 | 10/2001 | Dulak et al. |
| 2001/0029370 A1 | 10/2001 | Hovda et al. |
| 2001/0029373 A1 | 10/2001 | Baker et al. |
| 2001/0029393 A1 | 10/2001 | Tierney et al. |
| 2001/0032001 A1 | 10/2001 | Ricart et al. |
| 2001/0047167 A1 | 11/2001 | Heggeness |
| 2001/0049522 A1 | 12/2001 | Eggers et al. |
| 2001/0049527 A1 | 12/2001 | Cragg |
| 2001/0051802 A1 | 12/2001 | Woloszko et al. |
| 2001/0053885 A1 | 12/2001 | Gielen et al. |
| 2001/0056280 A1 | 12/2001 | Underwood et al. |
| 2002/0016583 A1 | 2/2002 | Cragg |
| 2002/0016600 A1 | 2/2002 | Cosman |
| 2002/0019626 A1 | 2/2002 | Sharkey et al. |
| 2002/0026186 A1 | 2/2002 | Woloszko et al. |
| 2002/0049438 A1 | 4/2002 | Sharkey et al. |
| 2002/0052600 A1 | 5/2002 | Davison et al. |
| 2002/0068930 A1 | 6/2002 | Tasto et al. |
| 2002/0095144 A1 | 7/2002 | Carl |
| 2002/0095151 A1 | 7/2002 | Dahla et al. |
| 2002/0095152 A1 | 7/2002 | Ciarrocca et al. |
| 2002/0099366 A1 | 7/2002 | Dahla et al. |
| 2002/0111661 A1 | 8/2002 | Cross et al. |
| 2002/0115945 A1 | 8/2002 | D'Luzansky et al. |
| 2002/0120259 A1 | 8/2002 | Lettice et al. |
| 2002/0133148 A1 | 9/2002 | Daniel et al. |
| 2002/0147444 A1 | 10/2002 | Shah et al. |
| 2002/0151885 A1 | 10/2002 | Underwood et al. |
| 2002/0165532 A1 | 11/2002 | Hill et al. |
| 2002/0183758 A1 | 12/2002 | Middleton et al. |
| 2002/0188284 A1 | 12/2002 | To et al. |
| 2002/0188290 A1 | 12/2002 | Sharkey et al. |
| 2002/0193708 A1 | 12/2002 | Thompson et al. |
| 2002/0193789 A1 | 12/2002 | Underwood et al. |
| 2003/0009164 A1 | 1/2003 | Woloszko et al. |
| 2003/0014047 A1 | 1/2003 | Woloszko et al. |
| 2003/0014088 A1 | 1/2003 | Fang et al. |
| 2003/0028147 A1 | 2/2003 | Aves et al. |
| 2003/0028189 A1 | 2/2003 | Woloszko et al. |
| 2003/0040710 A1 | 2/2003 | Polidoro |
| 2003/0040742 A1 | 2/2003 | Underwood et al. |
| 2003/0040743 A1 | 2/2003 | Cosman et al. |
| 2003/0055418 A1 | 3/2003 | Tasto et al. |
| 2003/0069569 A1 | 4/2003 | Burdette et al. |
| 2003/0083592 A1 | 5/2003 | Faciszewski |
| 2003/0084907 A1 | 5/2003 | Pacek et al. |
| 2003/0097126 A1 | 5/2003 | Woloszko et al. |
| 2003/0097129 A1 | 5/2003 | Davison et al. |
| 2003/0130655 A1 | 7/2003 | Woloszko et al. |
| 2003/0139652 A1 | 7/2003 | Kang et al. |
| 2003/0158545 A1 | 8/2003 | Hovda et al. |
| 2003/0181963 A1 | 9/2003 | Pellegrino et al. |
| 2003/0208194 A1 | 11/2003 | Hovda et al. |
| 2003/0216725 A1 | 11/2003 | Woloszko et al. |
| 2003/0216726 A1 | 11/2003 | Eggers et al. |
| 2003/0225364 A1 | 12/2003 | Kraft |
| 2004/0006339 A1 | 1/2004 | Underwood et al. |
| 2004/0015163 A1 | 1/2004 | Buysse et al. |
| 2004/0024399 A1 | 2/2004 | Sharps et al. |
| 2004/0054366 A1 | 3/2004 | Davison et al. |
| 2004/0064023 A1 | 4/2004 | Thomas et al. |
| 2004/0064136 A1 | 4/2004 | Crombie et al. |
| 2004/0064137 A1 | 4/2004 | Pellegrino et al. |
| 2004/0068242 A1 | 4/2004 | McGuckin, Jr. |
| 2004/0082942 A1 | 4/2004 | Katzman |
| 2004/0082946 A1 | 4/2004 | Malis et al. |
| 2004/0087937 A1 | 5/2004 | Eggers et al. |
| 2004/0111087 A1 | 6/2004 | Stern et al. |
| 2004/0116922 A1 | 6/2004 | Hovda et al. |
| 2004/0120668 A1 | 6/2004 | Loeb |
| 2004/0120891 A1 | 6/2004 | Hill et al. |
| 2004/0133124 A1 | 7/2004 | Bates et al. |
| 2004/0162559 A1 | 8/2004 | Arramon |
| 2004/0186544 A1 | 9/2004 | King |
| 2004/0193151 A1 | 9/2004 | To et al. |
| 2004/0193152 A1 | 9/2004 | Sutton |
| 2004/0220577 A1 | 11/2004 | Cragg et al. |
| 2004/0225228 A1 | 11/2004 | Ferree |
| 2004/0230190 A1 | 11/2004 | Dahla et al. |
| 2004/0267269 A1 | 12/2004 | Middleton et al. |
| 2005/0004634 A1 | 1/2005 | Ricart et al. |
| 2005/0010095 A1 | 1/2005 | Stewart et al. |
| 2005/0010203 A1 | 1/2005 | Edwards et al. |
| 2005/0010205 A1 | 1/2005 | Hovda et al. |
| 2005/0043737 A1 | 2/2005 | Reiley et al. |
| 2005/0055096 A1 | 3/2005 | Serhan et al. |
| 2005/0124989 A1 | 6/2005 | Suddaby |
| 2005/0177209 A1 | 8/2005 | Leung et al. |
| 2005/0177210 A1 | 8/2005 | Leung et al. |
| 2005/0177211 A1 | 8/2005 | Leung et al. |
| 2005/0182417 A1 | 8/2005 | Pagano |
| 2005/0192564 A1 | 9/2005 | Cosman et al. |
| 2005/0209610 A1 | 9/2005 | Carrison |
| 2005/0209659 A1 | 9/2005 | Pellegrino et al. |
| 2005/0216018 A1 | 9/2005 | Sennett |
| 2005/0234445 A1 | 10/2005 | Conquergood et al. |
| 2005/0261754 A1 | 11/2005 | Woloszko |
| 2005/0267552 A1 | 12/2005 | Conquergood et al. |
| 2005/0278007 A1 | 12/2005 | Godara |
| 2005/0283148 A1 | 12/2005 | Janssen et al. |
| 2006/0004369 A1 | 1/2006 | Patel et al. |
| 2006/0036264 A1 | 2/2006 | Selover et al. |
| 2006/0052743 A1 | 3/2006 | Reynolds |
| 2006/0064101 A1 | 3/2006 | Arramon |
| 2006/0095026 A1 | 5/2006 | Ricart et al. |
| 2006/0095028 A1 | 5/2006 | Bleich |
| 2006/0106375 A1 | 5/2006 | Werneth et al. |
| 2006/0106376 A1 | 5/2006 | Godara et al. |
| 2006/0122458 A1 | 6/2006 | Bleich |
| 2006/0129101 A1 | 6/2006 | McGuckin |
| 2006/0178670 A1 | 8/2006 | Woloszko et al. |
| 2006/0200121 A1 | 9/2006 | Mowery |
| 2006/0206128 A1 | 9/2006 | Conquergood et al. |
| 2006/0206129 A1 | 9/2006 | Conquergood et al. |
| 2006/0206130 A1 | 9/2006 | Conquergood et al. |
| 2006/0206132 A1 | 9/2006 | Conquergood et al. |
| 2006/0206133 A1 | 9/2006 | Conquergood et al. |
| 2006/0206134 A1 | 9/2006 | Conquergood et al. |
| 2006/0206166 A1 | 9/2006 | Weiner |
| 2006/0217736 A1 | 9/2006 | Kaneko et al. |
| 2006/0229625 A1 | 10/2006 | Truckai et al. |
| 2006/0247746 A1 | 11/2006 | Danek et al. |
| 2006/0253117 A1 | 11/2006 | Hovda et al. |
| 2006/0259026 A1 | 11/2006 | Godara et al. |
| 2006/0264957 A1 | 11/2006 | Cragg et al. |
| 2006/0264965 A1 | 11/2006 | Shadduck et al. |

(56) References Cited

U.S. PATENT DOCUMENTS

| | | |
|---|---|---|
| 2006/0265014 A1 | 11/2006 | Demarais et al. |
| 2006/0276749 A1 | 12/2006 | Selmon et al. |
| 2006/0287649 A1 | 12/2006 | Ormsby et al. |
| 2007/0021803 A1 | 1/2007 | Deem et al. |
| 2007/0027449 A1 | 2/2007 | Godara et al. |
| 2007/0055316 A1 | 3/2007 | Godara et al. |
| 2007/0066987 A1 | 3/2007 | Scanlan, Jr. et al. |
| 2007/0074719 A1 | 4/2007 | Danek et al. |
| 2007/0118142 A1 | 5/2007 | Krueger et al. |
| 2007/0129715 A1 | 6/2007 | Eggers et al. |
| 2007/0142791 A1 | 6/2007 | Yeung et al. |
| 2007/0142842 A1 | 6/2007 | Krueger et al. |
| 2007/0149966 A1 | 6/2007 | Dahla et al. |
| 2007/0179497 A1 | 8/2007 | Eggers et al. |
| 2007/0185231 A1 | 8/2007 | Liu et al. |
| 2007/0213584 A1 | 9/2007 | Kim et al. |
| 2007/0213735 A1 | 9/2007 | Saadat et al. |
| 2007/0260237 A1 | 11/2007 | Sutton et al. |
| 2008/0004621 A1 | 1/2008 | Dahla et al. |
| 2008/0004675 A1 | 1/2008 | King et al. |
| 2008/0009847 A1 | 1/2008 | Ricart et al. |
| 2008/0021447 A1 | 1/2008 | Davison et al. |
| 2008/0021463 A1 | 1/2008 | Georgy |
| 2008/0058707 A1 | 3/2008 | Ashley et al. |
| 2008/0065062 A1 | 3/2008 | Leung et al. |
| 2008/0091207 A1 | 4/2008 | Truckai et al. |
| 2008/0114364 A1 | 5/2008 | Goldin et al. |
| 2008/0119844 A1 | 5/2008 | Woloszko et al. |
| 2008/0119846 A1 | 5/2008 | Rioux |
| 2008/0132890 A1 | 6/2008 | Woloszko et al. |
| 2008/0161804 A1 | 7/2008 | Rioux et al. |
| 2008/0275458 A1 | 11/2008 | Bleich et al. |
| 2008/0281322 A1 | 11/2008 | Sherman et al. |
| 2008/0294166 A1 | 11/2008 | Goldin et al. |
| 2008/0294167 A1 | 11/2008 | Schumacher et al. |
| 2009/0030308 A1 | 1/2009 | Bradford et al. |
| 2009/0054951 A1 | 2/2009 | Leuthardt et al. |
| 2009/0069807 A1 | 3/2009 | Eggers et al. |
| 2009/0076520 A1 | 3/2009 | Choi |
| 2009/0105775 A1 | 4/2009 | Mitchell et al. |
| 2009/0112278 A1 | 4/2009 | Wingeier et al. |
| 2009/0118731 A1 | 5/2009 | Young et al. |
| 2009/0131867 A1 | 5/2009 | Liu et al. |
| 2009/0131886 A1 | 5/2009 | Liu et al. |
| 2009/0149846 A1 | 6/2009 | Hoey et al. |
| 2009/0149878 A1 | 6/2009 | Truckai et al. |
| 2009/0204192 A1 | 8/2009 | Carlton et al. |
| 2009/0222053 A1 | 9/2009 | Gaunt et al. |
| 2009/0312764 A1 | 12/2009 | Marino |
| 2010/0010392 A1 | 1/2010 | Skelton et al. |
| 2010/0016929 A1 | 1/2010 | Prochazka |
| 2010/0023006 A1 | 1/2010 | Ellman |
| 2010/0023065 A1 | 1/2010 | Welch et al. |
| 2010/0082033 A1 | 4/2010 | Germain |
| 2010/0094269 A1 | 4/2010 | Pellegrino et al. |
| 2010/0114098 A1 | 5/2010 | Carl |
| 2010/0145424 A1 | 6/2010 | Podhajsky et al. |
| 2010/0179556 A1 | 7/2010 | Scribner et al. |
| 2010/0185082 A1 | 7/2010 | Chandran et al. |
| 2010/0185161 A1 | 7/2010 | Pellegrino et al. |
| 2010/0211076 A1 | 8/2010 | Germain et al. |
| 2010/0222777 A1 | 9/2010 | Sutton et al. |
| 2010/0261989 A1 | 10/2010 | Boseck et al. |
| 2010/0261990 A1 | 10/2010 | Gillis et al. |
| 2010/0286487 A1 | 11/2010 | Van Lue |
| 2010/0298737 A1 | 11/2010 | Koehler |
| 2010/0298822 A1 | 11/2010 | Behnke |
| 2010/0298832 A1 | 11/2010 | Lau et al. |
| 2010/0305559 A1 | 12/2010 | Brannan et al. |
| 2010/0324506 A1 | 12/2010 | Pellegrino et al. |
| 2011/0022133 A1 | 1/2011 | Diederich et al. |
| 2011/0034884 A9 | 2/2011 | Pellegrino et al. |
| 2011/0040362 A1 | 2/2011 | Godara et al. |
| 2011/0077628 A1 | 3/2011 | Hoey et al. |
| 2011/0087314 A1 | 4/2011 | Diederich et al. |
| 2011/0118735 A1 | 5/2011 | Abou-Marie et al. |
| 2011/0130751 A1 | 6/2011 | Malis et al. |
| 2011/0144524 A1 | 6/2011 | Fish et al. |
| 2011/0152855 A1 | 6/2011 | Mayse et al. |
| 2011/0196361 A1 | 8/2011 | Vilims |
| 2011/0206260 A1 | 8/2011 | Bergmans et al. |
| 2011/0264098 A1 | 10/2011 | Cobbs |
| 2011/0270238 A1 | 11/2011 | Rizq et al. |
| 2011/0276001 A1 | 11/2011 | Schultz et al. |
| 2011/0295245 A1 | 12/2011 | Willyard et al. |
| 2011/0295261 A1 | 12/2011 | Germain |
| 2011/0319765 A1 | 12/2011 | Gertner et al. |
| 2012/0029420 A1 | 2/2012 | Rittman et al. |
| 2012/0116266 A1 | 5/2012 | House et al. |
| 2012/0136346 A1 | 5/2012 | Condie et al. |
| 2012/0136348 A1 | 5/2012 | Condie et al. |
| 2012/0143090 A1 | 6/2012 | Hay et al. |
| 2012/0143341 A1 | 6/2012 | Zipnick |
| 2012/0172858 A1 | 7/2012 | Harrison et al. |
| 2012/0172859 A1 | 7/2012 | Condie et al. |
| 2012/0191095 A1 | 7/2012 | Burger et al. |
| 2012/0196251 A1 | 8/2012 | Taft et al. |
| 2012/0197344 A1 | 8/2012 | Taft et al. |
| 2012/0203219 A1 | 8/2012 | Evans et al. |
| 2012/0226145 A1 | 9/2012 | Chang et al. |
| 2012/0226273 A1 | 9/2012 | Nguyen et al. |
| 2012/0239049 A1 | 9/2012 | Truckai et al. |
| 2012/0239050 A1 | 9/2012 | Linderman |
| 2012/0265186 A1 | 10/2012 | Burger et al. |
| 2012/0330180 A1 | 12/2012 | Pellegrino et al. |
| 2012/0330300 A1 | 12/2012 | Pellegrino et al. |
| 2012/0330301 A1 | 12/2012 | Pellegrino et al. |
| 2013/0006232 A1 | 1/2013 | Pellegrino et al. |
| 2013/0006233 A1 | 1/2013 | Pellegrino et al. |
| 2013/0012933 A1 | 1/2013 | Pellegrino et al. |
| 2013/0012935 A1 | 1/2013 | Pellegrino et al. |
| 2013/0012936 A1 | 1/2013 | Pellegrino et al. |
| 2013/0012951 A1 | 1/2013 | Linderman |
| 2013/0060244 A1 | 3/2013 | Godara et al. |
| 2013/0079810 A1 | 3/2013 | Isenberg |
| 2013/0103022 A1 | 4/2013 | Sutton et al. |
| 2013/0197508 A1 | 8/2013 | Shikhman et al. |
| 2013/0231654 A1 | 9/2013 | Germain |
| 2013/0237979 A1 | 9/2013 | Shikhman et al. |
| 2013/0261507 A1 | 10/2013 | Diederich et al. |
| 2013/0274784 A1 | 10/2013 | Lenker et al. |
| 2013/0296767 A1 | 11/2013 | Zarins et al. |
| 2013/0324993 A1 | 12/2013 | McCarthy et al. |
| 2013/0324994 A1 | 12/2013 | Pellegrino et al. |
| 2013/0324996 A1 | 12/2013 | Pellegrino et al. |
| 2013/0324997 A1 | 12/2013 | Pellegrino et al. |
| 2013/0331840 A1 | 12/2013 | Teisen et al. |
| 2013/0345765 A1 | 12/2013 | Brockman et al. |
| 2014/0031715 A1 | 1/2014 | Sherar et al. |
| 2014/0039500 A1 | 2/2014 | Pellegrino et al. |
| 2014/0046245 A1 | 2/2014 | Cornacchia |
| 2014/0046328 A1 | 2/2014 | Schumacher et al. |
| 2014/0066913 A1 | 3/2014 | Sherman |
| 2014/0088575 A1 | 3/2014 | Loeb |
| 2014/0148801 A1 | 5/2014 | Asher et al. |
| 2014/0148805 A1 | 5/2014 | Stewart et al. |
| 2014/0171942 A1 | 6/2014 | Werneth et al. |
| 2014/0194887 A1 | 7/2014 | Shenoy |
| 2014/0221967 A1 | 8/2014 | Childs et al. |
| 2014/0236137 A1 | 8/2014 | Tran et al. |
| 2014/0236144 A1 | 8/2014 | Krueger et al. |
| 2014/0243823 A1 | 8/2014 | Godara et al. |
| 2014/0243943 A1 | 8/2014 | Rao et al. |
| 2014/0257265 A1 | 9/2014 | Godara et al. |
| 2014/0257296 A1 | 9/2014 | Morgenstern Lopez |
| 2014/0271717 A1 | 9/2014 | Goshayeshgar et al. |
| 2014/0275760 A1 | 9/2014 | Lee et al. |
| 2014/0276713 A1 | 9/2014 | Lee et al. |
| 2014/0276728 A1 | 9/2014 | Goshayeshgar et al. |
| 2014/0276744 A1 | 9/2014 | Arthur et al. |
| 2014/0288544 A1 | 9/2014 | Diederich et al. |
| 2014/0288546 A1 | 9/2014 | Sherman et al. |
| 2014/0296850 A1 | 10/2014 | Condie et al. |
| 2014/0303610 A1 | 10/2014 | McCarthy et al. |

(56) References Cited

U.S. PATENT DOCUMENTS

| | | |
|---|---|---|
| 2014/0303614 A1 | 10/2014 | McCarthy et al. |
| 2014/0316405 A1 | 10/2014 | Pellegrino et al. |
| 2014/0316413 A1 | 10/2014 | Burger et al. |
| 2014/0324051 A1 | 10/2014 | Pellegrino et al. |
| 2014/0330332 A1 | 11/2014 | Danek et al. |
| 2014/0336630 A1 | 11/2014 | Woloszko et al. |
| 2014/0336667 A1 | 11/2014 | Pellegrino et al. |
| 2014/0364842 A1 | 12/2014 | Werneth et al. |
| 2014/0371740 A1 | 12/2014 | Germain et al. |
| 2015/0005614 A1 | 1/2015 | Heggeness et al. |
| 2015/0005767 A1 | 1/2015 | Werneth et al. |
| 2015/0045783 A1* | 2/2015 | Edidin ............... A61B 18/04 606/29 |
| 2015/0057658 A1 | 2/2015 | Sutton et al. |
| 2015/0065945 A1 | 3/2015 | Zarins et al. |
| 2015/0073515 A1 | 3/2015 | Turovskiy et al. |
| 2015/0105701 A1 | 4/2015 | Mayer et al. |
| 2015/0141876 A1 | 5/2015 | Diederich et al. |
| 2015/0157402 A1 | 6/2015 | Kunis et al. |
| 2015/0164546 A1 | 6/2015 | Pellegrino et al. |
| 2015/0196358 A1 | 7/2015 | Goshayeshgar |
| 2015/0216588 A1 | 8/2015 | Deem et al. |
| 2015/0231417 A1 | 8/2015 | Metcalf et al. |
| 2015/0272655 A1 | 10/2015 | Condie et al. |
| 2015/0273208 A1 | 10/2015 | Hamilton |
| 2015/0297246 A1* | 10/2015 | Patel ............... A61B 17/1642 606/79 |
| 2015/0297282 A1 | 10/2015 | Cadouri |
| 2015/0320480 A1 | 11/2015 | Cosman, Jr. et al. |
| 2015/0335349 A1 | 11/2015 | Pellegrino et al. |
| 2015/0335382 A1 | 11/2015 | Pellegrino et al. |
| 2015/0342619 A1 | 12/2015 | Weitzman |
| 2015/0342660 A1 | 12/2015 | Nash |
| 2015/0342670 A1 | 12/2015 | Pellegrino et al. |
| 2015/0359586 A1 | 12/2015 | Heggeness |
| 2015/0374432 A1 | 12/2015 | Godara et al. |
| 2015/0374992 A1 | 12/2015 | Crosby et al. |
| 2015/0374995 A1 | 12/2015 | Foreman et al. |
| 2016/0000601 A1 | 1/2016 | Burger et al. |
| 2016/0001096 A1 | 1/2016 | Mishelevich |
| 2016/0002627 A1 | 1/2016 | Bennett et al. |
| 2016/0008593 A1 | 1/2016 | Cairns |
| 2016/0008618 A1 | 1/2016 | Omar-Pasha |
| 2016/0008628 A1 | 1/2016 | Morries et al. |
| 2016/0016012 A1 | 1/2016 | Youn et al. |
| 2016/0022988 A1 | 1/2016 | Thieme et al. |
| 2016/0022994 A1 | 1/2016 | Moffitt et al. |
| 2016/0024208 A1 | 1/2016 | MacDonald et al. |
| 2016/0029930 A1 | 2/2016 | Plumley et al. |
| 2016/0030276 A1 | 2/2016 | Spanyer |
| 2016/0030408 A1 | 2/2016 | Levin |
| 2016/0030748 A1 | 2/2016 | Edgerton et al. |
| 2016/0030765 A1 | 2/2016 | Towne et al. |
| 2016/0045207 A1 | 2/2016 | Kovacs et al. |
| 2016/0045256 A1 | 2/2016 | Godara et al. |
| 2016/0051831 A1 | 2/2016 | Lundmark et al. |
| 2016/0059007 A1 | 3/2016 | Koop |
| 2016/0074068 A1 | 3/2016 | Patwardhan |
| 2016/0074133 A1 | 3/2016 | Shikhman et al. |
| 2016/0074279 A1 | 3/2016 | Shin |
| 2016/0074661 A1 | 3/2016 | Lipani |
| 2016/0081716 A1 | 3/2016 | Boling et al. |
| 2016/0081810 A1 | 3/2016 | Reiley et al. |
| 2016/0095721 A1 | 4/2016 | Schell et al. |
| 2016/0106443 A1 | 4/2016 | Kuntz et al. |
| 2016/0106985 A1 | 4/2016 | Zhu |
| 2016/0106994 A1 | 4/2016 | Crosby et al. |
| 2016/0113704 A1 | 4/2016 | Godara et al. |
| 2016/0115173 A1 | 4/2016 | Bois et al. |
| 2016/0136310 A1 | 5/2016 | Bradford et al. |
| 2016/0144182 A1 | 5/2016 | Bennett et al. |
| 2016/0144187 A1 | 5/2016 | Caparso et al. |
| 2016/0158551 A1 | 6/2016 | Kent et al. |
| 2016/0166302 A1 | 6/2016 | Tan-Malecki et al. |
| 2016/0166835 A1 | 6/2016 | De Ridder |
| 2016/0175586 A1 | 6/2016 | Edgerton et al. |
| 2016/0199097 A1 | 7/2016 | Linderman et al. |
| 2016/0199117 A1 | 7/2016 | Druma |
| 2016/0213927 A1 | 7/2016 | McGee et al. |
| 2016/0220317 A1 | 8/2016 | Shikhman et al. |
| 2016/0220393 A1 | 8/2016 | Slivka et al. |
| 2016/0220638 A1 | 8/2016 | Dony et al. |
| 2016/0220672 A1 | 8/2016 | Chalasani et al. |
| 2016/0228131 A1 | 8/2016 | Brockman et al. |
| 2016/0228696 A1 | 8/2016 | Imran et al. |
| 2016/0235471 A1 | 8/2016 | Godara et al. |
| 2016/0235474 A1 | 8/2016 | Prisco et al. |
| 2016/0243353 A1 | 8/2016 | Ahmed |
| 2016/0246944 A1 | 8/2016 | Jain et al. |
| 2016/0250469 A1 | 9/2016 | Kim et al. |
| 2016/0250472 A1 | 9/2016 | Carbunaru |
| 2016/0262830 A1 | 9/2016 | Werneth et al. |
| 2016/0262904 A1 | 9/2016 | Schaller et al. |
| 2016/0271405 A1 | 9/2016 | Angara et al. |
| 2016/0278791 A1 | 9/2016 | Pellegrino et al. |
| 2016/0278846 A1 | 9/2016 | Harrison et al. |
| 2016/0278861 A1 | 9/2016 | Ko |
| 2016/0279190 A1 | 9/2016 | Watts et al. |
| 2016/0279408 A1 | 9/2016 | Grigsby et al. |
| 2016/0279411 A1 | 9/2016 | Rooney et al. |
| 2016/0279441 A1 | 9/2016 | Imran |
| 2016/0296739 A1 | 10/2016 | Cleveland |
| 2016/0302925 A1 | 10/2016 | Keogh et al. |
| 2016/0302936 A1 | 10/2016 | Billon et al. |
| 2016/0310739 A1 | 10/2016 | Burdick et al. |
| 2016/0317053 A1 | 11/2016 | Srivastava |
| 2016/0317211 A1 | 11/2016 | Harrison et al. |
| 2016/0317621 A1 | 11/2016 | Bright |
| 2016/0324541 A1 | 11/2016 | Pellegrino et al. |
| 2016/0324677 A1 | 11/2016 | Hyde et al. |
| 2016/0325100 A1 | 11/2016 | Lian et al. |
| 2016/0339251 A1 | 11/2016 | Kent et al. |
| 2016/0354093 A1 | 12/2016 | Pellegrino et al. |
| 2016/0354233 A1 | 12/2016 | Sansone et al. |
| 2016/0367797 A1 | 12/2016 | Eckermann |
| 2016/0367823 A1 | 12/2016 | Cowan et al. |
| 2016/0375259 A1 | 12/2016 | Davis et al. |
| 2017/0000501 A1 | 1/2017 | Aho et al. |
| 2017/0001026 A1 | 1/2017 | Schwarz et al. |
| 2017/0007277 A1 | 1/2017 | Drapeau et al. |
| 2017/0014169 A1 | 1/2017 | Dean et al. |
| 2017/0027618 A1 | 2/2017 | Lee et al. |
| 2017/0028198 A1 | 2/2017 | Degiorgio et al. |
| 2017/0028201 A1 | 2/2017 | Howard |
| 2017/0035483 A1 | 2/2017 | Crainich et al. |
| 2017/0036009 A1 | 2/2017 | Hughes et al. |
| 2017/0036025 A1 | 2/2017 | Sachs et al. |
| 2017/0036033 A9 | 2/2017 | Perryman et al. |
| 2017/0042834 A1 | 2/2017 | Westphal et al. |
| 2017/0049500 A1 | 2/2017 | Shikhman et al. |
| 2017/0049503 A1 | 2/2017 | Cosman |
| 2017/0049507 A1 | 2/2017 | Cosman |
| 2017/0049513 A1 | 2/2017 | Cosman |
| 2017/0050017 A1 | 2/2017 | Cosman |
| 2017/0050021 A1 | 2/2017 | Cosman |
| 2017/0050024 A1 | 2/2017 | Bhadra et al. |
| 2017/0056028 A1 | 3/2017 | Germain et al. |
| 2017/0065329 A1 | 3/2017 | Benamou et al. |
| 2017/0112507 A1 | 4/2017 | Crainich et al. |
| 2017/0119461 A1 | 5/2017 | Godara et al. |
| 2017/0128080 A1 | 5/2017 | Torrie |
| 2017/0128112 A1 | 5/2017 | Germain |
| 2017/0135742 A1 | 5/2017 | Lee et al. |
| 2017/0164998 A1 | 6/2017 | Klimovitch |
| 2017/0172650 A1 | 6/2017 | Germain |
| 2017/0181788 A1 | 6/2017 | Dastjerdi et al. |
| 2017/0202613 A1 | 7/2017 | Pellegrino et al. |
| 2017/0238943 A1 | 8/2017 | Sennett et al. |
| 2017/0246481 A1 | 8/2017 | Mischelevich |
| 2017/0266419 A1 | 9/2017 | Goshayeshgar |
| 2017/0303983 A1 | 10/2017 | Linderman et al. |
| 2017/0312007 A1 | 11/2017 | Harlev et al. |
| 2017/0333052 A1 | 11/2017 | Ding et al. |
| 2018/0021048 A1 | 1/2018 | Pellegrino et al. |

(56) References Cited

U.S. PATENT DOCUMENTS

| | | | |
|---|---|---|---|
| 2018/0042656 A1 | 2/2018 | Edidin | |
| 2018/0055539 A1 | 3/2018 | Pellegino | |
| 2018/0103964 A1 | 4/2018 | Patel et al. | |
| 2018/0140245 A1 | 5/2018 | Videman | |
| 2018/0153604 A1 | 6/2018 | Ayvazyan et al. | |
| 2018/0161047 A1 | 6/2018 | Purdy et al. | |
| 2018/0193088 A1 | 7/2018 | Sutton et al. | |
| 2018/0303509 A1 | 10/2018 | Germain et al. | |
| 2019/0029698 A1 | 1/2019 | Pellegrino et al. | |
| 2019/0038296 A1 | 2/2019 | Pellegrino | |
| 2019/0038343 A1 | 2/2019 | Sutton et al. | |
| 2019/0038344 A1 | 2/2019 | Pellegrino | |
| 2019/0038345 A1 | 2/2019 | Pellegrino | |
| 2019/0090933 A1 | 3/2019 | Pellegrino et al. | |
| 2019/0110833 A1 | 4/2019 | Pellegrino et al. | |
| 2019/0118003 A1 | 4/2019 | Diederich et al. | |
| 2019/0118004 A1 | 4/2019 | Diederich et al. | |
| 2019/0118005 A1 | 4/2019 | Diederich et al. | |
| 2019/0175252 A1 | 6/2019 | Heggeness | |
| 2019/0216486 A1 | 7/2019 | Weitzman | |
| 2019/0282268 A1 | 9/2019 | Pellegrino et al. | |
| 2019/0290296 A1 | 9/2019 | Patel et al. | |
| 2019/0298392 A1 | 10/2019 | Capote et al. | |
| 2019/0365416 A1 | 12/2019 | Brockman et al. | |
| 2020/0000480 A1 | 1/2020 | Alambeigi et al. | |
| 2020/0022709 A1 | 1/2020 | Burger et al. | |
| 2020/0022749 A1 | 1/2020 | Malkevich et al. | |
| 2020/0030601 A1 | 1/2020 | Molnar et al. | |
| 2020/0060695 A1 | 2/2020 | Purdy et al. | |
| 2020/0060747 A1 | 2/2020 | Edidin | |
| 2020/0069920 A1 | 3/2020 | Goshayeshgar | |
| 2020/0078083 A1 | 3/2020 | Sprinkle et al. | |
| 2020/0138454 A1 | 5/2020 | Patel et al. | |
| 2020/0146743 A1 | 5/2020 | Defosset et al. | |
| 2020/0146744 A1 | 5/2020 | Defosset et al. | |
| 2020/0179033 A1 | 6/2020 | Banamou et al. | |
| 2020/0214762 A1 | 7/2020 | Pellegrino et al. | |
| 2020/0281646 A1 | 9/2020 | Pellegrino et al. | |
| 2020/0390493 A1 | 12/2020 | Orczy-Timko et al. | |
| 2020/0405499 A1 | 12/2020 | Gerbec et al. | |
| 2021/0022814 A1 | 1/2021 | Crawford et al. | |
| 2021/0077170 A1 | 3/2021 | Wiersdorf et al. | |
| 2021/0093373 A1 | 4/2021 | Dastjerdi et al. | |
| 2021/0113238 A1 | 4/2021 | Donovan et al. | |
| 2021/0145416 A1 | 5/2021 | Godara et al. | |
| 2021/0177502 A1 | 6/2021 | Wright et al. | |
| 2021/0290254 A1 | 9/2021 | Serrahima Tornel et al. | |
| 2021/0361350 A1 | 11/2021 | Pellegrino et al. | |
| 2021/0361351 A1 | 11/2021 | Pellegrino et al. | |
| 2021/0369323 A1 | 12/2021 | Edidin | |
| 2021/0386491 A1 | 12/2021 | Shmayahu et al. | |
| 2021/0401496 A1 | 12/2021 | Purdy et al. | |
| 2022/0022930 A1 | 1/2022 | Brockman et al. | |
| 2022/0031390 A1 | 2/2022 | Ebersole et al. | |
| 2022/0096143 A1 | 3/2022 | Godara et al. | |
| 2022/0110639 A1 | 4/2022 | Brockman et al. | |
| 2022/0192702 A1 | 6/2022 | Donovan et al. | |
| 2022/0192722 A1 | 6/2022 | Harshman et al. | |
| 2022/0202471 A1 | 6/2022 | Schepis et al. | |
| 2022/0218411 A1 | 7/2022 | Druma et al. | |
| 2022/0218434 A1 | 7/2022 | Druma | |
| 2022/0240916 A1 | 8/2022 | Jung et al. | |
| 2022/0296255 A1 | 9/2022 | Patel et al. | |
| 2022/0401114 A1 | 12/2022 | Marino et al. | |
| 2023/0046328 A1 | 2/2023 | Weitzman et al. | |
| 2023/0138303 A1 | 5/2023 | Pellegrino et al. | |
| 2023/0172656 A1 | 6/2023 | Druma | |
| 2023/0255676 A1 | 8/2023 | Donovan et al. | |

FOREIGN PATENT DOCUMENTS

| | | |
|---|---|---|
| AU | 2008249202 | 9/2003 |
| AU | 2011218612 | 9/2003 |
| AU | 2009296474 | 9/2009 |
| AU | 2015234376 | 9/2009 |
| AU | 2018223007 | 9/2009 |
| AU | 2011204278 | 1/2011 |
| AU | 2012362524 | 12/2012 |
| AU | 2013337680 | 11/2013 |
| AU | 2012244378 B2 | 5/2015 |
| AU | 2019201705 | 3/2019 |
| AU | 2019206037 | 7/2019 |
| AU | 2020201962 | 3/2020 |
| AU | 2021200382 | 1/2021 |
| AU | 2020346827 | 3/2022 |
| AU | 2021306313 | 1/2023 |
| AU | 2023204019 | 6/2023 |
| AU | 2021409967 | 7/2023 |
| AU | 2022239314 | 9/2023 |
| CA | 2397413 | 2/2001 |
| CA | 2723071 | 2/2001 |
| CA | 2443491 | 9/2003 |
| CA | 2737374 | 9/2009 |
| CA | 2957010 | 9/2009 |
| CA | 2785207 | 1/2011 |
| CA | 2889478 | 11/2013 |
| CA | 3093398 | 9/2020 |
| CA | 3150339 | 3/2022 |
| CA | 3202650 | 6/2023 |
| CA | 3211365 | 9/2023 |
| EP | 0040658 | 12/1981 |
| EP | 0584959 | 3/1994 |
| EP | 0597463 | 5/1994 |
| EP | 0880938 | 12/1998 |
| EP | 1013228 | 6/2000 |
| EP | 1059067 | 12/2000 |
| EP | 1059087 | 12/2000 |
| EP | 1905397.4 | 2/2001 |
| EP | 7010394 | 2/2001 |
| EP | 7010581.2 | 2/2001 |
| EP | 7010649.7 | 2/2001 |
| EP | 10012521 | 2/2001 |
| EP | 16197060.3 | 2/2001 |
| EP | 3256168 | 9/2003 |
| EP | 5021597.9 | 9/2003 |
| EP | 10012523.6 | 9/2003 |
| EP | 1402821 A2 | 3/2004 |
| EP | 1402838 A1 | 3/2004 |
| EP | 1652486 A1 | 5/2006 |
| EP | 1641406 B1 | 3/2007 |
| EP | 1294323 B1 | 4/2007 |
| EP | 1832244 A2 | 9/2007 |
| EP | 1938765 A1 | 7/2008 |
| EP | 9816892.5 | 9/2009 |
| EP | 1471836 B1 | 4/2010 |
| EP | 11732213.1 | 1/2011 |
| EP | 2438876 A1 | 4/2012 |
| EP | 1968472 B1 | 2/2013 |
| EP | 13852217.2 | 11/2013 |
| EP | 1824424 B1 | 1/2014 |
| EP | 2785260 | 8/2015 |
| EP | 2965782 | 1/2016 |
| EP | 2508225 | 9/2016 |
| EP | 3078395 | 10/2016 |
| EP | 2205313 B1 | 11/2016 |
| EP | 3097946 | 11/2016 |
| EP | 2913081 | 1/2017 |
| EP | 2642931 B1 | 3/2017 |
| EP | 3187132 A1 | 7/2017 |
| EP | 18166323.8 | 4/2018 |
| EP | 19162385.9 | 3/2019 |
| EP | 2590579 B1 | 8/2019 |
| EP | 20161054.0 | 3/2020 |
| EP | 3057517 B1 | 4/2020 |
| EP | 2978373 B1 | 7/2021 |
| EP | 20862138.3 | 3/2022 |
| EP | 3410961 B1 | 11/2022 |
| EP | 22771962.2 | 9/2023 |
| HK | 8102841.9 | 2/2001 |
| HK | 8103900.5 | 2/2001 |
| HK | 17108246.6 | 2/2001 |
| HK | 12100034.4 | 9/2009 |
| HK | 13105656.9 | 1/2011 |
| HK | 16100183.9 | 11/2013 |

(56) References Cited

FOREIGN PATENT DOCUMENTS

| | | |
|---|---|---|
| HK | 19124269.2 | 5/2019 |
| IL | 220747 | 1/2011 |
| IL | 245665 | 1/2011 |
| IL | 238516 | 11/2013 |
| IL | 303851 | 6/2023 |
| JP | 53-139791 | 11/1978 |
| JP | 6-47058 | 2/1994 |
| JP | 10-290806 | 11/1998 |
| JP | 2001-037760 | 2/2001 |
| JP | 2001-556439 | 2/2001 |
| JP | 2003-341164 | 9/2003 |
| JP | 2009-269652 | 9/2003 |
| JP | 2012-246075 | 9/2003 |
| JP | 2005-169012 | 6/2005 |
| JP | 2011-529245 | 9/2009 |
| JP | 2015-010950 | 9/2009 |
| JP | 2016-201503 | 9/2009 |
| JP | 2012-548169 | 1/2011 |
| JP | 2013-1951 | 1/2011 |
| JP | 2015-540810 | 11/2013 |
| JP | 2017-156808 | 11/2013 |
| JP | 2018-088547 | 5/2018 |
| JP | 2018-232891 | 12/2018 |
| JP | 2021-026929 | 2/2021 |
| JP | 2023-537522 | 6/2023 |
| JP | 2023-555601 | 9/2023 |
| KR | 2003-0017897 | 3/2003 |
| WO | WO96/36289 | 11/1996 |
| WO | WO98/27876 | 7/1998 |
| WO | WO98/34550 | 8/1998 |
| WO | WO99/19025 | 4/1999 |
| WO | WO99/44519 | 9/1999 |
| WO | WO99/48621 | 9/1999 |
| WO | WO00/21448 | 4/2000 |
| WO | WO00/33909 | 6/2000 |
| WO | WO00/49978 | 8/2000 |
| WO | WO00/56237 | 9/2000 |
| WO | WO00/67648 | 11/2000 |
| WO | WO00/67656 | 11/2000 |
| WO | WO01/01877 | 1/2001 |
| WO | WO01/45579 | 6/2001 |
| WO | WO01/57655 | 8/2001 |
| WO | WO 2002/05699 | 1/2002 |
| WO | WO 2002/05897 | 1/2002 |
| WO | WO 2002/026319 | 4/2002 |
| WO | WO 2002/28302 | 4/2002 |
| WO | WO 2002/054941 | 7/2002 |
| WO | WO 2002/067797 | 9/2002 |
| WO | WO 2002/096304 | 12/2002 |
| WO | WO 2006/044794 | 4/2006 |
| WO | WO 2007/001981 | 1/2007 |
| WO | WO2007/008954 | 1/2007 |
| WO | WO 2007/031264 | 3/2007 |
| WO | WO 2008/001385 | 1/2008 |
| WO | WO 2008/008522 | 1/2008 |
| WO | WO 2008/076330 | 6/2008 |
| WO | WO 2008/076357 | 6/2008 |
| WO | WO 2008/121259 | 10/2008 |
| WO | WO 2008/140519 | 11/2008 |
| WO | WO 2008/141104 | 11/2008 |
| WO | WO2008/144709 | 11/2008 |
| WO | WO 2009/042172 | 4/2009 |
| WO | WO 2009/076461 | 6/2009 |
| WO | PCT/US2009/058329 | 9/2009 |
| WO | WO 2009/124192 | 10/2009 |
| WO | WO 2009/155319 | 12/2009 |
| WO | WO 2010/111246 | 9/2010 |
| WO | WO 2010/135606 | 11/2010 |
| WO | PCT/US2011/020535 | 1/2011 |
| WO | WO 2011/041038 | 4/2011 |
| WO | WO 2012/024162 | 2/2012 |
| WO | WO 2012/065753 | 3/2012 |
| WO | WO 2012/074932 | 6/2012 |
| WO | PCT/US2012/071465 | 12/2012 |
| WO | WO 2013/009516 | 1/2013 |
| WO | WO 2013/134452 | 9/2013 |
| WO | PCT/US2013/068012 | 11/2013 |
| WO | WO 2013/168006 | 11/2013 |
| WO | WO 2013/180947 | 12/2013 |
| WO | WO 2014/004051 | 1/2014 |
| WO | WO 2014/130231 | 8/2014 |
| WO | WO 2014/141207 | 9/2014 |
| WO | WO 2014/165194 | 10/2014 |
| WO | WO 2014/176141 | 10/2014 |
| WO | WO 2015/038317 | 3/2015 |
| WO | WO 2015/047817 | 4/2015 |
| WO | WO 2015/066295 | 5/2015 |
| WO | WO 2015/066303 | 5/2015 |
| WO | WO 2015/079319 | 6/2015 |
| WO | WO 2015/148105 | 10/2015 |
| WO | WO 2014/145222 | 1/2016 |
| WO | WO 2014/145659 | 1/2016 |
| WO | WO 2014/146029 | 1/2016 |
| WO | WO 2016/033380 | 3/2016 |
| WO | WO 2016/048965 | 3/2016 |
| WO | WO 2014/197596 | 4/2016 |
| WO | WO 2014/210373 | 5/2016 |
| WO | WO 2016/069157 | 5/2016 |
| WO | WO 2016/075544 | 5/2016 |
| WO | WO 2015/024013 | 6/2016 |
| WO | WO 2016/090420 | 6/2016 |
| WO | WO 2016/105448 | 6/2016 |
| WO | WO 2016/105449 | 6/2016 |
| WO | WO 2015/044945 | 8/2016 |
| WO | WO 2015/057696 | 8/2016 |
| WO | WO 2015/060927 | 8/2016 |
| WO | WO 2016/127130 | 8/2016 |
| WO | WO 2016/130686 | 8/2016 |
| WO | WO 2016/134273 | 8/2016 |
| WO | WO 2011/157714 | 9/2016 |
| WO | WO 2016/148954 | 9/2016 |
| WO | WO 2016/154091 | 9/2016 |
| WO | WO 2016/168381 | 10/2016 |
| WO | WO 2016/209682 | 12/2016 |
| WO | WO 2017/009472 | 1/2017 |
| WO | WO2017/010930 | 1/2017 |
| WO | WO 2017/019863 | 2/2017 |
| WO | WO 2017/027703 | 2/2017 |
| WO | WO 2017/027809 | 2/2017 |
| WO | WO 2018/116273 | 6/2018 |
| WO | PCT/US2020/050249 | 9/2020 |
| WO | WO 2020/198150 | 10/2020 |
| WO | WO 2021/016699 A1 | 2/2021 |
| WO | PCT/US2021/040843 | 7/2021 |
| WO | PCT/US2021/82125 | 10/2021 |
| WO | PCT/US2022/019954 | 3/2022 |
| WO | WO 2022/066743 A2 | 3/2022 |
| WO | WO 2022/125875 A1 | 6/2022 |
| WO | WO 2022/191978 A1 | 9/2022 |
| WO | WO 2022/207105 A1 | 10/2022 |
| WO | WO 2023/009697 A1 | 2/2023 |
| WO | PCT/US2023/017913 | 4/2023 |

OTHER PUBLICATIONS

U.S. Appl. No. 10/401,854 U.S. Pat. No. 7,258,690, filed Mar. 28, 2003, Windowed Thermal Ablation Probe.
U.S. Appl. No. 11/745,446, filed May 7, 2007, Windowed Thermal Ablation Probe.
U.S. Appl. No. 12/643,997, filed Dec. 21, 2009, Windowed Thermal Ablation Probe.
U.S. Appl. No. 13/655,683 U.S. Pat. No. 8,882,764, filed Oct. 19, 2012, Thermal Denervation Devices.
U.S. Appl. No. 14/535,868 U.S. Pat. No. 9,848,944, filed Nov. 7, 2014, Thermal Denervation Devices and Methods.
U.S. Appl. No. 15/845,699, filed Dec. 18, 2017, Thermal Denervation Devices and Methods.
U.S. Appl. No. 16/153,407 U.S. Pat. No. 10,463,423, filed Oct. 5, 2018, Thermal Denervation Devices and Methods.
U.S. Appl. No. 10/260,879 U.S. Pat. No. 6,907,884, filed Sep. 30, 2002, Method of Straddling an Interaosseous Nerve.
U.S. Appl. No. 11/123,766 U.S. Pat. No. 7,749,218, filed May 6, 2005, Method of Straddling an Intraosseous Nerve.

(56) References Cited

OTHER PUBLICATIONS

U.S. Appl. No. 12/683,555 U.S. Pat. No. 8,613,744, filed Jan. 7, 2010, Systems and Methods for Navigating an Instrument Through Bone.
U.S. Appl. No. 13/612,561 U.S. Pat. No. 8,425,507, filed Sep. 12, 2012, Basivertebral Nerve Denervation.
U.S. Appl. No. 13/617,470 U.S. Pat. No. 8,623,014, filed Sep. 14, 2012, Systems for Denervation of Basivertebral Nerves.
U.S. Appl. No. 13/862,306 U.S. Pat. No. 8,628,528, filed Apr. 12, 2013, Vertebral Denervation.
U.S. Appl. No. 14/136,763 U.S. Pat. No. 9,023,038, filed Dec. 20, 2013, Denervation Methods.
U.S. Appl. No. 14/174,024 U.S. Pat. No. 9,017,325, filed Jan. 3, 2014, Nerve Modulation Systems.
U.S. Appl. No. 14/153,922 U.S. Pat. No. 9,173,676, filed Jan. 13, 2014, Nerve Modulation Methods.
U.S. Appl. No. 14/695,330 U.S. Pat. No. 9,421,064, filed Apr. 24, 2015, Nerve Modulation Systems.
U.S. Appl. No. 14/701,908, filed May 1, 2015, Denervation Methods.
U.S. Appl. No. 14/928,037 U.S. Pat. No. 10,028,753, filed Oct. 30, 2015, Spine Treatment Kits.
U.S. Appl. No. 15/241,523 U.S. Pat. No. 9,724,107, filed Aug. 19, 2016, Nerve Modulation Systems.
U.S. Appl. No. 15/669,399 U.S. Pat. No. 10,905,440, filed Aug. 4, 2017, Nerve Modulation Systems.
U.S. Appl. No. 16/152,834 U.S. Pat. No. 11,471,171, filed Oct. 5, 2018, Bipolar Radiofrequency Ablation Systems for Treatment Within Bone.
U.S. Appl. No. 16/156,850, filed Oct. 10, 2018, Systems For Treating Nervers Within Bone Using Steam.
U.S. Appl. No. 16/747,830, filed Jan. 21, 2020, Denervation Methods.
U.S. Appl. No. 18/451,539, filed Aug. 17, 2023, Systems for Treating Nerves Within Bone.
U.S. Appl. No. 13/612,541 U.S. Pat. No. 8,361,067, filed Sep. 12, 2012, Methods of Therapeutically Heating a Vertebral Body to Treat Back Pain.
U.S. Appl. No. 13/615,001 U.S. Pat. No. 8,419,731, filed Sep. 13, 2012, Methods of Treating Back Pain.
U.S. Appl. No. 13/615,300, filed Sep. 13, 2012, System For Heating a Vertebral Body to Treat Back Pain.
U.S. Appl. No. 13/862,317 U.S. Pat. No. 8,992,522, dated Apr. 12, 2013, Back Pain Treatment Methods.
U.S. Appl. No. 13/923,798 U.S. Pat. No. 8,992,523, filed Jun. 12, 2013, Vertrbral Treatment.
U.S. Appl. No. 14/673,172 U.S. Pat. No. 9,486,279, filed Mar. 30, 2015, Intraosseous Nerve Treatment.
U.S. Appl. No. 15/344,284 U.S. Pat. No. 10,111,704, filed Nov. 4, 2016, Intraosseous Nerve Treatment.
U.S. Appl. No. 16/153,234 U.S. Pat. No. 10,478,246, filed Oct. 5, 2018, Ablation of Tissue Within Vertebral Body Involving Internal Cooling.
U.S. Appl. No. 16/153,242 U.S. Pat. No. 10,588,691, filed Oct. 5, 2018, Radiofrequency Ablation of Tissue Within a Vertebral Body.
U.S. Appl. No. 16/160,155 U.S. Pat. No. 11,596,468, filed Oct. 15, 2018, Intraosseous Nerve Treatment.
U.S. Appl. No. 16/818,092 U.S. Pat. No. 11,737,814, filed Mar. 13, 2020, Radiofrequency Ablation of Tissue Within a Vertebral Body.
U.S. Appl. No. 17/394,189 U.S. Pat. No. 11,701,168, filed Aug. 4, 2021, Radiofrequency Ablation of Tissue Within a Vertebral Body.
U.S. Appl. No. 17/394,166 U.S. Pat. No. 11,690,667, filed Aug. 4, 2021, Radiofrequency Ablation of Tissue Within a Vertebral Body.
U.S. Appl. No. 18/360,724, filed Jul. 27, 2023, Radiofrequency Ablation of Tissue Within a Vertebral Body.
U.S. Appl. No. 13/541,591 U.S. Pat. No. 7,749,218, filed Jul. 3, 2012, Method of Treating an Intraosseous Nerve.
U.S. Appl. No. 15/469,315 U.S. Pat. No. 7,749,218, filed Mar. 24, 2017, Method of Treating an Intraosseous Nerve.
U.S. Appl. No. 16/153,598, filed Oct. 5, 2018, Method of Treating an Intraosseous Nerve.
U.S. Appl. No. 16/153,603, filed Oct. 5, 2018, Method of Treating an Intraosseous Nerve.
U.S. Appl. No. 17/193,491, filed Mar. 5, 2021, Method of Treating an Intraosseous Nerve.
U.S. Appl. No. 12/566,895 U.S. Pat. No. 8,419,730, filed Sep. 25, 2009, Systems and Methods for Navigating an Instrument Through Bone.
U.S. Appl. No. 13/963,767 U.S. Pat. No. 9,039,701, filed Aug. 9, 2013, Channeling Paths Into Bone.
U.S. Appl. No. 13/862,242 U.S. Pat. No. 9,259,241, filed Apr. 12, 2013, Systems for Accessing Nerves Within Bone.
U.S. Appl. No. 15/040,268 U.S. Pat. No. 10,265,099, filed Feb. 10, 2016, Systems for Accessing Nerves Within Bones.
U.S. Appl. No. 16/368,453, filed Mar. 28, 2019, Systems for Accessing Nerves Within Bones.
U.S. Appl. No. 12/868,818 U.S. Pat. No. 8,808,284, filed Aug. 26, 2010, Systems for Navigating an Instrument Through Bone.
U.S. Appl. No. 14/462,371 U.S. Pat. No. 9,265,522, filed Aug. 18, 2014, Methods for Navigating an Instrument Through Bone.
U.S. Appl. No. 13/543,712 U.S. Pat. No. 8,535,309, filed Jul. 6, 2012, Vertebral Bone Channeling Systems.
U.S. Appl. No. 13/543,723 U.S. Pat. No. 8,414,571, filed Jul. 6, 2012, Vertrebral Bone Navigation Systems.
U.S. Appl. No. 13/543,721, filed Jul. 6, 2012, Intraosseous Nerve Denervation Methods.
U.S. Appl. No. 10/103,439 U.S. Pat. No. 6,736,835, filed Mar. 21, 2002, Novel Early Intervention Spinal Treatment Methods and Devices for Use Therein.
U.S. Appl. No. 14/369,661 U.S. Pat. No. 10,369,661, filed Jun. 27, 2014, Systems and Methods for Treating Back Pain.
U.S. Appl. No. 16/205,050 U.S. Pat. No. 11,471,210, filed Nov. 29, 2018, Methods of Denervating Vertebral Body Using External Energy Source.
U.S. Appl. No. 18/047,164, filed Oct. 17, 2022, Methods of Denervating Vertebral Body Using External Energy Source.
U.S. Appl. No. 14/440,050 U.S. Pat. No. 9,775,627, filed Apr. 30, 2015, Systems and Methods for Creating Curved Paths Through Bone and Modulating Nerves Within the Bone.
U.S. Appl. No. 15/722,392 U.S. Pat. No. 10,357,258, filed Oct. 2, 2017, Systems and Methods for Creating Curved Paths Through Bone and Modulating Nerves Within the Bone.
U.S. Appl. No. 16/370,264 U.S. Pat. No. 10,517,611, filed Mar. 29, 2019, Systems for Navigation and Treatment Within a Vertebral Body.
U.S. Appl. No. 16/717,985 U.S. Pat. No. 11,160,563, filed Dec. 17, 2019, Systems for Navigation and Treatment Within a Vertebral Body.
U.S. Appl. No. 17/488,116 U.S. Pat. No. 11,234,764, filed Sep. 28, 2021, Systems for Navigation and Treatment Within a Vertebral Body.
U.S. Appl. No. 17/488,111 U.S. Pat. No. 11,291,502, filed Sep. 28, 2021, Methods of Navigation and Treatment Within a Vertebral Body.
U.S. Appl. No. 17/657,864, filed Apr. 4, 2022, Methods of Navigation and Treatment Within a Vertebral Body.
U.S. Appl. No. 14/454,643 U.S. Pat. No. 9,724,151, filed Aug. 7, 2014, Modulating Nerves Within Bone Using Bone Fasteners.
U.S. Appl. No. 15/669,292 U.S. Pat. No. 10,456,187, filed Aug. 4, 2017, Modulating Nerves Within Bone Using Bone Fasteners.
U.S. Appl. No. 16/661,271 U.S. Pat. No. 11,065,046, filed Oct. 23, 2019, Modulating Nerves Within Bone Using Bone Fasteners.
U.S. Appl. No. 17/378,457, filed Jul. 16, 2021, Modulating Nerves Within Bone.
U.S. Appl. No. 17/138,234 U.S. Pat. No. 11,007,010, filed Dec. 30, 2020, Curved Bone Access Systems.
U.S. Appl. No. 17/302,949 U.S. Pat. No. 11,202,655, filed Mar. 17, 2021, Accessing and Treating Tissue Within a Vertical Body.
U.S. Appl. No. 17/303,254 U.S. Pat. No. 11,426,199, filed May 25, 2021, Methods of Treating a Vertebral Body.
U.S. Appl. No. 17/303,267 U.S. Pat. No. 11,207,100, filed May 25, 2021, Methods of Detecting and Treating Back Pain.

(56) References Cited

OTHER PUBLICATIONS

U.S. Appl. No. 17/645,658, filed Dec. 22, 2021, Methods of Detecting and Treating Back Pain.
U.S. Appl. No. 17/822,700, filed Aug. 26, 2022, Methods of Treating a Vertebral Body.
U.S. Appl. No. 17/449,051, filed Sep. 27, 2021, Introducer Drill.
U.S. Appl. No. 18/258,734, filed Jun. 21, 2023, Prediction of Candidates for Spinal Neuromodulation.
U.S. Appl. No. 18/339,007, filed Jun. 21, 2023, Prediction of Candidates for Spinal Neuromodulation.
U.S. Appl. No. 18/550,040, filed Sep. 11, 2023, Robotic Spine Systems and Robotic-Assisted Methods for Tissue Modulation.
U.S. Appl. No. 18/053,284, filed Nov. 7, 2022, Impedance Stoppage Mitigation During Radiofrequency Tissue Ablation Procedures.
A Novel Approach for Treating Chronic Lower Back Pain Abstract for Presentation at North American Spine Society 26th Annual Meeting in Chicago IL on Nov. 4, 2011.
Antonacci M. Darryl et al.; Innervation of the Human Vertebral Body: A Histologic Study; Journal of Spinal Disorder vol. 11 No. 6 pp. 526-531 1998 Lippincott Williams & Wilkins Philadelphia.
Arnoldi Carl C.; Intraosseous Hypertension—A Possible Cause of Low Back Pain?; Clinical Orthopedics and Related Research No. 115 Mar.-Apr. 1976.
Bailey, Jeannie F., "Innervation Patterns of PGP 9.5—Positive Nerve Fibers within the Human Lumbar Vertebra," Journal of Anatomy, (2011) 218, pp. 263-270, San Francisco, California.
Becker, Stephan, et al., "Ablation of the basivertebral nerve for treatment of back pain: a clinical study," The Spine Journal, vol. 17, pp. 218-223 (Feb. 2017).
Bergeron et al. "Fluoroscopic-guided radiofrequency ablation of the basivertebral nerve: application and analysis with multiple imaging modalities in an ovine model" Thermal Treatment of Tissue: Energy Delivery and Assessment III edited by Thomas P. Ryan Proceedings of SPIE vol. 5698 (SPIE Bellingham WA 2005) pp. 156-167.
Bogduk N. The anatomy of the lumbar intervertebral disc syndrome Med J. Aust. 1976 vol. 1 No. 23 pp. 878-881.
Bogduk Nikolai et al.; Technical Limitations to the efficacy of Radiofrequency Neurotomy for Spinal Pain; Neurosurgery vol. 20 No. 4 1987.
Caragee, EG et al.; "Discographic, MRI and psychosocial determinants of low back pain disability and remission: A prospective study in subjects with benign persistent back pain", The Spine Journal: The Official Journal of the North American Spine Society, vol. 5(1), pp. 24-35 (2005).
Choy Daniel SS.J. et al.; Percutaneous Laser Disc Decompression A New Therapeutic Modality; SPINE vol. 17 No. 8 1992.
Cosman E.R. et al. Theoretical Aspects of Radiofrequency Lesions in the Dorsal Root Entry Zone. Neurosurgery vol. 1 No. 6 1984 pp. 945-950.
Deardorff Dana L. et al.; Ultrasound applicators with internal cooling for interstitial thermal therapy; SPIE vol. 3594 1999.
Deramond H. et al. Temperature Elevation Caused by Bone Cement Polymerization During Vertebroplasty Bone Aug. 1999 pp. 17S-21S vol. 25 No. 2 Supplement.
Diederich C. J. et al. "IDTT Therapy in Cadaveric Lumbar Spine: Temperature and thermal dose distributions Thermal Treatment of Tissue: Energy Delivery and Assessment" Thomas P. Ryan Editor Proceedings of SPIE vol. 4247:104-108 (2001).
Diederich Chris J. et al.; Ultrasound Catheters for Circumferential Cardiac Ablation; SPIE vol. 3594 (1999).
Dupuy D.E. et al. Radiofrequency ablation of spinal tumors: Temperature distribution in the spinal canal AJR vol. 175 pp. 1263-1266 Nov. 2000.
Dupuy Damian E.; Radiofrequency Ablation: An Outpatient Percutaneous Treatment; Medicine and Health/Rhode Island vol. 82 No. 6 Jun. 1999.
Esses Stephen I. et al.; Intraosseous Vertebral Body Pressures; SPINE vol. 17 No. 6 Supplement 1992.

FDA Response to 510(k) Submission by Relievant Medsystems Inc. submitted on Sep. 27, 2007 (date stamped on Oct. 5, 2007) and associated documents.
Fields, AJ et al; "Innervation of pathologies in the lumbar vertebral endplate and intervertebral disc", The Spine Journal: Official Journal of the North American Spine Society, vol. 14(3), pp. 513-521 (2014).
Fields, Aaron J. et al.; "Cartilage endplate damage strongly associates with chronic low back pain, independent of modic changes", Abstract form Oral Presentation at the ISSLS Annual Meeting in Banff, Canada (May 14-18, 2018).
Fischgrund JS, et al.; "Intraosseous Basivertebral Nerve Ablation for the Treatment of Chronic Low Back Pain: 2-Year Results from a Prospective Randomized Double-Blind Sham-Controlled Multicenter Study", International Journal of Spine Surgery, vol. 13 (2), pp. 110-119 (2019).
Fras M.D., Christian et al., "Substance P-containing Nerves within the Human Vertebral Body: An Immunohistochemical Study of the Basivertebral Nerve", The Spine Journal 3, 2003, pp. 63-67.
Gehl J. "Electroporation: theory and methods perspectives for drug delivery gene therapy and research" Acta Physiol. Scand. vol. 177 pp. 437-447 (2003).
Goldberg S.N. et al. Tissue ablation with radiofrequency: Effect of probe size gauge duration and temperature on lesion volume Acad. Radiol. vol. 2 pp. 399-404 (1995).
Gornet, Matthew G et al.; "Magnetic resonance spectroscopy (MRS) can identify painful lumbar discs and may facilitate improved clinical outcomes of lumbar surgeries for discogenic pain", European Spine Journal, vol. 28, pp. 674-687 (2019).
Hanai Kenji et al.; Simultaneous Measurement of Intraosseous and Cerebrospinal Fluid Pressures in the Lumbar Region; SPINE vol. 10 No. 1 1985.
Heggeness Michael H. et al. The Trabecular Anatomy of Thoracolumbar Vertebrae: Implications for Burst Fractures Journal of Anatomy 1997 pp. 309-312 vol. 191 Great Britain.
Heggeness Michael H. et al. Discography Causes End Plate Deflection; SPINE vol. 18 No. 8 pp. 1050-1053 1993 J.B. Lippincott Company.
Heggeness, M. et al Ablation of the Basivertebral Nerve for the Treatment of Back Pain: A Pilot Clinical Study; The Spine Journal, 2011, vol. 11, Issue 10, Supplement, pp. S65-S66, ISSN 1529-9430.
Hoopes et al. "Radiofrequency Ablation of The Basivertebral Nerve as a Potential Treatment of Back Pain: Pathologic Assessment in an Ovine Model" Thermal Treatment of Tissue: Energy Delivery and Assessment III edited by Thomas P. Ryan Proceedings of SPIE vol. 5698 (SPIE Bellingham WA 2005) pp. 168-180.
Houpt Jonathan C. et al.; Experimental Study of Temperature Distributions and Thermal Transport During Radiofrequency Current Therapy of the Intervertebral Disc; SPINE vol. 21 No. 15 pp. 1808-1813 1996 Lippincott-Raven Publishers.
Jourabchi, Natanel et al.; "Irreversible electroporation (NanoKnife) in cancer treatment," Gastrointestinal Intervention, vol. 3, pp. 8-18 (2014).
Khalil, J et al.; "A Prospective, Randomized, Multi-Center Study of Intraosseous Basivertebral Nerve Ablation for the Treatment of Chronic Low Back Pain", The Spine Journal (2019), available at https://doi.org/10.1016/jspinee.2019.05.598.
Kleinstueck Frank S. et al.; Acute Biomechanical and Histological Effects of Intradiscal Electrothermal Therapy on Human Lumbar Discs; SPINE vol. 26 No. 20 pp. 2198-2207; 2001 Lippincott Williams & Wilkins Inc.
Kopecky Kenyon K. et al. "Side-Exiting Coaxial Needle for Aspiration Biopsy"—AJR—1996; 167 pp. 661-662.
Kuisma M et al.; "Modic changes in endplates of lumbar vertebral bodies: Prevalence and association with low back and sciatic pain among middle-aged male workers", Spine, vol. 32(10), pp. 1116-1122 (2007).
Lehmann Justus F. et al.; Selective Heating Effects of Ultrasound in Human Beings; Archives of Physical Medicine & Rehabilitation Jun. 1966.
Letcher Frank S. et al.; The Effect of Radiofrequency Current and Heat on Peripheral Nerve Action Potential in the Cat; U.S. Naval Hospital Philadelphia PA. (1968).

(56) References Cited

OTHER PUBLICATIONS

Lotz JC, et al.; "The Role of the Vertebral End Plate in Low Back Pain", Global Spine Journal, vol. 3, pp. 153-164 (2013).

Lundskog Jan; Heat and Bone Tissue—/an experimental investigation of the thermal properties of bone tissue and threshold levels for thermal injury; Scandinavian Journal of Plastic and Reconstructive Surgery Supplemental 9 From the Laboratory of Experimental Biology Department of anatomy University of Gothenburg Gothenburg Sweden Goteborg 1972.

Martin J.B. et al. Vertebroplasty: Clinical Experience and Follow-up Results Bone Aug. 1999 pp. 11S-15S vol. 25 No. 2 Supplement.

Massad Malek M.D. et al.; Endoscopic Thoracic Sympathectomy: Evaluation of Pulsatile Laser Non-Pulsatile Laser and Radiofrequency—Generated Thermocoagulation; Lasers in Surgery and Medicine; 1991; pp. 18-25.

Mehta Mark et al.; The treatment of chronic back pain; Anaesthesia 1979 vol. 34 pp. 768-775.

Modic MT et al.; "Degenerative disk disease: assessment of changes in vertebral body marrow with MR imaging" Radiology vol. 166 pp. 193-199 (1988).

Mok, Florence et al.; "Modic changes of the lumbar spine: Prevalence, risk factors, and association with disc degeneration and low back pain in a large-scale population-based cohort", The Spine Journal: Official Journal of the North American Spine Society, vol. 16(1), pp. 32-41 (2016).

Nau William H. Ultrasound interstitial thermal therapy (USITT) in the prostate; SPIE vol. 3594 Jan. 1999.

Osteocool Pain Management Brochure, Baylis Medical, copyright 2011.

Pang, Henry et al,; The UTE Disc Sign on MRI: A Novel Imaging Biomarker Associated With Degenerative Spine Changes, Low Back Pain, and Disability, Spine, vol. 42 (Aug. 2017).

Radiological Society of North America. "Pulsed radiofrequency relieves acute back pain and sciatica." ScienceDaily. ScienceDaily, Nov. 27, 2018. <www.sciencedaily.com/releases/2018/11/181127092604.htm>.

Rashbaum Ralph F.; Radiofrequency Facet Denervation A Treatment alternative in Refractory Low Back Pain with or without Leg Pain; Orthopedic Clinics of North America—vol. 14 No. 3 Jul. 1983.

Rosenthal D.I. Seminars in Musculoskeletal Radiology vol. 1 No. 2. pp. 265-272 (1997).

Ryan et al. "Three-Dimensional Finite Element Simulations of Vertebral Body Thermal Treatment" Thermal Treatment of Tissue: Energy Delivery and Assessment III edited by Thomas P. Ryan Proceedings of SPIE vol. 5698 (SPIE Bellingham WA 2005) pp. 137-155.

Shealy C. Norman; Percutaneous radiofrequency denervation of spinal facets Treatment for chronic back pain and sciatica; Journal of Neurosurgery/vol. 43/Oct. 1975.

Sherman Mary S.; The Nerves of Bone The Journal of Bone and Joint Surgery Apr. 1963 pp. 522-528 vol. 45-A No. 3.

Solbiati L. et al. Hepatic metastases: Percutaneous radio-frequency ablation with cooled-tip electrodes. Interventional Radiology vol. 205 No. 2 pp. 367-373 (1997).

Stanton Terry "Can Nerve Ablation Reduce Chronic Back Pain ?" AAOS Now Jan. 2012.

The AVAmax System—Cardinal Health Special Procedures Lit. No. 25P0459-01—www.cardinal.com (copyright 2007).

Tillotson L. et al. Controlled thermal injury of bone: Report of a percutaneous technique using radiofrequency electrode and generator. Investigative Radiology Nov. 1989 pp. 888-892.

Troussier B. et al.; Percutaneous Intradiscal Radio-Frequency Thermocoagulation A Cadaveric Study; SPINE vol. 20 No. 15 pp. 1713-1718 1995 Lippincott-Raven Publishers.

Ullrich Jr. Peter F. "Lumbar Spinal Fusion Surgery" Jan. 9, 2013 Spine-Health (available via wayback machine Internet archive at http://web.archive.org/web/20130109095419/http://www/spine-health.com/treatment/spinal-fusion/lumbar-spinal-fusion-surgery).

Weishaupt, D et al,; "Painful Lumbar Disk Derangement: Relevance of Endplate Abnormalities at MR Imaging", Radiology, vol. 218(2), pp. 420-427 (2001).

YouTube Video, "DFINE-STAR Procedure Animation," dated Sep. 30, 2013, can be viewed at https://www.youtube.com/watch?v=YxtKNyc2e-0.

Kim et al., Transforaminal epiduroscopic basivertebral nerve laser ablation for chronic low back pain associated with Modic changes: A preliminary open-label study. Pain Research and Management 2018; https://pubmed.ncbi.nlm.nih.gov/30186540.

Rahme et al., The Modic vertebral endplate and marrow changes: pathologic significance and relation to low back pain and segmental instability of the lumbar spine. American Journal of Neuroradiology 29.5 (2008): 838-842; http://www.ajnr.org/content/29/5/838.

Macadaeg et al, A prospective single arm study of intraosseous basivertebral nerve ablation for the treatment of chronic low back pain: 12-month results. North American Spine Society Journal; May 27, 2020, 8 pages.

Vadala et al., "Robotic Spine Surgery and Augmented Reality Systems: A State of the Art", Neurospine Epub Mar. 31, 2020; revised: Feb. 22, 2020; accepted: Feb. 24, 2020; retrieved on [Oct. 6, 2022]. Retrieved from the internet URL:https://www.ncbi.nlm.nih.gov/pmc/articles/PMC7136092/pdf/ns-2040060-030.pdf entire document.

\* cited by examiner

VERTEBRAL DENERVATION IN CONJUNCTION WITH VERTEBRAL FUSION

RELATED APPLICATIONS

This application claims priority to U.S. Provisional Application No. 63/050,295 filed Jul. 10, 2020, the entire content of which is incorporated by reference herein in its entirety.

FIELD

Described herein are various implementations of systems and methods for treating back pain (e.g., chronic low back pain) involving both vertebral fusion (e.g., arthrodesis or spondylodesis to fuse adjacent vertebrae) and neuromodulation (for example, ablation of nerves within or surrounding one or more of the adjacent vertebrae) and/or for treating back pain (e.g., chronic low back pain) caused by different (e.g., independent) sources of pain.

BACKGROUND

Back pain is a very common health problem worldwide and is a major cause for work-related disability benefits and compensation. At any given time, low back pain impacts nearly 30% of the US population, leading to 62 million annual visits to hospitals, emergency departments, outpatient clinics, and physician offices. Back pain may arise from strained muscles, ligaments, or tendons in the back and/or structural problems with bones or spinal discs. The back pain may be acute or chronic. Existing treatments for chronic back pain vary widely and include physical therapy and exercise, chiropractic treatments, injections, rest, pharmacological therapy such as opioids, pain relievers or anti-inflammatory medications, and surgical intervention such as discectomy (e.g., total disc replacement), or disc repair. Existing treatments can be costly, addictive (e.g., opioid dependence), temporary, ineffective, and/or can increase the pain or require long recovery times. In addition, existing treatments may not provide adequate relief for the majority of patients and only a small percentage are surgically eligible.

SUMMARY

Back pain can be caused by multiple different (e.g., independent) sources (e.g., radicular pain, neuropathic pain). A particular type of treatment may treat one of the different (e.g., independent) sources of pain (e.g., discogenic pain or pain caused by nerve root compression) but not the other (e.g., pain stemming from one or more vertebrae, such as pain from sources in or on the vertebral endplates or in intraosseous locations within one or more vertebrae). In addition, treatment of one of the independent sources of pain could exacerbate, aggravate, or result in pain caused by another different source of pain. According to several embodiments, methods of providing complete pain treatment of multiple independent sources of back pain in a single combined therapeutic procedure (e.g., one surgical intervention or patient visit) are disclosed herein. In some embodiments, the combined therapeutic procedure disclosed herein reduces or eliminates the need for, or dependence on, pharmaceuticals, such as long-term use of opioids. In some embodiments, different parts or portions of the combined therapeutic procedure are performed under the direction of, and using devices or systems of, different entities. In other embodiments, a single entity may instruct performance of the entire combined therapeutic procedure.

Spinal stabilization or fusion (e.g., spondylodesis or arthrodesis) is a surgical procedure in which two or more adjacent vertebrae of the spine are joined (e.g., fused) together to form a solid integrated bone segment with little or no space between the adjacent vertebrae. Fusion may be performed with an intent to provide increased stabilization and/or to reduce pain (e.g., neuropathic pain). Although spinal stabilization or fusion is generally intended to reduce pain (e.g., chronic low back pain, neuropathic pain, radicular pain) caused by degenerative intervertebral discs, vertebral fractures, scoliosis, stenosis, or other spinal issues, spinal fusion procedures may actually result in additional pain (e.g., a different source of pain). The additional pain may be caused, for example, by, or result from, the hardware, or instrumentation, used to accomplish the fusion (e.g., plates, screws, rods, cages) and/or the graft material (e.g., autograft, allograft, bone graft substitutes, and/or bone morphogenetic proteins) inserted between or adjacent the vertebrae.

For example, the hardware may change the biomechanics of the bone at the spine level and result in offsetting of the load and/or loss of bending moments to different portions of the spine or vertebrae. Bone remodeling around screws of the hardware may also offset the load in the spine, thereby resulting in increased pain. The pain may include persistent pain at the bone graft site, pain to vertebrae adjacent the fused vertebrae resulting from additional stress or loading on the bones adjacent to the fused vertebrae, and/or pain caused by damage to, compression, or aggravation of, nerves in or surrounding the vertebral body by the hardware. The graft material positioned between, within, or surrounding the vertebral bodies may exacerbate vertebral endplate pain as a result of increased loading and stress on the endplate(s). The fusion procedure may include scraping or bloodying of one or more of the endplates (for example, if allograft is used), thereby causing increased endplate pain. The fused vertebrae or adjacent vertebrae may potentially result in Modic changes (or symptoms associated therewith) caused by the fusion or the fused vertebrae or adjacent vertebrae may have had pre-existing Modic changes (or symptoms associated therewith) prior to the fusion procedure.

In addition, the stabilization or fusion procedure may only treat one source of pain and not a second independent source of pain. In accordance with several embodiments, neuromodulation (e.g., denervation) procedures may be performed in conjunction with, or in combination with, fusion procedures (e.g., concurrent with, prior to, or after fusion procedures) to reduce the likelihood of, lingering pain (e.g., chronic low back pain). In some embodiments, neuromodulation therapy is performed first (prior to introduction of fusion hardware) by accessing the vertebral body using access instruments inserted transpedicularly through one or both pedicles or extrapedicularly and then applying neuromodulation therapy within the vertebral body. Pedicle screws may then be inserted through one or more access channels (e.g., channels in one or more pedicles) formed by the access instruments. In accordance with several embodiments, the combined single therapeutic procedure may provide synergistic effects or results that would not be achieved by performing either fusion or neuromodulation procedures in isolation. For example, the neuromodulation may advantageously address the above-described pain caused by, or generated as a result of, the stabilization or fusion. In addition, the source of pain (e.g., back pain caused by instability or nerve root compression or slipping of discs or bones of the spine) intended to be treated by spinal fusion may be different than, and independent from, the source of pain intended to be treated by neuromodulation (e.g., back pain caused by degradation of endplates or by vertebral defects or degeneration). Accordingly, in accordance with some embodiments, performing either spinal fusion or neuromodulation (e.g., basivertebral nerve ablation) in isolation may not adequately address all sources of pain and may therefore provide incomplete treatment and reduced patient satisfaction. However, performing both fusion and neuromodulation (e.g., in a single combined therapeutic procedure in one visit, or with one surgical intervention) may advantageously address both or all independent sources of chronic low back pain, thereby increasing patient comfort and satisfaction. In some implementations, both fusion and neuromodulation are performed without closing an open surgical access site between the two procedures. In accordance with several implementations, the combined therapies do not require trialing and feedback to determine appropriate stimulation or other neuromodulation parameters.

In several embodiments, the synergy achieved by combined fusion and neuromodulation reduces a patient's pain score (e.g., Oswestry Disability Index (ODI) score or Visual Analogue Score (VAS)) in a manner that is more favorable than what would be seen additively. Synergistic interactions result in enhanced potency and/or efficacy of the procedures in some embodiments. For example, pain may be improved both short term and long term, the time to return to normal activities may be reduced, and/or the length of time that pain is reduced is increased.

If neuromodulation is performed before fusion, the neuromodulation may be performed within a few minutes (e.g., 5 minutes-30 minutes) or within hours (e.g., less than 1 hour, less than 2 hours, less than 3 hours) prior to the fusion. If neuromodulation is performed following fusion, the neuromodulation may be performed within a few minutes, within a few hours, within a few days, or within a few months following the fusion procedure. For example, the neuromodulation may be performed if pain persists following the fusion procedure. However, neuromodulation may advantageously be performed during the same time as the fusion (e.g., during the same surgical intervention or patient visit) to preempt the likely pain caused by, or resulting from, the fusion procedure, thereby advantageously reducing the number of visits to the doctor and the amount of pain experience by a patient. The neuromodulation may include denervation (e.g., ablation) of one or more intraosseous nerves (e.g., basivertebral nerve or BVN) within one or more vertebral bodies (e.g., the fused vertebrae and/or adjacent vertebrae). In some embodiments, vertebral neuromodulation and fusion are performed under the direction of, and using devices or systems of, different entities. In other embodiments, a single entity may instruct performance of the entire combined therapeutic procedure.

Pain can be very subjective based on individual patient pain tolerance and perception. Additionally, it can be difficult to assess or quantify efficacy of pain treatment based on patient feedback, especially immediately following a fusion procedure because the patients are typically under general anesthesia and unable to provide feedback. In other cases, the patient may be awake but unable to accurately assess pain.

Neuromodulation procedures may include modulation of nerves within or surrounding bones. The terms "modulation" or "neuromodulation", as used herein, shall be given their ordinary meaning and shall also include ablation, permanent denervation, temporary denervation, disruption, blocking, inhibition, electroporation, therapeutic stimulation, diagnostic stimulation, inhibition, necrosis, desensitization, or other effect on tissue. Neuromodulation shall refer to modulation of a nerve (structurally and/or functionally) and/or neurotransmission. Modulation is not limited to nerves and may include effects on other tissue, such as tumors or other soft tissue.

In several embodiments, the systems and methods described herein are provided without any electrical stimulation (e.g., without dorsal root ganglion stimulation or without stimulation to promote fusion). In some embodiments, the systems and methods described herein do not involve modulation of facet joints or sacroiliac joints or nerves associated with facet joints or sacroiliac joints.

In accordance with several embodiments, a method of treating multiple independent sources of low back pain of a patient during a single therapeutic intervention includes performing a spinal fusion procedure between two adjacent vertebrae of the patient, wherein the spinal fusion procedure comprises leaving one or more hardware components within or surrounding each of the adjacent vertebrae. The method also includes inserting an access tool within an inner cancellous bone region of a vertebral body of one of the two adjacent vertebrae while avoiding contact with the one or more hardware components. The access tool includes a lumen extending therethrough to facilitate access to the inner cancellous bone region. The method further includes inserting a neuromodulation device through the lumen of the access tool until at least a distal end of the neuromodulation device extends beyond the access tool within the inner cancellous bone region. The method also includes modulating a basivertebral nerve within the inner cancellous bone region using the neuromodulation device and removing the neuromodulation device and the access tool from the patient.

The step of inserting the access tool within the inner cancellous bone region may include extrapedicularly inserting the access tool within the inner cancellous bone region using an access location superior or inferior to a pedicle of a superior vertebra of the adjacent vertebrae. The method may include identifying the two adjacent vertebrae by determining (e.g., via imaging or via biomarkers) that the two adjacent vertebrae exhibit one or more Modic changes or pre-Modic changes, or symptoms indicative of vertebral degeneration or endplate defects. The two adjacent vertebrae may comprise an L5 vertebra and an S1 vertebra, two lumbar vertebrae, two sacral vertebrae, two thoracic vertebrae, or other two adjacent vertebrae of the same spine section or different spine sections. The access tool may include a cannula and stylet assembly, with the stylet extending through a lumen of the cannula.

The method may include inserting the access tool within an inner cancellous bone region of a vertebral body of the other one of the two adjacent vertebrae while avoiding contact with the one or more hardware components and inserting the neuromodulation device through the lumen of the access tool until at least a distal end of the neuromodulation device extends beyond the access tool within the inner cancellous bone region of the vertebral body of the other one of the two adjacent vertebrae. The method may alternative include inserting the access tool within an inner cancellous bone region of a vertebral body of a vertebra other than the two adjacent vertebrae and inserting the neuromodulation device through the lumen of the access tool until at least a distal end of the neuromodulation device extends beyond the access tool within the inner cancellous bone region of the vertebral body of the vertebra other than the two adjacent vertebrae.

The method may further include confirming modulation (e.g., ablation, denervation) of the basivertebral nerve. The neuromodulation device may comprise a radiofrequency probe (e.g., bipolar radiofrequency probe) configured to deliver radiofrequency energy sufficient to modulate (e.g., ablate, denervate) the nerve. The method may include confirming electrical isolation between electrodes of a bipolar radiofrequency probe and the one or more hardware components. The neuromodulation device may be configured to apply ultrasound energy sufficient to modulate (e.g., ablate, denervate) the basivertebral nerve. The neuromodulation device may be configured to generate thermal energy sufficient to ablate the basivertebral nerve. In some embodiments, the neuromodulation device is a cryoablation device, a resistive heating device, or a laser device. In some embodiments, the neuromodulation device is configured to deliver a fluid configured to denervate the basivertebral nerve. In accordance with several embodiments, the neuromodulation device is non-implantable and only temporarily inserted during the modulation.

In some embodiments, modulating the basivertebral nerve comprises (i) stimulating the basivertebral nerve without significantly stimulating other tissue or (ii) denervating the basivertebral nerve with no electrical stimulation. In some embodiments, modulating the basivertebral nerve comprises (i) denervating only the basivertebral nerve or (ii) denervating the basivertebral nerve and neuromodulating other nerves, such as adjacent nerves to the basivertebral nerve.

The method may further include performing a total disc replacement between the adjacent vertebrae. In some embodiments, the step of performing a spinal fusion procedure is replaced with performing a total disc replacement between the adjacent vertebrae.

In accordance with several embodiments, a method of treating low back pain of a patient includes inserting an access tool or assembly (e.g., cannula and stylet assembly, with the stylet extending through a lumen of the cannula) within an inner cancellous bone region of a vertebral body of one of two adjacent vertebrae that have been fused together during a spinal fusion procedure (which may have been previously performed or instructed by a different entity or the same entity). The step of inserting includes avoiding contact with one or more hardware components left within or surrounding each of the adjacent vertebrae following the fusion procedure. The method also includes inserting a nerve modulation device (e.g., nerve ablation device, denervation device) through a lumen of the access tool or assembly (e.g., lumen of the cannula) until at least a distal end of the nerve modulation device (e.g., nerve ablation device) extends beyond the access tool within the inner cancellous bone region of the vertebral body. The method also includes modulating (e.g., ablating, denervating) a basivertebral nerve within the inner cancellous bone region using the nerve modulation device (e.g., bipolar radiofrequency probe, chemical ablation device, cryoablation device, microwave ablation device, ultrasound ablation device, laser ablation device). The method further includes removing the nerve modulation device and the access tool or assembly from the patient (e.g., the nerve modulation device is not implanted for modulation over time).

The step of inserting the access tool within the inner cancellous bone region may include extrapedicularly inserting the access tool or assembly within the inner cancellous bone region using an access location superior to a pedicle of a superior vertebra of the adjacent vertebrae. The step of inserting the access tool within the inner cancellous bone region may alternatively or additionally include extrapedicularly inserting the access tool within the inner cancellous bone region using an access location inferior to a pedicle of an inferior vertebra of the adjacent vertebrae.

The method may further include identifying the two adjacent vertebrae by determining that the two adjacent vertebrae exhibit at least one of: vertebral endplate defects, vertebral endplate degeneration, Modic changes or pre-Modic changes likely to result in a diagnosis of Modic changes in the future. The determining may be performed using magnetic resonance images (e.g., using IDEAL MRI sequences) obtained of at least portions of the two adjacent vertebrae. The determining may also include use of artificial intelligence techniques that involve trained neural networks or deep learning models to facilitate the determination.

The two adjacent vertebrae may comprise an L5 vertebra and an S1 vertebra, two adjacent lumbar vertebrae, or two adjacent sacral vertebrae. The two adjacent vertebrae may be vertebrae of a same spine section, level or segment or of different spine sections, levels or segments.

The modulation of the basivertebral nerve may include ablating the basivertebral nerve by applying, or causing to be delivered, thermal energy having a temperature between 70 and 90 degrees Celsius with a temperature ramp of between 1 and 3 degrees Celsius per second for a duration of between 5 minutes and 15 minutes.

The method may further include inserting the access tool or assembly within an inner cancellous bone region of a vertebral body of the other one of the two adjacent vertebrae while avoiding contact (e.g., not touching, coupling, or connecting) with the one or more hardware components and inserting the nerve ablation device through the lumen of the access tool until at least a distal end of the nerve ablation device extends beyond the access tool within the inner cancellous bone region of the vertebral body of the other one of the two adjacent vertebrae.

The method may also include confirming modulation (e.g., ablation) of the basivertebral nerve. For implementations in which the nerve modulation device is a bipolar radiofrequency probe, the method may include confirming electrical isolation between electrodes of the bipolar radiofrequency probe and the one or more hardware components.

In accordance with several embodiments, a kit for treating multiple independent sources of low back pain of a patient during a single therapeutic intervention includes a bone access assembly including an introducer cannula and a sharp stylet adapted to penetrate cortical bone, an intervertebral fusion assembly including multiple screws and multiple rods or plates, and a neuromodulation device configured to modulate (e.g., ablate, denervate) an intraosseous nerve (e.g., basivertebral nerve) within a vertebral body. In some embodiments, the neuromodulation device is non-implantable and is removed during the single therapeutic intervention.

In some embodiments, the intervertebral fusion assembly further includes graft material and/or a cage. The intervertebral fusion assembly may also include one or more implantable pharmacological agents configured to facilitate fusion, reduce inflammation, and/or reduce scar formation. The neuromodulation device may comprise a radiofrequency energy delivery probe configured to deliver radiofrequency energy sufficient to ablate the intraosseous nerve. The neuromodulation device may comprise a microwave energy delivery device, an ultrasound energy delivery device, a laser energy delivery device, a fluid delivery device, and/or a cryogenic cooling device. The kit may further include a nerve finding device or nerve monitoring device.

In accordance with several embodiments, a system for treating multiple independent sources of low back pain (e.g., chronic low back pain) of a patient during a single therapeutic intervention includes an introducer cannula and a sharp stylet adapted to be inserted through the introducer cannula and advanced together with the introducer cannula to penetrate cortical bone of a vertebral body. The sharp stylet is configured to be removed from the introducer cannula to facilitate insertion of other instruments within the vertebral body. The system also includes a plurality of fusion rods or plates, a plurality of bone screws adapted to anchor the plurality of fusion rods or plates to bone, and a radiofrequency generator. The system further includes a radiofrequency energy delivery probe configured to (i) be connected to the radiofrequency generator, (ii) be advanced through the introducer cannula, and (iii) apply energy from the radiofrequency generator in an amount sufficient to denervate a basivertebral nerve within the vertebral body. The system may further include an implantable pharmacological agent configured to facilitate fusion, reduce inflammation, and/or reduce scar formation.

In accordance with several embodiments, a system for treating multiple independent sources of low back pain of a patient during a single therapeutic intervention includes an introducer cannula and a sharp stylet adapted to be inserted through the introducer cannula and advanced together with the introducer cannula to penetrate cortical bone of a vertebral body. The sharp stylet is configured to be removed from the introducer cannula to facilitate insertion of other instruments within the vertebral body. The system also includes a plurality of fusion rods or plates, a plurality of bone screws adapted to anchor the plurality of fusion rods or plates to bone, and a neuromodulation device configured to modulate an intraosseous nerve within the vertebral body. The system may also include an implantable pharmacological agent configured to facilitate fusion, reduce inflammation, and/or reduce scar formation. The neuromodulation device may comprise a radiofrequency energy delivery probe configured to deliver radiofrequency energy sufficient to ablate the intraosseous nerve, a microwave energy delivery device, an ultrasound energy delivery device, a laser energy delivery device, a fluid delivery device, and/or a cryogenic cooling device. The system may include nerve finding device or nerve monitoring device.

Several embodiments of the invention have one or more of the following advantages: (i) increased patient satisfaction; (ii) increased efficiency; (iii) synergistic results; (iv) "one-and-done" procedure that does not require further surgical intervention; (v) reduced pain scores; (vi) reduced need for, or dependence on, opioids; (vii) simple adoption of a combined procedure performed by a single clinician (e.g., spine surgeon) without requiring extensive training; and/or (viii) treatment of multiple, independent sources of chronic low back pain. By reducing or eliminating the need for long-term pain management drugs in some embodiments, such as opioids, addiction to such pharmaceuticals may in turn be reduced.

For purposes of summarizing the disclosure, certain aspects, advantages, and novel features of embodiments of the disclosure have been described herein. It is to be understood that not necessarily all such advantages may be achieved in accordance with any particular embodiment of the disclosure provided herein. Thus, the embodiments disclosed herein may be embodied or carried out in a manner that achieves or optimizes one advantage or group of advantages as taught or suggested herein without necessarily achieving other advantages as may be taught or suggested herein.

The methods summarized above and set forth in further detail below describe certain actions taken by a practitioner; however, it should be understood that they can also include the instruction of those actions by another party. Thus, actions such as "performing a neuromodulation procedure" include "instructing the performance of a neuromodulation procedure." Further aspects of embodiments of the disclosure will be discussed in the following portions of the specification. With respect to the drawings, elements from one figure may be combined with elements from the other figures.

BRIEF DESCRIPTION OF THE DRAWINGS

Several embodiments of the disclosure will be more fully understood by reference to the following drawings which are for illustrative purposes only.

DETAILED DESCRIPTION

Figure 1:
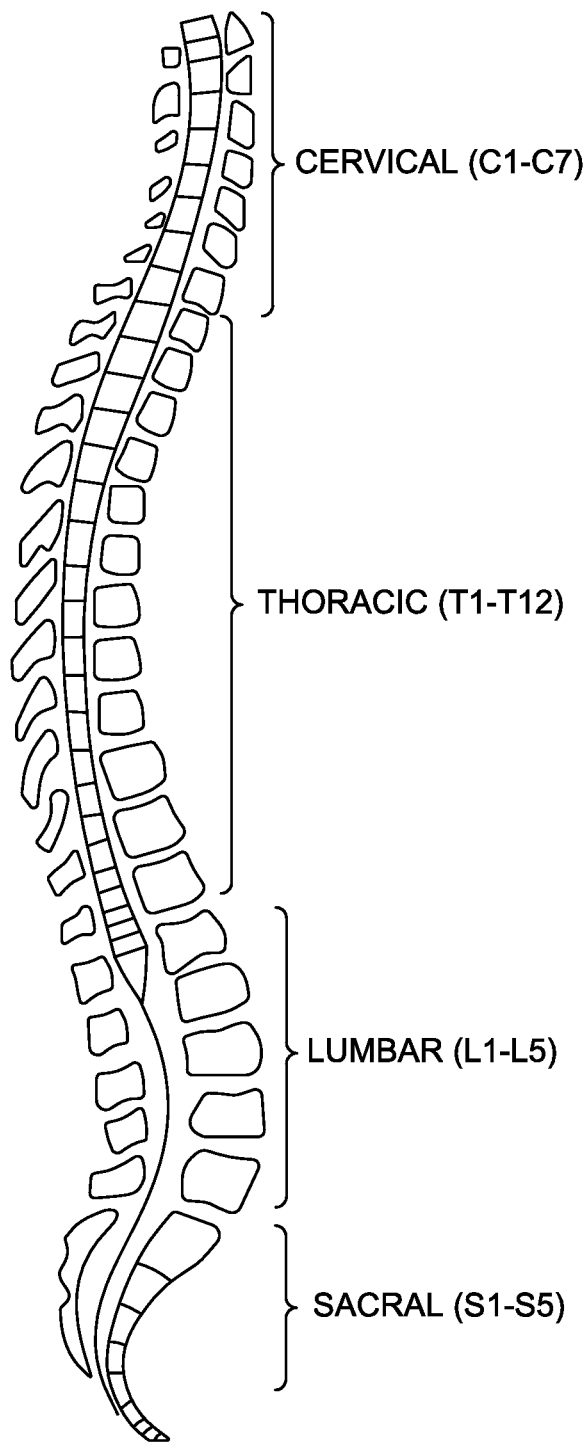
FIG. 1 illustrates various vertebral levels and vertebrae that may be treated by the systems and methods described herein.

Several implementations described herein are directed to systems and methods for modulating nerves within or adjacent (e.g., surrounding) bone prior to, contemporaneous with, or following (post facto) one or more spinal fusion (e.g., interbody fusion), stabilization, and/or disc replacement (e.g., total disc replacement) operations. In some implementations, one or more intraosseous nerves (e.g., basivertebral nerve) within one or more bones (e.g., vertebral body, facet, lamina, pedicle) of the spine is modulated (e.g., ablated) for treatment, or prevention of, chronic back pain. The vertebral body/bodies may be located in any level of the vertebral column (e.g., cervical, thoracic, lumbar and/or sacral). FIG. 1 schematically illustrates a vertebral column and the various vertebral segments or levels that may be treated.

Multiple vertebral bodies may be treated in a single visit or combined therapeutic procedure (simultaneously or sequentially). The multiple vertebral bodies may be adjacent fused vertebral bodies and/or vertebral bodies adjacent the fused vertebral bodies. The multiple vertebral bodies may be located in a single spine segment (e.g., two adjacent vertebral bodies in the sacral spine segment (e.g., S1 and S2) or lumbar spine segment (e.g., L3, L4 and/or L5)) or in different spine segments (e.g., an L5 vertebra in the lumbar spine segment and an S1 vertebra in the sacral spine segment). The combined therapeutic procedure may be performed on vertebral levels or segments that are difficult to access via a percutaneous approach. All or portions of the procedure may be performed using an open surgical approach, a percutaneous approach, or an endoscopic (e.g., laparoscopic) approach.

Although spinal fusion (e.g., interbody fusion) is generally intended to reduce pain (e.g., chronic low back pain) caused by degenerative intervertebral discs, vertebral fractures, scoliosis, stenosis, or other spinal issues, spinal fusion procedures may actually result in additional pain. The additional pain may be caused by, or result from, the hardware, or instrumentation, used to accomplish the fusion (e.g., plates, screws, rods, cages) and/or the graft material (e.g., autograft, allograft, bone graft substitutes, and/or bone morphogenetic proteins). For example, the hardware may change the biomechanics of the bone and result in offsetting of the load to different portions of the spine or vertebrae (e.g., due to loss of bending moments). Bone remodeling around screws of the hardware may also offset the load in the spine, resulting in increased pain. The pain may include persistent pain at the bone graft site, pain to vertebrae adjacent the fused vertebrae resulting from additional stress or loading on the bones adjacent to the fused vertebrae, and/or pain caused by damage to nerves in or surrounding the vertebral body by the hardware. The interbody graft material positioned between, within, or surrounding the vertebral bodies may exacerbate endplate pain as a result of increased loading and stress. The fusion procedure may include scraping and bloodying of one or more of the endplates (for example, if allograft material is used), thereby causing increased or additional endplate pain.

The fused vertebrae or vertebrae adjacent or surrounding the fused vertebrae may result in Modic changes (or symptoms associated therewith) caused by the fusion, or the fused vertebrae or adjacent vertebrae may have had pre-existing Modic changes (or symptoms associated therewith) prior to the fusion procedure. The Modic changes include pathological changes in a body of a vertebra and/or in an endplate of the vertebra or intervertebral disc. These Modic changes typically correlate to low back pain. The Modic changes may be identified using magnetic resonance imaging or other imaging modalities (e.g., CT, X-ray, fluoroscopic imaging). The Modic changes may include Type 1 Modic changes that include findings of inflammation and edema, type 2 Modic changes that include changes in bone marrow and increased visceral fat content, and/or type 3 Modic changes that include factures of trabecular bone of the vertebra and/or trabecular shortening and widening. In addition to Modic changes, the vertebrae may be identified as having pre-Modic changes prior to an official characterization of a Modic change or may be identified as having vertebral endplate degeneration or vertebral endplate defects (e.g., corner defects, erosive defects, focal defects, rim defects, etc.).

Neuromodulation may be performed prior to, contemporaneously with, or following vertebral fusion to prevent or treat pain that has been or may be generated by vertebral fusion and/or to treat pain caused by pre-existing Modic changes. For example, the neuromodulation may advantageously address the above-described pain caused by the fusion. If a fusion procedure is performed but fusion never really occurs due to a failure to fuse (e.g., pseudoarthrosis) or stabilize, then Modic changes or vertebral endplate degeneration or defects could be generated by the failed fusion that cause pain. In addition, the source of pain intended to be treated by spinal fusion (e.g., back pain caused by decompression or instability or tension or slippage) may be different than, or independent from, the source of pain intended to be treated by neuromodulation of a basivertebral nerve (e.g., pain caused by degradation or degeneration of endplates). Accordingly, performing either spinal fusion or neuromodulation (e.g., of basivertebral nerve) in isolation may not adequately address all sources of pain and may therefore provide incomplete treatment and reduced patient satisfaction. However, performing both fusion and neuromodulation (including performing them both in a single combined therapeutic procedure) may advantageously address both or all independent sources of chronic low back pain, thereby increasing patient comfort and satisfaction.

The neuromodulation may target intraosseous nerves (e.g., a basivertebral nerve) within one or more vertebral bodies. In some implementations, the one or more nerves being modulated are extraosseous nerves located outside the vertebral body or other bone (e.g., at locations before the nerves enter into, or after they exit from, the vertebral foramen). For example, nerve endings in endplates may be ablated in combination with total disc replacement or fusion procedures instead of ablating nerves within a vertebral body (e.g., when preparing for fusion using one or more spatulas). Portions of nerves within or on one or more vertebral endplates or intervertebral discs between adjacent vertebral bodies may be modulated (e.g., denervated, ablated).

The combined fusion (and/or total disc replacement) and modulation of nerves or other tissue (e.g., basivertebral nerve denervation or ablation) may be performed to treat one or more indications, including but not limited to chronic low back pain, upper back pain, acute back pain, joint pain, tumors in the bone, and/or bone fractures. The combined therapeutic procedure may advantageously provide synergistic effects or complete all-in-one, "one-and-done" treatment that will not require further surgical or minimally invasive interventions, thereby increasing efficiency, reducing patient inconvenience (in terms of both time and pain), and increasing patient satisfaction. As discussed previously, there may be multiple independent sources of back pain (e.g., (a) back pain caused by slipped discs, pinched spinal nerves, herniated discs, spinal stenosis, or spinal structural abnormalities and/or (b) back pain stemming from vertebral endplate degradation, such as caused by Modic changes or vertebral endplate degeneration or defects). Performing fusion or basivertebral nerve ablation alone may not treat or relieve all of the independent sources of a patient's chronic back pain. However, performing both fusion and basivertebral nerve ablation may advantageously address multiple or all independent sources of the patient's chronic back pain, thereby providing a total or more complete "one-and-done" treatment that provides total or more complete relief to the patient. The combined therapeutic procedure may advantageously result in better long-term back pain scores from patients (e.g., lower ODI scores, lower Oswestry low back pain scores, lower Roland-Morris disability scores, lower Quebec back pain disability scores, improved Visual Analogue scores) than would be achieved by performing either fusion or neuromodulation (e.g., basivertebral nerve ablation) in isolation.

In some embodiments, implantable pharmacological therapies and/or biologics are administered along with the combined therapies described herein. For example, these include pain management drugs delivered to reduce dependence, stem cells, cytokines, antibodies, growth factors, or other biologics that aid in the fusion process and/or reduce inflammation or scar tissue. In some embodiments, the neuromodulation therapies disclosed herein may be implantable on a short-term or long-term basis. In several embodiments, neuromodulation comprises or consists essentially of non-implantable denervation of the BVN (with no other nerves denervated and/or no stimulation). Alternatively, in one embodiment, the BVN is neuromodulated along with other nerves. In one embodiment, when two, three or more nerves are neuromodulated, the neuromodulation can be the same (e.g., all denervation) or different (e.g., a combination of denervation or stimulation). In several embodiments, no stimulation (e.g., electrical stimulation) is provided (e.g., at the time of the combined procedures and/or to facilitate the fusion).

In some implementations, fractures within the bone may be treated in addition to neuromodulation treatment and/or ablation of tumors by applying heat or energy and/or delivering agents or bone filler material to the bone. For example, bone morphogenetic proteins and/or bone cement may be delivered in conjunction with vertebroplasty or other procedures to treat fractures or promote bone growth or bone healing. In some implementations, energy is applied using the neuromodulation tools and then agents and/or bone filler material is delivered in a combined procedure. In some aspects, vertebral compression fractures (which may be caused by osteoporosis or cancer) are treated in conjunction with energy delivery to modulate nerves and/or cancerous tissue to treat potential additional sources of back pain.

Figure 2A:
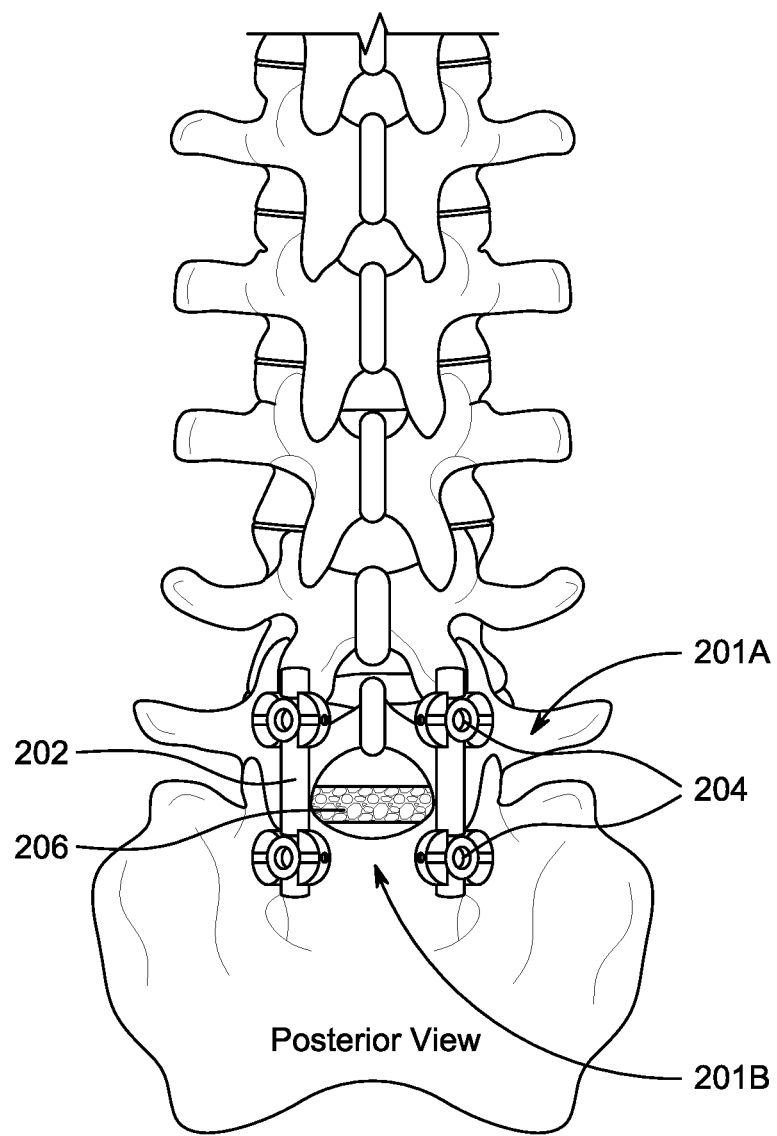
FIGS. 2A, 2B and 2C illustrate various views of a portion of a patient's spine after fusion has been performed between two adjacent vertebrae. The figures show the residual hardware left in place following the fusion.
Figure 2B:
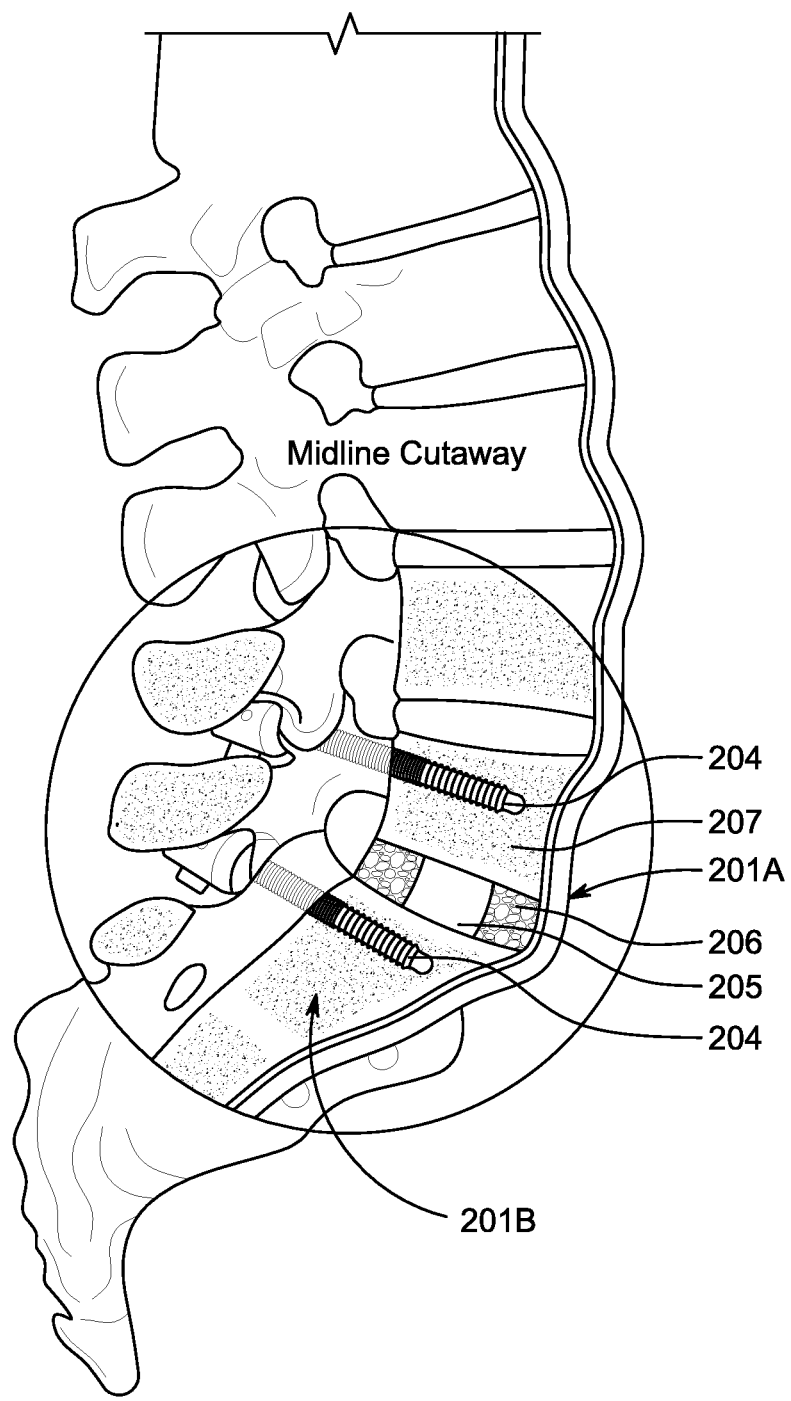

FIGS. 2A and 2B respectively illustrate a posterior view and a side view (with a midline cutaway) of two fused vertebrae 201A, 201B (collectively 201) after fusion or stabilization has been performed. As shown, fusion of the vertebrae 201 may involve use of rods 202 and plates 203 (shown in FIG. 3A) that are fixed to the adjacent vertebrae 201A, 201B by screws 204. The fusion may also include insertion of a cage 205 and/or graft material 206 (e.g., mechanical inserts, bone growth substances or fillers) between the adjacent vertebrae 201 after removal of some or all of the intervertebral disc. The graft material 206 may include, for example, autograft, allograft, bone graft substitutes, and/or bone morphogenetic proteins. The fusion may include scraping and bloodying of endplate surfaces, especially if allograft is used, in order to promote bone growth.

In some implementations, the screws 204 are inserted through a pedicle or other bony portion of the spine and into an inner cancellous bone region 207 of the vertebrae 201. The screws 204 may be used to stabilize a portion of the spine (e.g., one or more spine segments or levels) or to repair spinal defects (e.g., scoliosis, herniated discs, fractures, etc.). The type of spinal fusion may comprise anterior lumbar interbody fusion (ALIF), posterior lumbar interbody fusion (ALIF), lateral lumbar interbody fusion (LLIF), posterolateral gutter fusion, extreme lateral interbody fusion (XLIF) and/or transforaminal lumbar interbody fusion (TLIF). The screws 204 may be pedicle screws.

If neuromodulation (e.g., basivertebral nerve ablation within one or more vertebral bodies) is performed prior to fusion, any method of access (e.g., transpedicular, extrapedicular and/or anterior access) may be used, which may result in a less complex and less difficult overall combined therapeutic procedure in some embodiments. The fusion could then be performed using the same or different method of access as the access used for the neuromodulation procedure. For example, if the fusion desired or needed to be performed is an ALIF type of fusion, transpedicular access may not be used. For neuromodulation performed following vertebral fusion, the residual hardware or instrumentation that remains in and surrounding the adjacent vertebral bodies may make it more difficult for clinicians to access a desired target region of an intraosseous nerve (e.g., basivertebral nerve) modulation (e.g., denervation, ablation) therapy within one or more vertebral bodies.

Figure 2C:
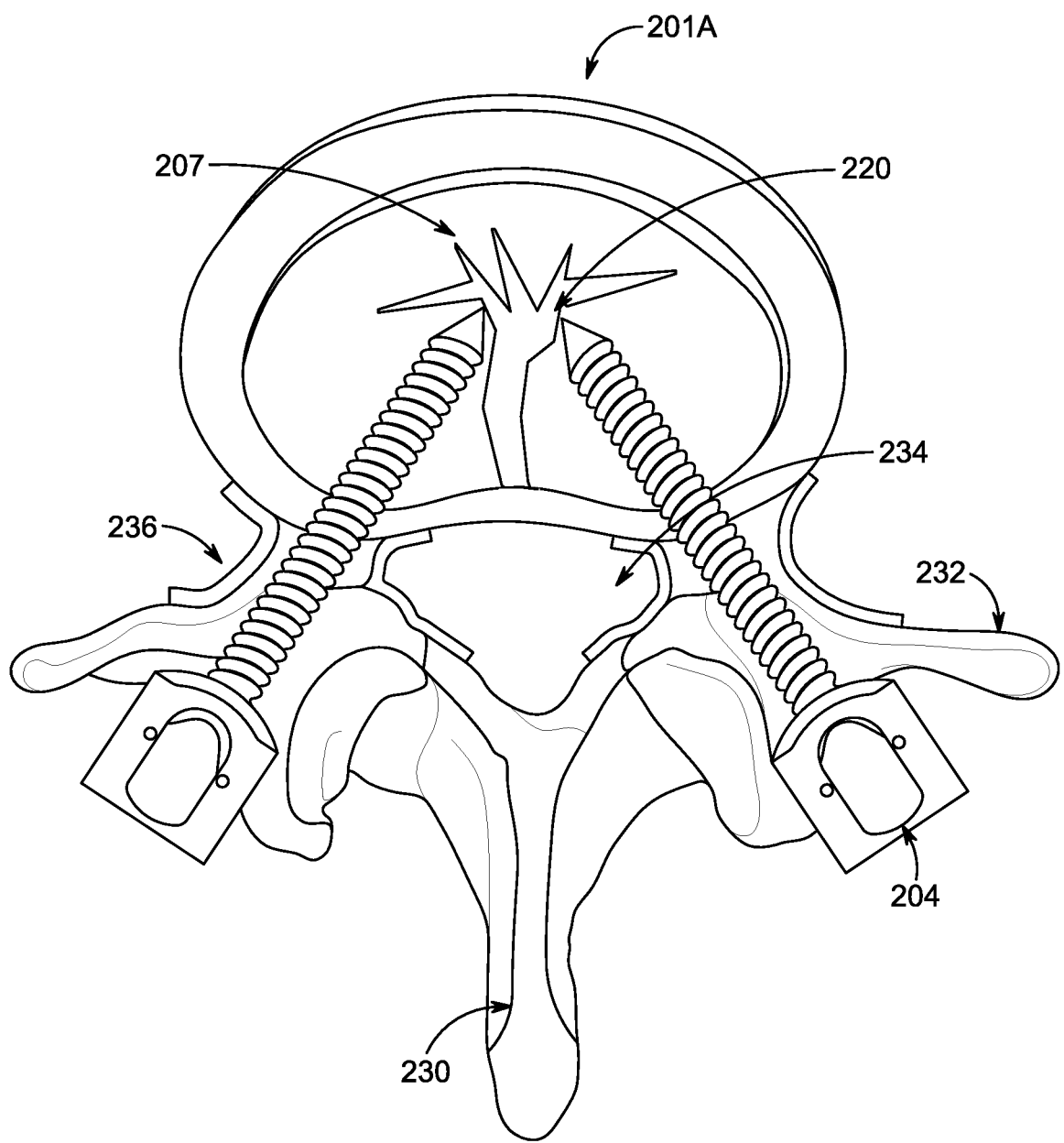

FIG. 2C illustrates a top cross-section view of one of the vertebral segments or levels. The vertebral segment includes a vertebral body 201A, a spinous process 230, transverse processes 232, a spinal canal 234, and pedicles 236. The vertebral body 201A includes an inner cancellous bone region 207 having a basivertebral nerve trunk 220. The vertebral body 201A includes hardware (e.g., screws 204) having been inserted through the pedicles 236. A desired target region for ablation of a basivertebral nerve trunk 220 may be, for example, 0.5 cm to 3 cm (e.g., 1 cm to 3 cm) anterior of a posterior border of the vertebral body 201A and generally at a lateral-lateral midline of the vertebral body 201A and generally aligned with the spinous process 230 of the vertebra corresponding to the vertebral body 201A.

Figure 3A:
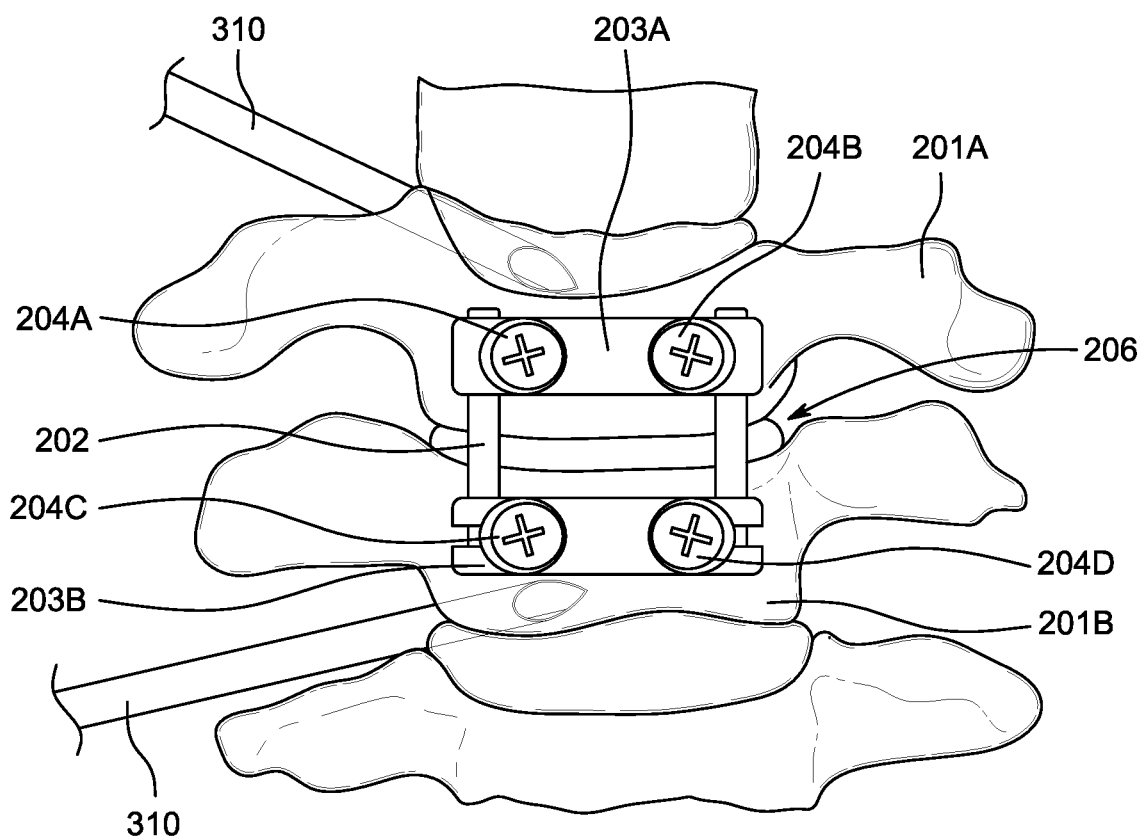
FIGS. 3A and 3B illustrate example methods of accessing at least one of the fused vertebrae following a fusion.
Figure 3B:
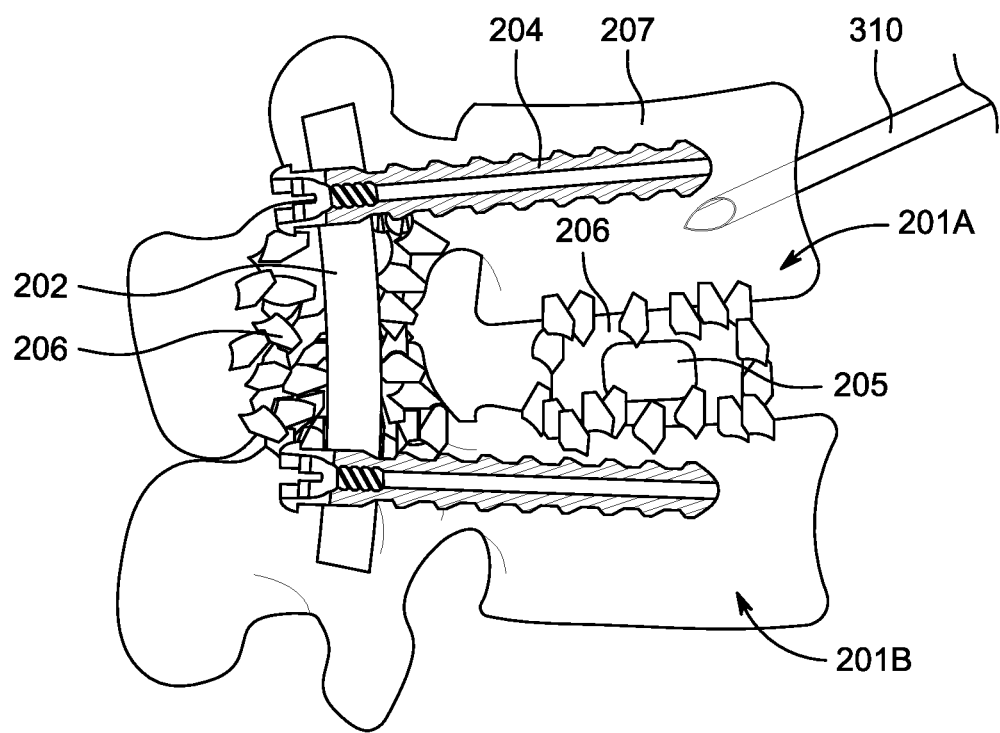

FIGS. 3A and 3B illustrate example methods of accessing an inner cancellous bone region 207 of one of the fused vertebrae 201 following the fusion procedure. FIG. 3A is a side view of a posterior side of a spine and FIG. 3B is a lateral side view of the spine. Various methods of access may be used to access the inner cancellous bone region 207 where intraosseous nerves (e.g., basivertebral nerves) within the vertebral body are located to perform the neuromodulation (e.g., ablation, denervation).

In some implementations, as shown in FIG. 3A, the inner cancellous bone region 207 is accessed extrapedicularly (e.g., without traversing through a pedicle). For example, transpedicular access may not be possible because the residual hardware (e.g., pedicle screws 204) is impeding transpedicular access. FIG. 3A schematically illustrates two different extrapedicular access paths by an access tool/assembly 310. In some implementations, the access path may involve insertion of an access tool/assembly 310 superior to (e.g., above) a pedicle and arcing over residual hardware (e.g., screws 204, rods 202, plates 203) left in place from the fusion procedure. In some implementations, the access path may involve insertion of the access tool/assembly 310 inferior to (e.g., below) a pedicle and arcing under residual hardware (e.g., screws, rods, plates) left in place from the fusion procedure. For extrapedicular access of the superior vertebra (e.g., L5 vertebra) of the two fused vertebrae, the access tool 310 (e.g., introducer cannula/stylet assembly) may be inserted superior to the plate 203A and the screws 204A, 204B (as shown in FIG. 3A). For extrapedicular access of the inferior vertebra (e.g., S1 vertebra) of the two fused vertebrae, the access tool 310 (e.g., introducer cannula/stylet assembly) may be inserted inferior to the plate 203B and the screws 204C, 204D (as also shown in FIG. 3A).

The access tool/assembly 310 may advantageously be inserted and advanced along an access path that avoids contact with a spinal nerve exiting from an adjacent level of the spine. In accordance with several embodiments, an access path below (inferior to) the pedicle may be used because contact with a spinal nerve is less likely if access is below (inferior to) the pedicle and/or because this access path will likely get the treatment device for neuromodulation closer to the midline of the vertebral body where the target treatment zone (e.g., basivertebral nerve trunk 220) is likely to be located for the neuromodulation. In addition, neural monitoring (e.g., using nerve finding or nerve monitoring tools and techniques) may be performed to avoid contact with the spinal nerve upon extrapedicular access following fusion. The nerve monitoring tools and techniques may incorporate measurements of electromyography and somatosensory evoked potentials.

In some implementations, the inner cancellous bone region 207 is accessed transpedicularly (through a pedicle). For example, transpedicular access for the neuromodulation therapy may be used if a unilateral fusion has been performed, such that contralateral transpedicular access through the other pedicle remains available. Transpedicular access may also be possible if an anterior fusion (ALIF) has been performed previously. However, transpedicular access may not be possible in some instances due to location of one or more of the screws 204, which may be inserted through one or more of the pedicles. In some implementations, as shown in FIG. 3B, an anterior approach is used to access the inner cancellous bone region 207 with the access tool/assembly 310 if a transpedicular approach is not available. In some implementations (not shown), the inner cancellous bone region 207 is accessed using an extreme lateral approach or a transforaminal approach, such as used in XLIF or TLIF interbody fusion procedures.

Access to the inner cancellous bone region may be performed under an imaging modality in order to prevent interference or contact with the fusion hardware, or instrumentation (e.g., screws 204, rods 202, plates 203). The imaging modality may advantageously provide real-time imaging or access may be based on previously-obtained images. The imaging modality may include fluoroscopy, computed tomography, magnetic resonance imaging, ultrasound, X-ray, and/or the like. Access may also be performed using an automated system (e.g., robotic guidance system), which may incorporate an imaging modality, virtual or augmented reality technology, and/or artificial intelligence data or techniques, to facilitate more precise insertion and positioning of the access tools.

Access tools may include an introducer assembly including an outer cannula and a sharpened stylet, an inner cannula configured to be introduced through the outer cannula, and/or one or more additional stylets, curettes, or drills to facilitate access to an intraosseous location within a vertebral body or other bone. The access tools (e.g., outer cannula, inner cannula, stylets, curettes, drills) may have pre-curved distal end portions or may be steerable, deflectable, flexible, or curveable. Any of the access tools may be drill-tipped or beveled or they may have blunt or rounded, atraumatic distal tips. Curved drills may be used to facilitate formation of curved access paths within bone. Any of the access tools may be advanced over a guidewire in some implementations.

Figure 4:
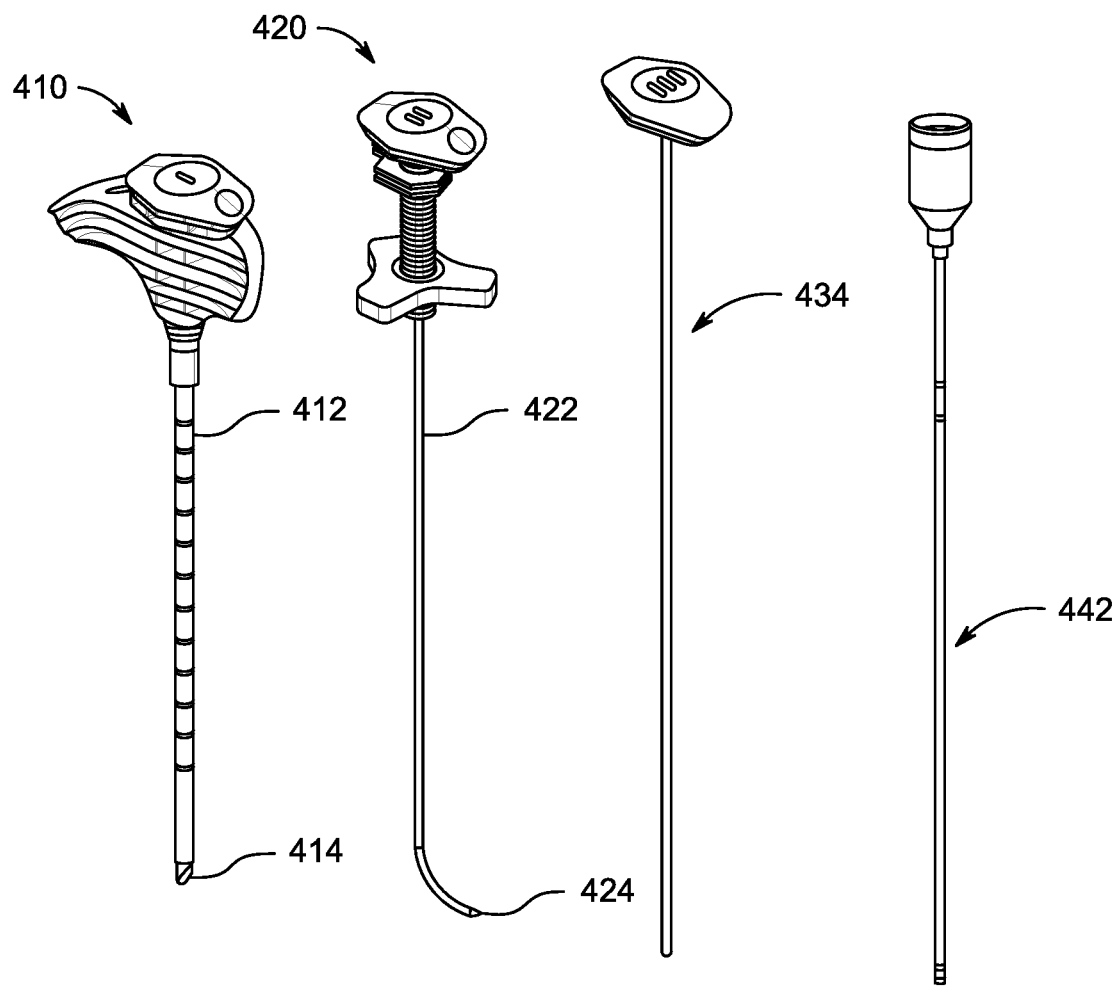
FIG. 4 illustrates an example system of access tools and a treatment device configured to access and modulate a nerve within a vertebral body.

With reference to FIG. 4, in one implementation, the access tools for neuromodulation therapy include an introducer assembly 410 comprised of an introducer cannula 412 and an introducer stylet 414, a curved cannula assembly 420 comprised of a curved cannula 422 and a J-stylet 424, and a straight stylet 434. The introducer stylet 414 may be bevel tipped or trocar tipped. The introducer stylet 414 is configured to be received in a lumen of the introducer cannula 412 such that a distal tip of the introducer stylet 414 protrudes from an open distal tip of the introducer cannula 412, thereby forming the introducer assembly 410 in combination. The J-stylet 424 is configured to be received in a lumen of the curved cannula 422 such that a distal tip of the J-stylet 424 protrudes from an open distal tip of the curved cannula 422, thereby forming the curved cannula assembly 420 in combination. The curved cannula 422 and the J-stylet 424 may each comprise a straight proximal main body portion and a curved distal end portion. The curves of the curved distal end portions of the curved cannula 422 and the J-stylet 424 correspond to each other. The straight stylet 434 is a flexible channeling stylet and may include an embedded radiopaque marker band in a distal end portion of the stylet to facilitate visualization under fluoroscopic or CT imaging. The access tools may be provided as a kit that may optionally additionally include one or more additional straight introducer cannulas, curved cannulas (e.g., having a curved distal end portion of a different curvature than the first curved cannula), drills, and/or an additional straight stylet (e.g., having a different length than the first straight stylet). Some kits may include at least two of every access instrument and at least two treatment devices. The optional additional access tools may be adapted to access one or more additional vertebrae in the same spinal segment or a different spinal segment.

At least some of the access tools may be formed of a variety of flexible materials (e.g., ethylene vinyl acetate, polyethylene, polyethylene-based polyolefin elastomers, polypropylene, polypropylene-based elastomers, styrene butadiene copolymers, thermoplastic polyester elastomers, thermoplastic polyurethane elastomers, thermoplastic vulcanizate polymers, and/or the like). The access tools may include chevron designs or patterns or slits along the distal end portions to increase flexibility or bendability. Any of the access tools may be manually or automatically rotated to facilitate a desired trajectory. Other access tools (e.g., introducer assembly 410 and straight stylets) may be formed of rigid materials. Portions of an access tool may be flexible while other portions are rigid.

In some implementations, an outer cannula assembly (e.g., introducer assembly) includes a straight outer cannula and a straight stylet configured to be received within the outer cannula. The outer cannula assembly (e.g., introducer assembly 410) may be inserted first to penetrate an outer cortical shell of a bone and provide a conduit for further access tools to the inner cancellous bone. An inner cannula assembly (e.g., curved cannula assembly 420) may include a cannula having a pre-curved or steerable distal end portion and a stylet having a corresponding pre-curved or steerable distal end portion. Multiple stylets having distal end portions with different curvatures may be provided in a kit and selected from by a clinician. The inner cannula assembly may alternatively be configured to remain straight and non-curved.

The treatment devices (e.g., treatment probes) may be any device capable of modulating tissue (e.g., nerves, tumors, bone tissue). Any energy delivery device capable of delivering energy can be used (e.g., RF energy delivery devices, microwave energy delivery devices, laser devices, infrared energy devices, other electromagnetic energy delivery devices, ultrasound energy delivery devices, and the like). FIG. 4 includes one embodiment of an RF energy delivery device 442. The RF energy delivery device 442 includes a bipolar pair of electrodes at a distal end portion of the device. The bipolar pair of electrodes includes an active tip electrode and a return ring electrode spaced apart from the active tip electrode. The RF energy delivery device 442 may include one or more temperature sensors (e.g., thermocouples, thermistors) positioned on an external surface of or embedded within a shaft of the energy delivery device. The RF energy delivery device 442 may not employ internally circulating cooling, in accordance with several implementations.

In accordance with several implementations, thermal energy may be applied within a cancellous bone portion (e.g., by one or more radiofrequency (RF) energy delivery instruments coupled to one or more RF generators). The thermal energy may be conducted by heat transfer to the surrounding cancellous bone, thereby heating up the cancellous bone. In accordance with several implementations, the thermal energy is applied within a specific frequency range and having a sufficient temperature and over a sufficient duration of time to heat the cancellous bone such that the basivertebral nerve extending through the cancellous bone of the vertebral body is modulated. In several implementations, modulation comprises permanent ablation or denervation or cellular poration (e.g., electroporation). In some implementations, modulation comprises temporary denervation or inhibition. In some implementations, modulation comprises denervation without necrosis of tissue.

For thermal energy, temperatures of the thermal energy may range from about 70 to about 115 degrees Celsius (e.g., from about 70 to about 90 degrees Celsius, from about 75 to about 90 degrees Celsius, from about 83 to about 87 degrees Celsius, from about 80 to about 100 degrees Celsius, from about 85 to about 95 degrees Celsius, from about 90 to about 110 degrees Celsius, from about 95 to about 115 degrees Celsius, or overlapping ranges thereof). The temperature ramp may range from 0.1-5 degrees Celsius/second (e.g., 0.5-2.0 degrees Celsius/second, 1.0-3.0 degrees Celsius/second, 1.5-4.0 degree Celsius/second, 2.0-5.0 degrees Celsius/second). The time of treatment may range from about 10 seconds to about 1 hour (e.g., from 10 seconds to 1 minute, 1 minute to 5 minutes, from 5 minutes to 15 minutes, from 5 minutes to 10 minutes, from 10 minutes to 20 minutes, from 15 minutes to 30 minutes, from 20 minutes to 40 minutes, from 30 minutes to 1 hour, from 45 minutes to 1 hour, or overlapping ranges thereof). Pulsed energy may be delivered as an alternative to or in sequence with continuous energy. For radiofrequency energy, the energy applied may range from 350 kHz to 650 kHz (e.g., from 400 kHz to 600 kHz, from 350 kHz to 500 kHz, from 450 kHz to 550 kHz, from 500 kHz to 650 kHz, overlapping ranges thereof, or any value within the recited ranges, such as 450 kHz±5 kHz, 475 kHz±5 kHz, 487 kHz±5 kHz). A power of the radiofrequency energy may range from 5 W to 30 W (e.g., from 5 W to 15 W, from 5 W to 20 W, from 8 W to 12 W, from 10 W to 25 W, from 15 W to 25 W, from 20 W to 30 W, from 8 W to 24 W, and overlapping ranges thereof, or any value within the recited ranges). In accordance with several implementations, a thermal treatment dose (e.g., using a cumulative equivalent minutes (CEM) 43 degrees Celsius model or a comparable Arrhenius model) is between 200 and 300 CEM (e.g., between 200 and 240 CEM, between 230 CEM and 260 CEM, between 240 CEM and 280 CEM, between 260 CEM and 300 CEM) or greater than a predetermined threshold (e.g., greater than 240 CEM).

In some embodiments, the neuromodulation device comprises one or more microwave antennae or elements configured to delivery energy sufficient to modulate (e.g., ablate, denervate) nerves. The microwave antenna may be positioned along a distal end of the neuromodulation device. The microwave antenna may be located within a centering and/or cooling balloon. The neuromodulation device may be adapted to apply energy with the one or more microwave antennae directly in contact with the nerves or from a distance away from the nerves. The frequency of the microwave energy may range from 500 MHz to 20 GHz (e.g., 500 MHz to 900 MHz, 800 MHz to 1 GHz, 915 MHz, 1 GHz to 3 GHz, 2.45 GHz, 2.5 GHz to 4 GHz, 3 GHz to 8 GHz, 6 GHz to 10 GHz, 10 GHz to 20 GHz, overlapping ranges thereof, or any value within the recited ranges). The microwave energy may advantageously ablate nervous tissue without ablating bone tissue. The neuromodulation device may include multiple antennas operating simultaneously.

In some embodiments, the neuromodulation device comprises one or more ultrasound transducers or elements configured to delivery energy sufficient to modulate (e.g., ablate, denervate) nerves. The one or more ultrasound transducers or elements may be positioned along a distal end of the neuromodulation device. The transducers may be adapted to deliver focused energy in a targeted direction as opposed to omnidirectionally. The one or more ultrasound transducers may be located within a centering and/or cooling balloon. The neuromodulation device may be adapted to apply energy with the one or more ultrasound transducers from a distance away from the nerves. The frequency of the ultrasound energy may range from 200 kHz to 50 MHz (e.g., 200 kHz to 900 kHz, 800 kHz to 1 MHz, 1 MHz to 3 MHz, 2.5 MHz to 4 MHz, 3 MHz to 8 MHz, 6 MHz to 10 MHz, 10 MHz to 20 MHz, 15 MHz to 40 MHz, overlapping ranges thereof, or any value within the recited ranges). The acoustic energy may advantageously ablate nervous tissue without ablating intervening bone tissue if delivered from outside the vertebral body or even from within the vertebral body. The neuromodulation device may include multiple ultrasound transducers operating simultaneously. The ultrasound transducer(s) may be configured to be used for ablation and/or diagnostic imaging.

Cooling may optionally be provided to prevent surrounding tissues from being heated during the nerve modulation procedure. The cooling fluid may be internally circulated through the delivery device from and to a fluid reservoir in a closed circuit manner (e.g., using an inflow lumen and an outflow lumen). The cooling fluid may comprise pure water or a saline solution having a temperature sufficient to cool electrodes (e.g., 2-10 degrees Celsius, 5-10 degrees Celsius, 5-15 degrees Celsius). The cooling fluid may comprise a gas, such as carbon dioxide. Cooling may be provided by the same instrument used to deliver thermal energy (e.g., heat) or a separate instrument. In accordance with several implementations, cooling is not used.

In some implementations, ablative cooling may be applied to the nerves or bone tissue instead of heat (e.g., for cryoneurolysis or cryoablation applications). The temperature and duration of the cooling may be sufficient to modulate intraosseous nerves (e.g., ablation, or localized freezing, due to excessive cooling). The cold temperatures may destroy the myelin coating or sheath surrounding the nerves. The cold temperatures may also advantageously reduce the sensation of pain. The cooling may be delivered using a hollow needle under fluoroscopy or other imaging modality.

In some implementations, one or more fluids or agents may be delivered to a target treatment site to modulate a nerve. The agents may comprise bone morphogenetic proteins, for example. In some implementations, the fluids or agents may comprise chemicals for modulating nerves (e.g., chemoablative agents, alcohols, phenols, nerve-inhibiting agents, or nerve stimulating agents). The fluids or agents may be delivered using a hollow needle or injection device under fluoroscopy or other imaging modality.

One or more treatment devices (e.g., probes) may be used simultaneously or sequentially. For example, the distal end portions of two treatment devices may be inserted to different locations within a vertebral body or other bone or within different vertebral bodies or bones. Radiofrequency treatment probes may include multiple electrodes configured to act as monopolar, or unipolar, electrodes or as pairs of bipolar electrodes. The treatment device(s) may also be pre-curved or curveable such that the curved stylet is not needed or may have sharp distal tips such that additional sharpened stylets are not needed. In some implementations, any or all of the access tools and the treatment devices are MR-compatible so as to be visualized under MR imaging.

In accordance with several embodiments, regardless of type of access (e.g., transpedicular, extrapedicular, anterior, etc.), the access tools (and especially the treatment device) are inserted and advanced along an access path such that the treatment delivery elements (e.g., electrodes) of the treatment devices are electrically isolated from (e.g., more than 1 mm away from) the residual fusion hardware when the treatment device is delivering treatment to a target treatment zone or site. The access tools (and especially the treatment device) may also be inserted and advanced along an access path such that the treatment delivery elements (e.g., electrodes) of the treatment devices are far enough away from (e.g., greater than 1 mm, greater than 1.5 mm, greater than 2 mm, greater than 2.5 mm, greater than 3 mm) the residual fusion hardware (e.g., pedicle screws) such that the residual fusion hardware is not acting as an appreciable thermal sink for the treatment devices. The electrical isolation and thermal insulation prevents the residual fusion hardware from conducting electrical current or thermal energy (e.g., heat) which could cause pain, discomfort, or undesired ablation of tissue outside the target treatment zone or site. In some embodiments, monitoring tools may be used that contact the residual fusion hardware (e.g., pedicle screws) to confirm or verify (using monitoring software or detection circuitry) electrical isolation of the residual fusion hardware from the energy delivery elements of the treatment device(s) following placement of the treatment device(s).

Figure 5A:
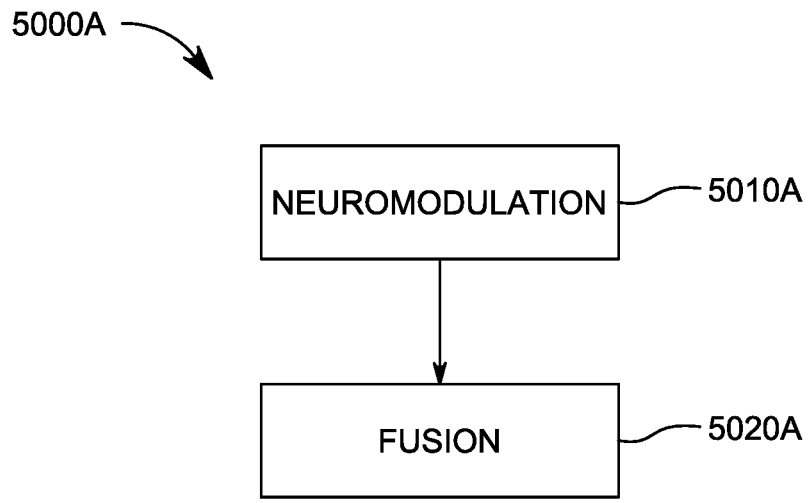
FIGS. 5A and 5B are example flow charts of combined fusion and neuromodulation (e.g., denervation) procedures.
Figure 5B:
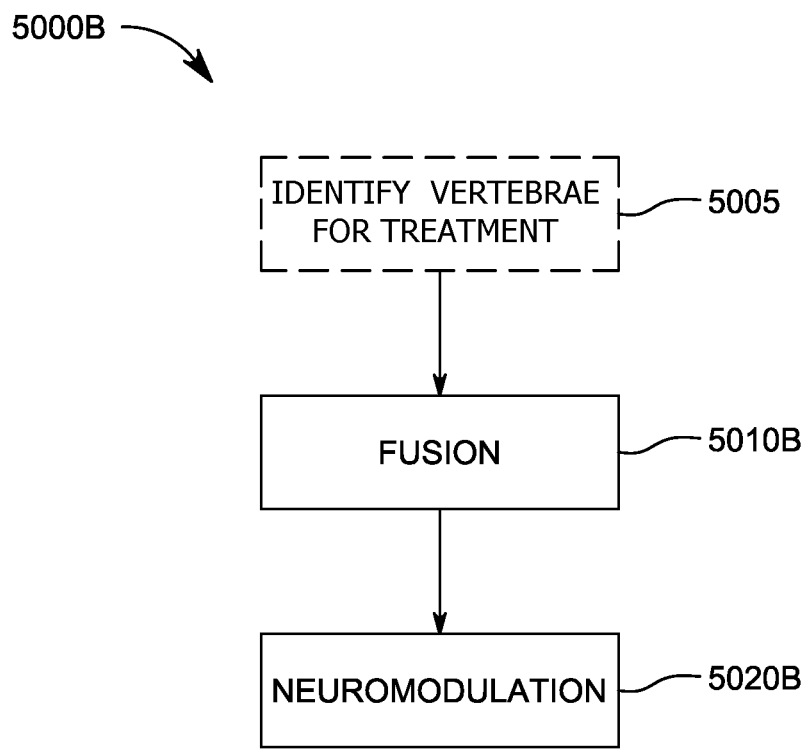

FIGS. 5A and 5B are example flow charts of methods of treatment involving combined fusion and neuromodulation (e.g., denervation) therapy. Again, the fusion and neuromodulation may be instructed by the same entity or by different entities. With reference to FIG. 5A, a process 5000A of treating pain (e.g., chronic low back pain) in a patient includes performing neuromodulation (Block 5010A) of nerves within or surrounding the body of one or more adjacent vertebrae. As discussed herein, the neuromodulation may include ablation of nerves using any of the access and neuromodulation tools described herein (e.g., access and treatment tools described in connection with FIG. 4), as well as alternative access and neuromodulation tools. For example, the neuromodulation may include denervating (e.g., ablating) one or more intraosseous nerves (e.g., basivertebral nerve), such as the INTRACEPT® RF ablation procedure offered by applicant Relievant Medsystems, Inc., such as described in U.S. Pat. Nos. 8,419,730; 8,613,744; 9,724,151; and/or U.S. Pat. No. 8,361,067: the entire content of each of which is hereby incorporated herein by reference.

In one implementation, when preparing for fusion, a spatula that is to be used during the fusion surgery preparation could include resistive wire, thereby acting like a branding iron to heat the intraosseous nerves or bone, the vertebral endplates, and/or extraosseous nerves. In some implementations, a monopolar spatula or two bipolar spatulas may be used to ablate nerve endings prior to, or in conjunction with, a fusion procedure as a "belt-and-suspenders" approach. In some implementations, a balloon catheter with an ultrasound transducer can be used to ablate the endplate nerves since the endplate is cartilaginous and not bony. Other tissue in addition to, or alternative to, nerves may also be treated or otherwise affected (e.g., tumors or other cancerous tissue).

The method further includes performing a spinal fusion (Block 5020A) between two adjacent vertebrae of the patient (e.g., at least one of which received the neuromodulation therapy performed at Block 5010A). In some implementations, one or more pedicle screws may be inserted through transpedicular access channels formed by the access instruments during the neuromodulation therapy. All or a portion of the spinal fusion and/or neuromodulation may be performed using automated systems or techniques (e.g., robotic-assisted spine surgery techniques using a robotic guidance and/or surgical system and/or artificial intelligence systems, techniques and data). For example, pedicle screws may be inserted or implanted using a robotic-guided implantation system and technique. The procedures may be performed using an open surgical approach or a percutaneous approach. In some implementations, all or a portion of the spinal fusion and/or neuromodulation may be performed manually. In some implementations, total disc replacement (e.g., artificial disc replacement) may be performed instead of, or in addition to, the spinal fusion. Total disc replacement and fusion procedures may incorporate use of 3D-printed components, such as cages, artificial discs, pedicle screws, plates, rods, and/or the like.

FIG. 5B illustrates an alternative process 5000B of treating pain (e.g., chronic low back pain) in a patient. The process 5000B optionally includes a step of identifying one or more vertebrae likely to be a source of chronic low back pain at the present time or in the future (Block 5005). For example, identification may include identification of Modic changes or pre-Modic changes associated with one or more vertebrae indicative of pain. The identification of Modic changes may indicate which vertebrae to treat via the combined fusion and neuromodulation therapeutic procedure. The identification of Modic changes may be optional and need not be performed. Vertebral endplate degeneration or endplate defects other than Modic changes may be identified, such as described above. Multiple different independent sources of pain may be identified as needing to be treated (e.g., pain originating from one or more intervertebral discs or stemming from one or more vertebral endplates or within one or more intraosseous locations within vertebrae). Intraosseous sources of pain could include vertebral fractures or tumors.

The process 5000B of FIG. 5B involves performing the neuromodulation and fusion in opposite order of the process 5000A of FIG. 5A. The process 5000B includes performing a spinal fusion (Block 5010B) between two adjacent vertebrae of the patient. The spinal fusion includes leaving one or more hardware components (e.g., screws, rods, plates) within or surrounding a body of each of the adjacent vertebra. In some implementations, total disc replacement (e.g., artificial disc replacement) may be performed instead of, or in addition to, the spinal fusion at Block 5010B. The process 5000B then includes performing neuromodulation (Block 5020B) within or surrounding the vertebral body of one or both of the adjacent vertebrae. For example, the neuromodulation may include denervating (e.g., ablating) one or more intraosseous nerves (e.g., basivertebral nerve), such as described in U.S. Pat. Nos. 8,419,730; 8,613,744; and/or U.S. Pat. No. 8,361,067; the entire content of each of which is hereby incorporated herein by reference.

In various implementations, the neuromodulation step includes inserting an access tool or assembly within an inner cancellous bone region of a vertebral body of one of the two adjacent vertebrae while avoiding contact (e.g., does not involve touching or coupling) with the one or more hardware components. The access tool may include an introducer comprising a lumen extending therethrough to facilitate access to the inner cancellous bone region of the vertebral body. The access tool may include a cannula and stylet assembly, with the stylet extending through a lumen of the cannula such that a sharp distal tip of the stylet extends beyond an open distal end of the cannula to facilitate penetration of bone tissue. The neuromodulation step may further include inserting a neuromodulation device through the lumen of the access tool until at least a distal end of the neuromodulation device extends beyond the access tool within the inner cancellous bone region of the vertebral body. The neuromodulation step may also include modulating a basivertebral nerve or other intraosseous nerves within the inner cancellous bone region using the neuromodulation device and removing the neuromodulation device and the access tool from the patient (e.g., the neuromodulation device is not implanted but is removed following the neuromodulation step). The neuromodulation step may additionally include modulating a nerve (e.g., basivertebral nerve) within the other one of the two adjacent vertebrae and/or modulating one or more nerves (e.g., basivertebral nerves or other intraosseous nerves) within one or more vertebrae other than the vertebrae that were fused.

The neuromodulation step may additionally or alternatively include modulating one or more extraosseous nerves (e.g., nerves of one or more endplates, nerves within a foramen (e.g., basivertebral foramen). For example, the basivertebral nerve may be ablated outside the vertebral body at a location of entry within the vertebral body if the residual hardware form the fusion is impeding access or is too close to a desired target ablation zone that could result in excessive heating of the screws or thermal sinking caused by the screws, thereby making denervation ineffective or less effective, or making the denervation take longer. For example, the neuromodulation step may be performed as described in applicant's U.S. Pat. No. 10,390,877, the entire content of which is hereby incorporated herein by reference.

The step of inserting the access tool within the inner cancellous bone region may include extrapedicularly inserting the access tool within the inner cancellous bone region using an access location superior to the one or more hardware components associated with a superior vertebra (e.g., L5 vertebra) of the adjacent vertebrae. The step of inserting the access tool within the inner cancellous bone region may additionally or alternatively include extrapedicularly inserting the access tool within the inner cancellous bone region using an access location inferior to the one or more hardware components associated with an inferior vertebra (e.g., S1 vertebra) of the adjacent vertebrae.

The processes illustrated in FIGS. 5A and 5B may optionally include confirming modulation (e.g., ablation) of the basivertebral nerve or other nerve or tissue. The neuromodulation device may comprise a radiofrequency energy delivery device (e.g., bipolar RF probe) configured to deliver radiofrequency energy sufficient to modulate (e.g., ablate, denervate, stimulate) a nerve (e.g., basivertebral nerve). The neuromodulation device may comprise one or more ultrasound transducers configured to apply ultrasound energy sufficient to modulate a nerve. The neuromodulation device may be configured to generate thermal energy sufficient to modulate the basivertebral nerve. In some implementations, the neuromodulation device is a cryoablation device and/or is configured to deliver a fluid (e.g., ablative fluid, such as a chemical liquid or a gas such as water vapor or steam) sufficient to modulate the nerve. The neuromodulation device may be a resistive heating device or a laser device.

In some implementations, the system comprises various features that are present as single features (as opposed to multiple features). For example, in one embodiment, the system includes a single radiofrequency generator, a single introducer cannula with a single stylet, a single radiofrequency energy delivery device or probe, and a single bipolar pair of electrodes. A single thermocouple (or other means for measuring temperature) may also be included. Multiple features or components (e.g., multiple radiofrequency energy delivery devices or probes) are provided in alternate embodiments.

In some implementations, the system comprises one or more of the following: means for tissue modulation (e.g., an ablation or other type of modulation catheter or delivery device), means for monitoring temperature (e.g., thermocouple, thermistor, infrared sensor), means for imaging (e.g., stereotactic guidance, MRI, CT, fluoroscopy), means for accessing (e.g., introducer assembly, curved cannulas, drills, curettes), etc. In some implementations, the means may comprise automated (e.g., robotic) means to facilitate increased precision, quicker procedures, and decreased blood loss.

Although certain embodiments and examples have been described herein, aspects of the methods and devices shown and described in the present disclosure may be differently combined and/or modified to form still further embodiments. Additionally, the methods described herein may be practiced using any device suitable for performing the recited steps. Further, the disclosure (including the figures) herein of any particular feature, aspect, method, property, characteristic, quality, attribute, element, or the like in connection with various embodiments can be used in all other embodiments set forth herein. The section headings used herein are merely provided to enhance readability and are not intended to limit the scope of the embodiments disclosed in a particular section to the features or elements disclosed in that section.

While the embodiments are susceptible to various modifications, and alternative forms, specific examples thereof have been shown in the drawings and are herein described in detail. It should be understood, however, that the embodiments are not to be limited to the particular forms or methods disclosed, but to the contrary, the embodiments are to cover all modifications, equivalents, and alternatives falling within the spirit and scope of the various embodiments described and the appended claims. Any methods disclosed herein need not be performed in the order recited. The methods disclosed herein include certain actions taken by a practitioner; however, they can also include any third-party instruction of those actions, either expressly or by implication. For example, actions such as "applying thermal energy" include "instructing the applying of thermal energy."

Various embodiments of the disclosure have been presented in a range format. It should be understood that the description in range format is merely for convenience and brevity and should not be construed as an inflexible limitation on the scope of the invention. The ranges disclosed herein encompass any and all overlap, sub-ranges, and combinations thereof, as well as individual numerical values within that range. For example, description of a range such as from 70 to 115 degrees should be considered to have specifically disclosed subranges such as from 70 to 80 degrees, from 70 to 100 degrees, from 70 to 110 degrees, from 80 to 100 degrees etc., as well as individual numbers within that range, for example, 70, 80, 90, 95, 100, 70.5, 90.5 and any whole and partial increments therebetween. Language such as "up to," "at least," "greater than," "less than," "between," and the like includes the number recited. Numbers preceded by a term such as "about" or "approximately" include the recited numbers. For example, "about 2:1" includes "2:1." For example, the terms "approximately", "about", and "substantially" as used herein represent an amount close to the stated amount that still performs a desired function or achieves a desired result.

What is claimed is:

1. A method of treating multiple independent sources of low back pain of a patient during a single therapeutic intervention, the method comprising:
   performing a spinal fusion procedure between two adjacent vertebrae of the patient, wherein the spinal fusion procedure comprises leaving one or more hardware components within or surrounding each of the adjacent vertebrae;
   inserting an access tool within an inner cancellous bone region of a vertebral body of one of the two adjacent vertebrae while avoiding contact with the one or more hardware components, the access tool comprising a lumen extending therethrough to facilitate access to the inner cancellous bone region;
   inserting a nerve ablation device through the lumen of the access tool until at least a distal end of the nerve ablation device extends beyond the access tool within the inner cancellous bone region,
   wherein the nerve ablation device comprises a bipolar radiofrequency probe;
   ablating a basivertebral nerve within the inner cancellous bone region using the bipolar radiofrequency probe; and
   removing the bipolar radiofrequency probe and the access tool from the patient.

2. The method of claim 1, wherein the step of inserting the access tool within the inner cancellous bone region comprises extrapedicularly inserting the access tool within the inner cancellous bone region using an access location superior to a pedicle of a superior vertebra of the adjacent vertebrae.

3. The method of claim 1, wherein the step of inserting the access tool within the inner cancellous bone region comprises extrapedicularly inserting the access tool within the inner cancellous bone region using an access location inferior to a pedicle of an inferior vertebra of the adjacent vertebrae.

4. The method of claim 1, further comprising identifying the two adjacent vertebrae by determining that the two adjacent vertebrae exhibit one or more Modic changes.

5. The method of claim 1, further comprising identifying the two adjacent vertebrae by determining that the two adjacent vertebrae exhibit vertebral endplate degeneration or defects.

6. The method of claim 1, wherein the two adjacent vertebrae comprise an L5 vertebra and an S1 vertebra.

7. The method of claim 1, wherein the two adjacent vertebrae comprise lumbar vertebrae.

8. The method of claim 1, wherein the two adjacent vertebrae comprise vertebrae of a same spine section.

9. The method of claim 1, further comprising inserting the access tool within an inner cancellous bone region of a vertebral body of the other one of the two adjacent vertebrae while avoiding contact with the one or more hardware components and inserting the nerve ablation device through the lumen of the access tool until at least a distal end of the nerve ablation device extends beyond the access tool within the inner cancellous bone region of the vertebral body of the other one of the two adjacent vertebrae.

10. The method of claim 1, further comprising confirming electrical isolation between electrodes of the bipolar radiofrequency probe and the one or more hardware components.

11. A method of treating multiple independent sources of low back pain of a patient during a single therapeutic intervention, the method comprising:
    performing a spinal fusion procedure between two adjacent vertebrae of the patient, wherein the spinal fusion procedure comprises leaving one or more hardware components within or surrounding each of the adjacent vertebrae;
    inserting an access tool within an inner cancellous bone region of a vertebral body of one of the two adjacent vertebrae while avoiding contact with the one or more hardware components, the access tool comprising a lumen extending therethrough to facilitate access to the inner cancellous bone region;
    inserting a neuromodulation device through the lumen of the access tool until at least a distal end of the neuromodulation device extends beyond the access tool within the inner cancellous bone region,
    modulating a basivertebral nerve within the inner cancellous bone region using the neuromodulation device; and
    removing the neuromodulation device and the access tool from the patient.

12. The method of claim 11, wherein the step of inserting the access tool within the inner cancellous bone region comprises extrapedicularly inserting the access tool within the inner cancellous bone region using an access location superior to a pedicle of a superior vertebra of the adjacent vertebrae.

13. The method of claim 11, wherein the step of inserting the access tool within the inner cancellous bone region comprises extrapedicularly inserting the access tool within the inner cancellous bone region using an access location inferior to a pedicle of an inferior vertebra of the adjacent vertebrae.

14. The method of claim 11, further comprising identifying the two adjacent vertebrae by determining that the two adjacent vertebrae exhibit one or more Modic changes.

15. The method of claim 11, further comprising inserting the access tool within an inner cancellous bone region of a vertebral body of the other one of the two adjacent vertebrae while avoiding contact with the one or more hardware components and inserting the neuromodulation device through the lumen of the access tool until at least a distal end of the neuromodulation device extends beyond the access tool within the inner cancellous bone region of the vertebral body of the other one of the two adjacent vertebrae.

16. The method of claim 11, further comprising inserting the access tool within an inner cancellous bone region of a vertebral body of a vertebra other than the two adjacent vertebrae and inserting the neuromodulation device through the lumen of the access tool until at least a distal end of the neuromodulation device extends beyond the access tool within the inner cancellous bone region of the vertebral body of the vertebra other than the two adjacent vertebrae.

17. The method of claim 11, wherein the neuromodulation device is configured to deliver radiofrequency energy sufficient to ablate the basivertebral nerve.

18. The method of claim 11, wherein the neuromodulation device is configured to apply ultrasound energy sufficient to ablate the basivertebral nerve.

19. The method of claim 11, wherein the neuromodulation device is configured to generate thermal energy sufficient to ablate the basivertebral nerve.

20. The method of claim 11, wherein the neuromodulation device is a cryoablation device.

21. The method of claim 11, wherein the neuromodulation device is configured to deliver a fluid sufficient to denervate the basivertebral nerve.

22. The method of claim 11, wherein the neuromodulation device comprises a laser device.

23. The method of claim 11, wherein modulating the basivertebral nerve comprises ablating the basivertebral nerve.

24. The method of claim 11, wherein modulating the basivertebral nerve comprises (i) stimulating the basivertebral nerve without significantly stimulating other tissue or (ii) denervating the basivertebral nerve with no electrical stimulation.

25. The method of claim 11, further comprising performing a total disc replacement between the adjacent vertebrae.

* * * * *